(12) United States Patent
Qiu et al.

(10) Patent No.: US 8,939,577 B2
(45) Date of Patent: *Jan. 27, 2015

(54) SILICONE HYDROGEL LENSES WITH WATER-RICH SURFACES

(71) Applicant: Novartis AG, Basel (CH)

(72) Inventors: Yongxing Qiu, Duluth, GA (US); John Dallas Pruitt, Suwanee, GA (US); Sibichen J. Thekveli, Alpharetta, GA (US); Robert Carey Tucker, Suwanee, GA (US); Jared Nelson, Buford, GA (US)

(73) Assignee: Novartis AG, Basel (CH)

(*) Notice: Subject to any disclaimer, the term of this patent is extended or adjusted under 35 U.S.C. 154(b) by 0 days.

This patent is subject to a terminal disclaimer.

(21) Appl. No.: 13/900,136

(22) Filed: May 22, 2013

(65) Prior Publication Data

US 2013/0250234 A1 Sep. 26, 2013

Related U.S. Application Data

(63) Continuation of application No. 13/193,653, filed on Jul. 29, 2011, now Pat. No. 8,480,227.

(60) Provisional application No. 61/448,478, filed on Mar. 2, 2011, provisional application No. 61/369,102, filed on Jul. 30, 2010.

(51) Int. Cl.
*G02C 7/00* (2006.01)
*G02C 7/02* (2006.01)
(Continued)

(52) U.S. Cl.
CPC ............... *G02B 1/043* (2013.01); *G02C 7/049* (2013.01)
USPC .................................... 351/159.33

(58) Field of Classification Search
CPC ............... G02C 7/00; G02C 7/02; G02C 7/04
USPC ........... 351/159.33, 159.01, 159.02; 526/930; 521/905
See application file for complete search history.

(56) References Cited

U.S. PATENT DOCUMENTS 2,296,891 A 9/1942 Anderson
2,926,154 A 2/1960 Keim
(Continued)

FOREIGN PATENT DOCUMENTS

CN 101688042 A 3/2010
EP 0321403 A2 6/1989
(Continued)

OTHER PUBLICATIONS

Authors: Sean P. Cullen, Ian C. Mandel and Padma Gopalan Article: Surface-Anchored Poly(2-vinyl-4, 4-dimethyl azlactone) Brushes as Templates for Enzyme Immobilization Published in: Langmuir, 2008, vol. 24, No. 23, pp. 13701-13709, Publication Date: Oct. 28, 2008 Publisher: ACS Publications—1155 Sixteenth Street N.W., Washington, DC 20036.

(Continued)

*Primary Examiner* — James Greece
(74) *Attorney, Agent, or Firm* — Jian Zhou

(57) ABSTRACT

The invention is related to a hydrated silicone hydrogel contact lens having a layered structural configuration: a lower water content silicone hydrogel core (or bulk material) completely covered with a layer of a higher water content hydrogel totally or substantially free of silicone. A hydrated silicone hydrogel contact lens of the invention possesses high oxygen permeability for maintaining the corneal health and a soft, water-rich, lubricious surface for wearing comfort.

30 Claims, 10 Drawing Sheets

(51) Int. Cl.
*G02C 7/04* (2006.01)
*G02B 1/04* (2006.01)

(56) References Cited

U.S. PATENT DOCUMENTS

| | | |
|---|---|---|
| 3,224,986 A | 12/1965 | Butler |
| 3,408,429 A | 10/1968 | Wichterle |
| 3,434,984 A | 3/1969 | Hyland |
| 3,488,327 A | 1/1970 | Kollinsky |
| 3,566,874 A | 3/1971 | Shepherd |
| 3,583,950 A | 6/1971 | Kollinsky |
| 3,598,790 A | 8/1971 | Kollinsky |
| 3,609,126 A | 9/1971 | Asao |
| 3,616,935 A | 11/1971 | Love |
| 3,617,344 A | 11/1971 | Leininger |
| 3,634,123 A | 1/1972 | Eriksson |
| 3,639,141 A | 2/1972 | Dyck |
| 3,663,288 A | 5/1972 | Miller |
| 3,695,921 A | 10/1972 | Shepherd |
| 3,700,623 A | 10/1972 | Keim |
| 3,717,502 A | 2/1973 | Masuhara |
| 3,772,076 A | 11/1973 | Keim |
| 3,813,695 A | 6/1974 | Podell, Jr. |
| 3,844,989 A | 10/1974 | Harumiya |
| 3,861,396 A | 1/1975 | Vaillancourt |
| 3,895,166 A | 7/1975 | Wood |
| 3,900,672 A | 8/1975 | Hammond |
| 3,925,178 A | 12/1975 | Gesser |
| 3,975,350 A | 8/1976 | Hudgin |
| 4,060,657 A | 11/1977 | Iwami |
| 4,099,859 A | 7/1978 | Merrill |
| 4,118,485 A | 10/1978 | Eriksson |
| 4,132,695 A | 1/1979 | Burkholder |
| 4,136,250 A | 1/1979 | Mueller |
| 4,143,949 A | 3/1979 | Chen |
| 4,153,641 A | 5/1979 | Deichert |
| 4,154,898 A | 5/1979 | Burkholder |
| 4,168,112 A | 9/1979 | Ellis |
| 4,182,822 A | 1/1980 | Chang |
| 4,189,546 A | 2/1980 | Deichert |
| 4,191,596 A | 3/1980 | Dollman |
| 4,217,038 A | 8/1980 | Letter |
| 4,229,838 A | 10/1980 | Mano |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,263,188 A | 4/1981 | Hampton |
| 4,276,402 A | 6/1981 | Chromecek |
| 4,280,970 A | 7/1981 | Kesting |
| 4,293,642 A | 10/1981 | Beavan |
| 4,298,639 A | 11/1981 | Van Eenam |
| 4,298,715 A | 11/1981 | Van Eenam |
| 4,312,575 A | 1/1982 | Peyman |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,373,009 A | 2/1983 | Winn |
| 4,379,893 A | 4/1983 | O'Malley |
| 4,427,823 A | 1/1984 | Inagaki |
| 4,444,711 A | 4/1984 | Schad |
| 4,450,045 A | 5/1984 | Hertel |
| 4,460,534 A | 7/1984 | Boehm |
| 4,462,665 A | 7/1984 | Shah |
| 4,486,577 A | 12/1984 | Mueller |
| 4,487,808 A | 12/1984 | Lambert |
| 4,495,313 A | 1/1985 | Larsen |
| 4,499,154 A | 2/1985 | James |
| 4,521,564 A | 6/1985 | Solomon |
| 4,527,293 A | 7/1985 | Eckstein |
| 4,543,398 A | 9/1985 | Bany |
| 4,546,123 A | 10/1985 | Schäfer |
| 4,548,844 A | 10/1985 | Podell |
| 4,565,740 A | 1/1986 | Gölander |
| 4,575,476 A | 3/1986 | Podell |
| 4,605,712 A | 8/1986 | Mueller |
| 4,613,665 A | 9/1986 | Larm |
| 4,631,072 A | 12/1986 | Koller |
| 4,661,575 A | 4/1987 | Tom |
| 4,684,538 A | 8/1987 | Klemarczyk |
| 4,695,608 A | 9/1987 | Engler |
| 4,703,097 A | 10/1987 | Wingler |
| 4,720,512 A | 1/1988 | Hu |
| 4,734,475 A | 3/1988 | Goldenberg |
| 4,786,556 A | 11/1988 | Hu |
| 4,791,175 A | 12/1988 | Janssen |
| 4,833,218 A | 5/1989 | Lee |
| 4,837,289 A | 6/1989 | Mueller |
| 4,876,126 A | 10/1989 | Takemura |
| 4,892,402 A | 1/1990 | Sawamoto |
| 4,895,896 A | 1/1990 | Müller-Lierheim |
| 4,920,184 A | 4/1990 | Schäfer |
| 4,943,460 A | 7/1990 | Markle |
| 4,954,586 A | 9/1990 | Toyoshima |
| 4,954,587 A | 9/1990 | Mueller |
| 4,959,074 A | 9/1990 | Halpern |
| 4,968,532 A | 11/1990 | Janssen |
| 4,973,359 A | 11/1990 | Yamasoe |
| 4,973,493 A | 11/1990 | Guire |
| 4,978,481 A | 12/1990 | Janssen |
| 4,979,959 A | 12/1990 | Guire |
| 4,990,357 A | 2/1991 | Karakelle |
| 5,002,582 A | 3/1991 | Guire |
| 5,010,141 A | 4/1991 | Mueller |
| 5,019,393 A | 5/1991 | Ito |
| 5,034,461 A | 7/1991 | Lai |
| 5,039,459 A | 8/1991 | Kindt-Larsen |
| 5,039,761 A | 8/1991 | Ono |
| 5,049,403 A | 9/1991 | Larm |
| 5,053,048 A | 10/1991 | Pinchuk |
| 5,061,738 A | 10/1991 | Solomon |
| 5,070,170 A | 12/1991 | Robertson |
| 5,079,093 A | 1/1992 | Akashi |
| 5,079,319 A | 1/1992 | Mueller |
| 5,080,924 A | 1/1992 | Kamel |
| 5,091,205 A | 2/1992 | Fan |
| 5,108,776 A | 4/1992 | Goldberg |
| 5,112,900 A | 5/1992 | Buddenhagen |
| 5,132,108 A | 7/1992 | Narayanan |
| 5,135,297 A | 8/1992 | Valint, Jr. |
| 5,135,516 A | 8/1992 | Sahatjian |
| 5,155,194 A | 10/1992 | Kossmehl |
| 5,160,790 A | 11/1992 | Elton |
| 5,165,919 A | 11/1992 | Sasaki |
| 5,208,111 A | 5/1993 | Decher |
| 5,210,111 A | 5/1993 | Goldenberg |
| 5,214,452 A | 5/1993 | Kossmehl |
| 5,217,492 A | 6/1993 | Guire |
| 5,229,211 A | 7/1993 | Murayama |
| 5,262,484 A | 11/1993 | Coleman |
| 5,263,992 A | 11/1993 | Guire |
| 5,270,046 A | 12/1993 | Sakamoto |
| 5,272,012 A | 12/1993 | Opolski |
| 5,290,548 A | 3/1994 | Goldberg |
| 5,290,585 A | 3/1994 | Elton |
| 5,292,514 A | 3/1994 | Capecchi |
| 5,308,641 A | 5/1994 | Cahalan |
| 5,312,873 A | 5/1994 | Gregor |
| 5,346,946 A | 9/1994 | Yokoyama |
| 5,348,873 A | 9/1994 | Matsuda |
| 5,350,800 A | 9/1994 | Verhoeven |
| 5,352,714 A | 10/1994 | Lai |
| 5,355,213 A | 10/1994 | Dotan |
| 5,358,995 A | 10/1994 | Lai |
| 5,387,632 A | 2/1995 | Lai |
| 5,397,848 A | 3/1995 | Yang |
| 5,407,715 A | 4/1995 | Buddenhagen |
| 5,408,002 A | 4/1995 | Coleman |
| 5,408,280 A | 4/1995 | von der Haegen |
| 5,409,731 A | 4/1995 | Nakagawa |
| 5,416,131 A | 5/1995 | Wolff |
| 5,416,132 A | 5/1995 | Yokoyama |

(56) References Cited

U.S. PATENT DOCUMENTS

| | | |
|---|---|---|
| 5,417,969 A | 5/1995 | Hsu |
| 5,441,488 A | 8/1995 | Shimura |
| 5,442,402 A | 8/1995 | Sohn |
| 5,443,907 A | 8/1995 | Slaikeu |
| 5,451,617 A | 9/1995 | Lai |
| 5,461,433 A | 10/1995 | Nakabayashi |
| 5,470,944 A | 11/1995 | Bonsignore |
| 5,475,450 A | 12/1995 | Meadows |
| 5,476,665 A | 12/1995 | Dennison |
| 5,486,579 A | 1/1996 | Lai |
| 5,500,732 A | 3/1996 | Ebel |
| 5,508,317 A | 4/1996 | Müller |
| 5,509,899 A | 4/1996 | Fan |
| 5,510,004 A | 4/1996 | Allen |
| 5,510,418 A | 4/1996 | Rhee |
| 5,527,925 A | 6/1996 | Chabrecek |
| 5,528,357 A | 6/1996 | Davis |
| 5,532,311 A | 7/1996 | Sirvio |
| 5,562,922 A | 10/1996 | Lambert |
| 5,563,056 A | 10/1996 | Swan |
| 5,574,554 A | 11/1996 | Su |
| 5,578,675 A | 11/1996 | Mormile |
| 5,583,163 A | 12/1996 | Müller |
| 5,584,882 A | 12/1996 | Yabushita |
| 5,591,140 A | 1/1997 | Narayanan |
| 5,597,873 A | 1/1997 | Chambers |
| 5,599,576 A | 2/1997 | Opolski |
| 5,612,389 A | 3/1997 | Chabrecek |
| 5,612,391 A | 3/1997 | Chabrecek |
| 5,614,035 A | 3/1997 | Nadkarni |
| 5,620,738 A | 4/1997 | Fan |
| 5,621,018 A | 4/1997 | Chabrecek |
| 5,626,000 A | 5/1997 | Edwards |
| 5,633,504 A | 5/1997 | Collins |
| 5,648,442 A | 7/1997 | Bowers |
| 5,670,558 A | 9/1997 | Onishi |
| 5,672,638 A | 9/1997 | Verhoeven |
| 5,674,942 A | 10/1997 | Hill |
| 5,681,510 A | 10/1997 | Valint, Jr. |
| 5,688,855 A | 11/1997 | Stoy |
| 5,693,034 A | 12/1997 | Buscemi |
| 5,700,559 A | 12/1997 | Sheu |
| 5,702,754 A | 12/1997 | Zhong |
| 5,705,583 A | 1/1998 | Bowers |
| 5,710,302 A | 1/1998 | Kunzler |
| 5,712,326 A | 1/1998 | Jones |
| 5,712,327 A | 1/1998 | Chang |
| 5,712,356 A | 1/1998 | Bothe |
| 5,717,781 A | 2/1998 | Ebel |
| 5,719,669 A | 2/1998 | Ross, III |
| 5,723,145 A | 3/1998 | Shikinami |
| 5,731,087 A | 3/1998 | Fan |
| 5,739,236 A | 4/1998 | Bowers |
| 5,748,300 A | 5/1998 | Wilder |
| 5,760,100 A | 6/1998 | Nicolson |
| 5,766,158 A | 6/1998 | Opolski |
| 5,779,943 A | 7/1998 | Enns |
| 5,783,650 A | 7/1998 | Bowers |
| 5,789,464 A | 8/1998 | Müller |
| 5,792,531 A | 8/1998 | Littleton |
| 5,800,412 A | 9/1998 | Zhang |
| 5,801,822 A | 9/1998 | Lafferty |
| 5,804,318 A | 9/1998 | Pinchuk |
| 5,805,264 A | 9/1998 | Janssen |
| 5,805,276 A | 9/1998 | Davis |
| 5,807,944 A | 9/1998 | Hirt |
| 5,811,151 A | 9/1998 | Hendriks |
| 5,818,573 A | 10/1998 | Lafferty |
| 5,828,446 A | 10/1998 | Davis |
| 5,843,346 A | 12/1998 | Morrill |
| 5,849,810 A | 12/1998 | Müller |
| 5,849,811 A | 12/1998 | Nicolson |
| 5,855,825 A | 1/1999 | Ito |
| 5,858,653 A | 1/1999 | Duran |
| 5,859,107 A | 1/1999 | Jones |
| 5,866,113 A | 2/1999 | Hendriks |
| 5,869,127 A | 2/1999 | Zhong |
| 5,871,823 A | 2/1999 | Anders |
| 5,874,500 A | 2/1999 | Rhee |
| 5,879,436 A | 3/1999 | Kramer |
| 5,879,697 A | 3/1999 | Ding |
| 5,882,687 A | 3/1999 | Park |
| 5,885,647 A | 3/1999 | Larm |
| 5,894,002 A | 4/1999 | Boneberger |
| 5,910,518 A | 6/1999 | Nakada |
| 5,922,161 A | 7/1999 | Wu |
| 5,936,052 A | 8/1999 | Bothe |
| 5,936,703 A | 8/1999 | Miyazaki |
| 5,962,548 A | 10/1999 | Vanderlaan |
| 5,981,615 A | 11/1999 | Meijs |
| 5,981,675 A | 11/1999 | Valint, Jr. |
| 5,995,213 A | 11/1999 | Davis |
| 5,997,517 A | 12/1999 | Whitbourne |
| 6,007,526 A | 12/1999 | Passalaqua |
| 6,039,913 A | 3/2000 | Hirt |
| 6,043,328 A | 3/2000 | Domschke |
| 6,048,620 A | 4/2000 | Zhong |
| 6,054,504 A | 4/2000 | Dalla Riva Toma |
| 6,063,484 A | 5/2000 | Exsted |
| 6,075,066 A | 6/2000 | Matsuda |
| 6,087,415 A | 7/2000 | Vanderlaan |
| 6,087,462 A | 7/2000 | Bowers |
| 6,090,901 A | 7/2000 | Bowers |
| 6,096,138 A | 8/2000 | Heiler |
| 6,096,726 A | 8/2000 | Opolski |
| 6,099,122 A | 8/2000 | Chabrecek |
| 6,099,852 A | 8/2000 | Jen |
| 6,106,889 A | 8/2000 | Beavers |
| 6,134,342 A | 10/2000 | Doke |
| 6,149,842 A | 11/2000 | Lally |
| 6,165,322 A | 12/2000 | Bower |
| 6,179,817 B1 | 1/2001 | Zhong |
| 6,193,369 B1 | 2/2001 | Valint, Jr. |
| 6,207,796 B1 | 3/2001 | Dairoku |
| 6,218,508 B1 | 4/2001 | Kragh |
| 6,221,061 B1 | 4/2001 | Engelson |
| 6,225,431 B1 | 5/2001 | Bowers |
| 6,238,799 B1 | 5/2001 | Opolski |
| 6,284,854 B1 | 9/2001 | Bowers |
| 6,301,005 B1 | 10/2001 | Epstein |
| 6,303,687 B1 | 10/2001 | Müller |
| 6,306,514 B1 | 10/2001 | Weikel |
| 6,314,199 B1 | 11/2001 | Höfer |
| 6,323,165 B1 | 11/2001 | Heiler |
| 6,340,465 B1 | 1/2002 | Hsu et al. |
| 6,342,570 B1 | 1/2002 | Bothe |
| 6,346,170 B1 | 2/2002 | Bower |
| 6,364,934 B1 | 4/2002 | Nandu |
| 6,367,929 B1 | 4/2002 | Maiden |
| 6,410,616 B1 | 6/2002 | Harada |
| 6,428,839 B1 | 8/2002 | Künzler |
| 6,436,481 B1 | 8/2002 | Chabrecek |
| 6,440,366 B1 | 8/2002 | Salpekar |
| 6,440,571 B1 | 8/2002 | Valint, Jr. |
| 6,447,920 B1 | 9/2002 | Chabrecek |
| 6,451,871 B1 | 9/2002 | Winterton |
| 6,465,056 B1 | 10/2002 | Chabrecek |
| 6,465,602 B2 | 10/2002 | Schroeder |
| 6,478,423 B1 | 11/2002 | Turner |
| 6,479,227 B1 | 11/2002 | Kubo |
| 6,482,221 B1 | 11/2002 | Hebert |
| 6,500,481 B1 | 12/2002 | Vanderlaan |
| 6,517,678 B1 | 2/2003 | Shannon |
| 6,521,352 B1 | 2/2003 | Chabrecek |
| 6,531,432 B2 | 3/2003 | Molock |
| 6,534,559 B1 | 3/2003 | Vanderlaan |
| 6,537,614 B1 | 3/2003 | Wei |
| 6,551,267 B1 | 4/2003 | Cohen |
| 6,582,754 B1 | 6/2003 | Pasic |
| 6,586,038 B1 | 7/2003 | Chabrecek |
| 6,586,520 B1 | 7/2003 | Canorro |
| 6,589,665 B2 | 7/2003 | Chabrecek |
| 6,596,294 B2 | 7/2003 | Lai |
| 6,599,559 B1 | 7/2003 | McGee |

(56) References Cited

U.S. PATENT DOCUMENTS

| | | | |
|---|---|---|---|
| 6,602,930 B2 | 8/2003 | Imafuku |
| 6,614,516 B2 | 9/2003 | Epstein |
| 6,623,747 B1 | 9/2003 | Chatelier |
| 6,623,786 B2 | 9/2003 | Baron |
| 6,627,124 B1 | 9/2003 | Herbrechtsmeier |
| 6,630,243 B2 | 10/2003 | Valint, Jr. |
| 6,638,563 B2 | 10/2003 | McGee |
| 6,673,447 B2 | 1/2004 | Wei |
| 6,683,062 B2 | 1/2004 | Opolski |
| 6,686,054 B2 | 2/2004 | Nigam |
| 6,689,480 B2 | 2/2004 | Shimoyama |
| 6,699,435 B2 | 3/2004 | Salpekar |
| 6,719,929 B2 | 4/2004 | Winterton |
| 6,730,366 B2 | 5/2004 | Lohmann |
| 6,733,123 B2 | 5/2004 | Polzhofer |
| 6,734,321 B2 | 5/2004 | Chabrecek |
| 6,740,336 B2 | 5/2004 | Trubetskoy |
| 6,743,878 B2 | 6/2004 | Bowers et al. |
| 6,762,264 B2 | 7/2004 | Künzler et al. |
| 6,793,973 B2 | 9/2004 | Winterton |
| 6,794,456 B2 | 9/2004 | Grobe, III |
| 6,800,225 B1 | 10/2004 | Hagmann |
| 6,811,805 B2 | 11/2004 | Gilliard |
| 6,822,016 B2 | 11/2004 | McCabe |
| 6,835,410 B2 | 12/2004 | Chabrecek |
| 6,838,491 B1 | 1/2005 | Vanderlaan |
| 6,858,310 B2 | 2/2005 | McGee |
| 6,866,936 B2 | 3/2005 | Opolski |
| 6,866,938 B2 | 3/2005 | Mori |
| 6,867,245 B2 | 3/2005 | Iwata |
| 6,878,399 B2 | 4/2005 | Chabrecek |
| 6,884,457 B2 | 4/2005 | Gilliard |
| 6,891,010 B2 | 5/2005 | Kunzler |
| 6,896,926 B2 | 5/2005 | Qiu |
| 6,902,812 B2 | 6/2005 | Valint, Jr. |
| 6,921,802 B2 | 7/2005 | Künzler |
| 6,923,538 B2 | 8/2005 | Dean |
| 6,923,978 B2 | 8/2005 | Chatelier |
| 6,926,965 B2 | 8/2005 | Qiu |
| 6,936,641 B2 | 8/2005 | Molock |
| 6,940,580 B2 | 9/2005 | Winterton |
| 7,018,688 B2 | 3/2006 | Shepherd |
| 7,032,251 B2 | 4/2006 | Janssen |
| 7,052,131 B2 | 5/2006 | McCabe |
| 7,091,283 B2 | 8/2006 | Müller |
| 7,160,953 B2 | 1/2007 | Bowers |
| 7,238,750 B2 | 7/2007 | Müller |
| 7,247,692 B2 | 7/2007 | Laredo |
| 7,249,848 B2 | 7/2007 | Laredo |
| 7,268,189 B2 | 9/2007 | Müller |
| 7,270,678 B2 | 9/2007 | Valint, Jr. |
| 7,297,725 B2 | 11/2007 | Winterton |
| 7,344,607 B2 | 3/2008 | Melzer |
| 7,360,890 B2 | 4/2008 | Back |
| 7,364,723 B1 | 4/2008 | Nakada |
| 7,384,590 B2 | 6/2008 | Kelly |
| 7,387,759 B2 | 6/2008 | Kelly |
| 7,396,890 B2 | 7/2008 | Zanini |
| 7,399,795 B2 | 7/2008 | Lai |
| 7,422,710 B2 | 9/2008 | Turner |
| 7,423,074 B2 | 9/2008 | Lai |
| 7,426,993 B2 | 9/2008 | Coldrey |
| 7,428,029 B2 | 9/2008 | Murakami |
| 7,429,558 B2 | 9/2008 | Batchelor |
| 7,429,623 B2 | 9/2008 | Molock |
| 7,435,452 B2 | 10/2008 | Shimoyama |
| 7,452,377 B2 | 11/2008 | Watling |
| 7,461,937 B2 | 12/2008 | Steffen |
| 7,521,519 B1 | 4/2009 | Hirt |
| 7,540,609 B2 | 6/2009 | Chen |
| 7,556,858 B2 | 7/2009 | Rasmussen |
| 7,572,841 B2 | 8/2009 | Chen |
| 7,588,334 B2 | 9/2009 | Matsushita |
| 7,632,876 B2 | 12/2009 | Lai |
| 7,691,917 B2 | 4/2010 | Lai |
| 7,726,809 B2 | 6/2010 | Filippo |
| 7,781,536 B2 | 8/2010 | Kamiya |
| 7,781,554 B2 | 8/2010 | Lai |
| 7,789,509 B2 | 9/2010 | Mentak |
| 7,832,856 B2 | 11/2010 | Vanderbilt |
| 7,841,716 B2 | 11/2010 | McCabe |
| 7,847,025 B2 | 12/2010 | Liu |
| 7,857,447 B2 | 12/2010 | Myung |
| 7,875,687 B2 | 1/2011 | Kunzler |
| 7,879,267 B2 | 2/2011 | Turner |
| 7,919,136 B2 | 4/2011 | Linhardt |
| 8,147,897 B2 | 4/2012 | Ferreiro |
| 8,383,744 B2 | 2/2013 | Justynska |
| 8,480,227 B2 * | 7/2013 | Qiu et al. ................ 351/159.33 |
| 8,529,057 B2 * | 9/2013 | Qiu et al. ................ 351/159.33 |
| 8,637,621 B2 | 1/2014 | Iwata |
| 2001/0019762 A1 | 9/2001 | Nazarova |
| 2002/0016383 A1 | 2/2002 | Iwata |
| 2002/0120084 A1 | 8/2002 | Valint, Jr. |
| 2002/0149742 A1 | 10/2002 | Back |
| 2002/0182315 A1 | 12/2002 | Heiler |
| 2003/0039748 A1 | 2/2003 | Valint, Jr. |
| 2003/0186825 A1 | 10/2003 | Mitani |
| 2004/0116564 A1 | 6/2004 | Devlin |
| 2004/0170752 A1 | 9/2004 | Luthra |
| 2004/0192872 A1 | 9/2004 | Iwata |
| 2005/0060812 A1 | 3/2005 | Batchelor |
| 2006/0063852 A1 | 3/2006 | Iwata |
| 2006/0100113 A1 | 5/2006 | Pegram et al. |
| 2006/0142410 A1 | 6/2006 | Baba |
| 2006/0211789 A1 | 9/2006 | Iwata |
| 2006/0217276 A1 | 9/2006 | Mitani |
| 2007/0066706 A1 | 3/2007 | Manesis |
| 2007/0122540 A1 | 5/2007 | Salamone |
| 2007/0149428 A1 | 6/2007 | Ammon, Jr. |
| 2007/0185281 A1 | 8/2007 | Song |
| 2007/0229758 A1 | 10/2007 | Matsuzawa |
| 2007/0296914 A1 | 12/2007 | Hong |
| 2008/0003259 A1 | 1/2008 | Salamone |
| 2008/0015315 A1 | 1/2008 | Chang |
| 2008/0017525 A1 | 1/2008 | Newman |
| 2008/0100796 A1 | 5/2008 | Pruitt |
| 2008/0110770 A1 | 5/2008 | Burke |
| 2008/0138310 A1 | 6/2008 | Ketelson |
| 2008/0142038 A1 | 6/2008 | Kunzler |
| 2008/0143003 A1 | 6/2008 | Phelan |
| 2008/0143957 A1 | 6/2008 | Linhardt |
| 2008/0143958 A1 | 6/2008 | Medina |
| 2008/0148689 A1 | 6/2008 | Xia |
| 2008/0152540 A1 | 6/2008 | Schorzman |
| 2008/0152800 A1 | 6/2008 | Bothe |
| 2008/0170201 A1 | 7/2008 | Filippo |
| 2008/0174035 A1 | 7/2008 | Winterton |
| 2008/0226922 A1 | 9/2008 | Ferreiro |
| 2008/0231798 A1 | 9/2008 | Zhou |
| 2008/0234457 A1 | 9/2008 | Zhou |
| 2008/0273168 A1 | 11/2008 | Rathore |
| 2008/0275156 A1 | 11/2008 | Laredo |
| 2008/0306455 A1 | 12/2008 | Dias |
| 2008/0307751 A1 | 12/2008 | Newman |
| 2008/0314767 A1 | 12/2008 | Lai |
| 2009/0036577 A1 | 2/2009 | Luo |
| 2009/0100801 A1 | 4/2009 | Zhao |
| 2009/0111942 A1 | 4/2009 | Lang |
| 2009/0141234 A1 | 6/2009 | Blackwell |
| 2009/0142485 A1 | 6/2009 | Lai |
| 2009/0142508 A1 | 6/2009 | Lai |
| 2009/0145086 A1 | 6/2009 | Reynolds |
| 2009/0145091 A1 | 6/2009 | Connolly |
| 2009/0168012 A1 | 7/2009 | Linhardt |
| 2009/0169716 A1 | 7/2009 | Linhardt |
| 2009/0171027 A1 | 7/2009 | Linhardt |
| 2009/0171049 A1 | 7/2009 | Linhardt |
| 2009/0171050 A1 | 7/2009 | Linhardt |
| 2009/0171459 A1 | 7/2009 | Linhardt |
| 2009/0173044 A1 | 7/2009 | Linhardt |
| 2009/0173045 A1 | 7/2009 | Lai |
| 2009/0173643 A1 | 7/2009 | Lai |
| 2009/0182067 A1 | 7/2009 | Liu |

(56) References Cited

U.S. PATENT DOCUMENTS

| | | |
|---|---|---|
| 2009/0200692 A1 | 8/2009 | Chang |
| 2009/0264553 A1 | 10/2009 | Chen |
| 2009/0280157 A1 | 11/2009 | Maas |
| 2010/0029802 A1 | 2/2010 | Mehrabi |
| 2010/0048847 A1 | 2/2010 | Broad |
| 2010/0069544 A1 | 3/2010 | Wanders |
| 2010/0084775 A1 | 4/2010 | McCabe |
| 2010/0118261 A1 | 5/2010 | McGee |
| 2010/0127219 A1 | 5/2010 | Mohamed |
| 2010/0149482 A1 | 6/2010 | Ammon, Jr. |
| 2010/0152084 A1 | 6/2010 | Rathore |
| 2010/0162661 A1 | 7/2010 | Vanderbilt |
| 2010/0162663 A1 | 7/2010 | McGee |
| 2010/0249356 A1 | 9/2010 | Rathore |
| 2010/0296049 A1 | 11/2010 | Justynska |
| 2010/0298446 A1 | 11/2010 | Chang |
| 2010/0300902 A1 | 12/2010 | Marmo |
| 2011/0009519 A1 | 1/2011 | Awasthi |
| 2011/0009587 A1 | 1/2011 | Awasthi |
| 2011/0015298 A1 | 1/2011 | Schorzman |
| 2011/0102736 A1 | 5/2011 | Wu |
| 2011/0134387 A1 | 6/2011 | Samuel |
| 2011/0211158 A1 | 9/2011 | Iwata |
| 2012/0029111 A1* | 2/2012 | Chang et al. ............ 523/107 |
| 2012/0314185 A1 | 12/2012 | Bauman |

FOREIGN PATENT DOCUMENTS

| | | |
|---|---|---|
| EP | 0335308 A2 | 10/1989 |
| EP | 0362137 A2 | 4/1990 |
| EP | 0362145 A2 | 4/1990 |
| EP | 0393532 A2 | 10/1990 |
| EP | 0455323 A2 | 11/1991 |
| EP | 0480809 A2 | 4/1992 |
| EP | 0574352 A1 | 12/1993 |
| EP | 0613381 B1 | 3/1994 |
| EP | 0643083 A1 | 3/1995 |
| EP | 0713106 A1 | 5/1996 |
| EP | 0537972 B1 | 7/1996 |
| EP | 0728487 A1 | 8/1996 |
| EP | 0747071 A1 | 12/1996 |
| EP | 0751407 A2 | 1/1997 |
| EP | 0758687 A1 | 2/1997 |
| EP | 0780419 A1 | 6/1997 |
| EP | 0832618 A1 | 4/1998 |
| EP | 0894504 A2 | 2/1999 |
| EP | 0940447 A2 | 9/1999 |
| EP | 0940693 A2 | 9/1999 |
| EP | 1149198 B1 | 6/2000 |
| EP | 1214383 B1 | 1/2001 |
| EP | 1272353 B1 | 9/2001 |
| EP | 1153964 A2 | 11/2001 |
| EP | 0963761 B1 | 10/2003 |
| EP | 1272353 B1 | 12/2003 |
| EP | 1569702 B1 | 6/2004 |
| EP | 1287060 B1 | 11/2005 |
| EP | 1214383 B1 | 12/2005 |
| EP | 1179190 B1 | 4/2006 |
| EP | 0865326 B1 | 8/2006 |
| EP | 1754731 A1 | 2/2007 |
| EP | 1861069 B1 | 4/2009 |
| EP | 1802357 B1 | 12/2009 |
| EP | 1945688 B1 | 12/2010 |
| JP | 61209275 A2 | 9/1986 |
| JP | 08239639 A | 9/1996 |
| JP | 2001075060 A | 3/2001 |
| WO | 8909246 A1 | 10/1989 |
| WO | 9104283 A1 | 4/1991 |
| WO | 9209639 A2 | 6/1992 |
| WO | 9209650 A1 | 6/1992 |
| WO | 9300391 A1 | 1/1993 |
| WO | 9406485 A1 | 3/1994 |
| WO | 9504609 A1 | 2/1995 |
| WO | 9618498 A1 | 6/1996 |
| WO | 9620796 A1 | 7/1996 |
| WO | 9624392 A1 | 8/1996 |
| WO | 9637241 A1 | 11/1996 |
| WO | 9700274 A1 | 1/1997 |
| WO | 9718904 A1 | 5/1997 |
| WO | 9721497 A1 | 6/1997 |
| WO | 9723532 A1 | 7/1997 |
| WO | 9729160 A1 | 8/1997 |
| WO | 9821270 A1 | 5/1998 |
| WO | 9828026 A1 | 7/1998 |
| WO | 9833089 A1 | 7/1998 |
| WO | 9915917 A1 | 4/1999 |
| WO | 9935520 A1 | 7/1999 |
| WO | 0037385 A1 | 6/2000 |
| WO | 0157118 A2 | 8/2001 |
| WO | 03011551 A1 | 2/2003 |
| WO | 03037960 A1 | 5/2003 |
| WO | 03059967 A1 | 7/2003 |
| WO | 2004050132 A2 | 6/2004 |
| WO | 2006038080 A2 | 4/2006 |
| WO | 2008076506 A1 | 6/2008 |
| WO | 2008095955 A1 | 8/2008 |
| WO | 2011071791 A1 | 6/2011 |
| WO | 2012016098 A1 | 2/2012 |
| WO | 2012170603 A1 | 12/2012 |

OTHER PUBLICATIONS

Authors: Miriam V. Flores-Merino, Somyot Chirasatitsin, Caterina Lopresti, Gwendolen C. Reilly, Giuseppe Battaglia and Adam J. Engler. Name of Article: Nanoscopic mechanical anisotropy in hydrogel surfaces Published: The Royal Society of Chemistry 2010; Soft Matter.

Authors: Seong Han Kim, Aric Opdahl, Chris Marmo, Gabor A. Somorjai Name of Article: AFM and SFG studies of pHEMA-based hydrogel contact lens surfaces in saline solution; adhesion, friction, and the presence of non-crosslinked polymer chains at the surface. Published: Biomaterials, 2002, vol. 23; pp. 1657-1666.

Authors: Joël Baguet, Françoise Sommer, Tran Minh Duc Name of Article: Imaging surfaces of hydrophilic contact lenses with the atomic force microcope Published: Biomaterials 1993, vol. 14, No. 4 pp. 279-284.

Authors: Francesco Fornasiero, Florian Krull, John M. Prausnitz, Clayton J. Radke Name of Article: Steady-state diffusion of water through soft-contact-lens materials Published: Biiomaterials, 2005, vol. 26, pp. 5704-5716.

Authors: Joël Baguet, Françoise Sommer, Véronique Claudon-Eyl, Tran Minh Duc Name of Article: Characterization of lacrymal component accumulation on worn soft contact lens surfaces by atomic force microscopy. Published: Biomateials 1995, vol. 16, No. 1, pp. 3-9.

Authors: L. Jones, C. May, L. Nazar, T Simpson. Name of Article: In Vitro evaluation of the dehydration characteristics of silicone hydrogel and conventional hydrogel contact lens materials. Published: Contact Lens & Anterior Eye, 2002, vol. 25, pp. 147-156.

Authors: Ioannis Tranoudis, Nathan Efron Name of Article: Water properties of soft contact lens materials Published: Contact Lens & Anterior Eye, 2004, vol. 27, pp. 193-208.

Authors: Sudi Patel, Waheeda Illahi, Arthur Davies Name of Article: Changes in water content of high plus hydrogel lenses worn on an extended wear basis in a geriatiric aphakic population Published: Contact Lens & Anterior Eye 2005, vol. 28, pp. 127-134.

Authors: Seong Han Kim, Chris Marmo, Gabor A Somorjai Name of Article: Friction studies of hydrogel contact lenses using AFM: non-crosslinked polymers of low friction at the surface Published: Biomaterials 2001, vol. 22, pp. 3285-3294.

Authors: Jeannine E. Elliott, Mara MacDonald, Jun Nie, Christopher N. Bowman Name of Article: Structure and swelling of poly(acrylic acid) hydrogels: effect of pH, ionic strength, and dilution on the crosslinked polymer structure Published: Polymer 2004, vol. 45, pp. 1503-1510.

(56) References Cited

OTHER PUBLICATIONS

Authors: M.D. Merindano, M. Canals, C. Saona and J. Costa Name of Article: Rigid gas permeable contact lenses surface roughness examined by interferential shifting phase and scanning electron microscopies Published: Ophthal. Physiol. Opt. 1998, vol. 18, No. 1, pp. 75-82.

Authors: K.J. Stout, L Blunt Name of Article: Nanometres to micrometres: three-dimensional surface measurement in bio-engineering Published: Surface and Coatings Technology 1995, vol. 71, pp. 69-81.

Authors: Gavin Hoch, Anuj Chauhan, C.J. Radke Name of Article: Permeability and diffusivity for water transport through hydrogel membranes Published: Journal of Membrane Science 2003, vol. 214, pp. 199-209.

Authors: F. Fornasiero, J.M. Prausnitz, C.J. Radke Name of Article: Post-lens tear-film depletion due to evaporative dehydration of a soft contact lens Published: Journal of Membrane Science 2006, vol. 275, pp. 229-243.

Authors: Jian Ping Gong, Takayuki Kurokawa, Tetsuhara Narita, Go Kagata, Yoshihito Osada, Goro Nishimura, and Masataka Kinjo Name of Article: Synthesis of Hydrogels with Extremely Low Surface Friction Published: J. Am. Chem. Soc 2001, vol. 123, pp. 5582-5583.

Authors: Carol E. Rabke, Paul L. Valint, Jr., and Daniel M. Ammo Name of Article: Ophthalmic applications of Atomic Force Microscopy Published: ICLC Jan./Feb. 1995, vol. 22, pp. 32-41.

Authors: George L. Grobe III, Paul L. Valint, Jr. and Daniel M. Ammon, Jr. Name of Article: Surface chemical structure for soft contact lenses a a function of polymer processing Published: Journal of Biomedical Materials Research, 1996, vol. 32, pp. 45-54.

Authors: Gerald E. Lowther Name of Article: Hydrophilic Lens Inspection with Phase Contrast Microscopy Published: American Journal of Optometry & Physiological Optics, Aug. 1981, vol. 58, No. 8, pp. 621-625.

Authors: A. M. Jin and D. Dowson Name of Article: Elastohydrodynamic lubrication in biological systems Published: Proc. IMechE, vol. 219, Part J: J. Engineering Tribology, Special Issue Paper, pp. 367-380.

Authors: Sean L. Willis, Jane L. Court, Richard P. Redman, Jin-Hai Wang, Simon W. Leppard, Vincent J. O'Byrne, Sharon A. Small, Andrew L. Lewis, Stephen A. Jones, Peter W. Stratford Name of Article: A novel phosphorylcholine-coated contact lens for extended wear use Published: Biomaterials 2001, vol. 22, pp. 3261-3272.

Authors: Lyndon Jones, Lakshman Subbaraman, Ronan Rogers and Kathy Dumbleton Name of Article: Surface treatment, wetting and modulus of silicone hydrogels Published: Contact Lens Monthly, Optician, Sep. 1, 2001, vol. 232, No. 6067, pp. 28-34.

Authors: Oğuz Okay, Safiye B. Sariisik Name of Article: Swelling behavior of poly(acrylamide-co-sodium acrylate) hydrogels in aqueous salt solutions: theory versus experiments Published: European Polymer Journal 2000, vol. 36, pp. 393-399.

Authors: Murat Guvendiren, Jason A. Burdick and Shu Yang Name of Article: Kinetic study of welling-induced surface pattern formation and ordering in hydrogel films with depth-wise crosslinking gradient Published: The Royal Society of Chemistry 2010 / Soft Matter, 2010, vol. 6, pp. 2044-2049.

Authors: R.E.Imhof, D.J.S. Birch, F.R. Thornley and J.R. Gilchrist Name of Article: Opto-thermal Transient Emission Radiometry: a New surface Analysis Technique Published: Analytical Proceedings, Jan. 1987, vol. 24, pp. 17-18.

Authors: David A. Tirrell, Doreen Y. Takigawa, and Kenji Seki Name of Article: pH Sensitization of Phospholipid Vesicles via Complexation with Synthetic Poly(carboxylic acid)s Published: Annals New York Academy of Sciences, pp. 237-248.

Authors: F.M. Serry Name of Article: Applications of Atomic Force Microscopy for Contact Lens Manufacturing Published: Veeco Instruments, Inc. AN22, Rev A1, Jun. 1, 2004.

Authors: Peng Xiao, Robert E. Imhof Name of Article: Opto-Thermal Skin Water Concentration Gradient Measurement Published: Proceedings of SPIE Laser-Tissue Interaction VII, vol. 2681, pp. 31-34 (1996).

Authors: Christopher Snyder, OD, MS, FAAO Name of Article: A Primer on Contact Lens Materials, Different ingredients and manufacturing processes determine the properties and characteristics of modern contact lens materials. Published: Contact Lens Spectrum, 19(2); pp. 34-39 (2004).

Authors: Ronan Rogers Name of Article: In vetro and ex vivo wettability of hydrogel contact lenses Published: Thesis (presented to University of Waterloo), Waterloo, Ontario, Canada 2006.

Authors: Gareth Ross, Muriel Nasso, Val Franklin, Fiona Lydon and Brian Tighe Name of Article: Silicone Hydrogels: Trends in Products and Properties Published: Poster, British Contact Lens Association Conference, Brighton, Dec. 2005.

Authors: V. Rebeix, F. Sommer, B. Marchin, D. Baude, Tran Minh Duc Name of Article: Artificial tear adsorption on soft contact lenses: methods to test surfactant efficacy Published: Biomaterials, 2000, vol. 21, pp. 1197-1205.

Search Result No. 1.

PCT International Search report dated Dec. 9, 2011 International Application No. PCT/US2011/045808, International Filing Date Jul. 29, 2011.

PCT Written Opinion of the International Searching Authority dated Dec. 9, 2011, International Application No. PCT/US2011/045808, International Filing Date Jul. 29, 2011.

Authors: Kazuo Sugiyama, Koji Ohga; Title: Surface modified poly(methyl methacrylate) with 1-methyl-2-methacrylamidoethyl phosphorylcholine moiety; Published in: Macromol. Chem. Phys. 1999; vol. 200, No. 6; pp. 1439-1445.

Authors: Niklas Bühler, Hans-Peter Haerri, Manfred Hofmann, Christin Irrgagn, Andreas Mühlebach, Beat Müller, and Friedrich Stockinger; Title: Nelfilcon A, a New Material for Contact Lenses; Industrial Chemistry; 1999; Chimia 53, No. 6; pp. 269-274.

Search Report No. 1, Dec. 21, 2009.

Search Report No. 2, Dec. 11, 2009.

Author: Jan Domke and Manfred Radmacher Title: Measuring the Elastic Properties of Thin Polymer Films with the Atomic Force Microscope Published: Langmuir 1998, vol. 14, No. 12, pp. 3320-3325 (1998 American Chemical Society).

Author: Gonzalez-Meijome JM, Almeida JB and Parafita MA Title: Analysis of Surface Mechanical Properties of Unworn and Worn Silicone Hydrogel Contact Lenses Using Nanoindentation with AFM Published: Microscopy: Science, Technology, Applications and Education, pp. 554-559 (A.Méndez-Vilas and J. Díaz (Eds.)), Formatex Research Center, Badajoz, Spain (2010).

Authors: Sweers, Kim, Kees Van Der Werf, Martin Bennink, and Vinod Subramaniam Title: Nanomechanical properties of a-synuclein amyloid fibrils: a comparative study by nanoindentation, harmonic force microscopy and Peakforce QNM Published: Nanoscale Research Letters 2011, 6:270.

Authors: N. Dilsiz and G. Akovali Title: Plasma Polymerization of Selected Organic Compounds Published: Polymer, (1996) vol. 37, No. 2, pp. 333-342.

Author: Frank Jansen, Ph.D. Title: Plasma Deposited Thin Films (Chapter 1) Published in: Plasma Deposition Processes (19), CRC Press (1986), Boca Raton, FL, Editors: F. Jansen and J. Mort, Ph.D.

Author: H. Yasuda Title: Glow Discharge Polymerization Published: Journal of Polymer Science: Macromolecular Reviews, vol. 16 (1981), pp. 199-293.

Author: D. M. Mattox Title: The Application of Plasmas to Thin Film Deposition Processes Published: Plasma-Surface Interactions and Processing of Materials, Kluwer Academic Publishers in NATO ASI Series; Series E: Applied Scieces, vol. 176 (1990), pp. 377-399 Editors: O. Auciello, Alberto Gras-Martí, Jose Antonio Valles-Abarca, Daniel L. Flamm.

Authors: Yu-Chin Lai and Gary D. Friends Title: Surface Wettability Enhancement of Silicone Hydrogel Lenses by Processing with Polar Plastic Molds Published: Journal of Biomedical Materials Research, Wiley, New York, NY Series: vol. 35, Jan. 1, 1997, pp. 349-356, ISSN: 0021-9304.

(56) References Cited

OTHER PUBLICATIONS

European Patent Office Communication of a Notice of Opposition dated Feb. 14, 2014, European Application No: 11813220.8, European Patent No. EP2461767.

SEE3™ (Lotrafilcon A) Soft Contact Lens 510(k) Summary of Safety and Substantial Equivalence; May 9, 1997; pp. 1-4.

English Translation of Japan Office Action Notification of Reasons for Rejection, Dispatch No: 197746, Dispatch Date: Apr. 1, 2014, Japanese Patent Application No: 2013-521992.

Authors: Yu-Chin Lai, Gary D. Friends Article: Surface Wettability Enhancement of Silicone Hydrogel Lenses by Processing with Polar Plastic Molds Published: Journal of Biomedical Materials Research, vol. 35, (1997) pp. 349-356.

* cited by examiner

A

B

C

A

B

C

SILICONE HYDROGEL LENSES WITH WATER-RICH SURFACES

This application is a continuation of application Ser. No. 13/193,653 filed 29 Jul. 2011, which claims the benefits under 35 USC §119 (e) of U.S. provisional application Nos. 61/369,102 filed 30 Jul. 2010 and 61/448,478 filed 2 Mar. 2011, incorporated by reference in their entireties.

The present invention generally relates to an ophthalmic device, especially a silicone hydrogel contact lens which has a lens structural configuration creating a water content gradient and comprises: a silicone hydrogel bulk material having a water content (designated as $WC_{SiHy}$) of from about 10% to about 70% by weight and an outer surface layer that has a thickness of about 0.1 to about 20 μm and completely covers the silicone hydrogel bulk material and is made of a hydrogel material totally or substantially free of silicone and having a higher water content characterized by a water-swelling ratio of at least about 100% if $WC_{SiHy} \leq 45\%$ or by a water-swelling ratio of at least about $[120 \cdot WC_{SiHy}/(1-WC_{SiHy})]\%$ if $WC_{SiHy} > 45\%$, as measured by AFM with a cross section of the silicone hydrogel contact lens in fully hydrated state.

BACKGROUND

Silicone hydrogel (SiHy) contact lenses are widely used for correcting many different types of vision deficiencies. They are made of a hydrated, crosslinked polymeric material that contains silicone and a certain amount of water within the lens polymer matrix at equilibrium. According to the FDA's contact lens classification, hydrogel contact lenses are generally classified into two main categories: low water content contact lenses (containing less than 50% of water) and high water content contact lenses (containing greater than 50% of water). For SiHy contact lenses, high oxygen permeability, which is required for a contact lens to have minimal adverse effects upon corneal health, is achieved by incorporating silicone, not by increasing water content, in the crosslinked polymeric material. As a result, unlike conventional hydrogel contact lenses, SiHy contact lenses can have a low water content while still having a relatively high oxygen permeability (Dk), for example, Focus® Night & Day® from CIBA Vision Corporation (ca. 23.5% $H_2O$ and Dk~140 Barrers; Air Optix® from CIBA Vision Corporation (ca. 33% $H_2O$ and Dk~110 Barrers); PureVision® from Bausch & Lomb (ca. 36% $H_2O$ and Dk~100 Barrers); Acuvue® Oasys® from Johnson & Johnson (ca. 38% $H_2O$, Dk~105 Barrers); Acuvue® Advance® from Johnson & Johnson (ca. 47% $H_2O$, Dk~65 Barrers); Acuvue® TruEye™ from Johnson & Johnson (ca. 46% $H_2O$, Dk~100 Barrers); Biofinity® from CooperVision (ca. 48% $H_2O$, Dk~128 Barrers); Avaira™ from CooperVision (ca. 46% $H_2O$, Dk~100 Barrers); and PremiO™ from Menicon (ca. 40% $H_2O$, Dk~129 Barrers).

Water in a SiHy contact lens can provide the desirable softness that enable a SiHy lens to be worn for sufficiently long periods of time and provides patients with the benefits including adequate initial comfort (i.e., immediately after lens insertion), relatively short period of adapting time required for a patient to become accustomed to them, and/or proper fit. Higher water content would be desirable for providing SiHy contact lenses with biocompatibility and comfort. But, there is a limit to the amount of water (believed to be 80%) that a SiHy contact lens can contain while still possessing sufficient mechanical strength and rigidity required for a contact lens, like conventional hydrogel contact lenses. Moreover, high water content could also have undesired consequences. For instance, oxygen permeability of a SiHy contact lens could be compromised by increasing water content. Further, high water content in a SiHy lens could result in greater in-eye dehydration and consequently dehydration-induced wearing discomfort, because a SiHy contact lens with a high water content could deplete the limited supply of tears (water) of the eye. It is believed that in-eye dehydration may be derived from evaporation (i.e., water loss) at the anterior surface of the contact lens and such water loss is primarily controlled by water diffusion through a lens from the posterior surface to the anterior surface, and that the rate of diffusion is closely proportional to the water content of the lens bulk material at equilibrium (L. Jones et al., Contact Lens & Anterior Eye 25 (2002) 147-156, herein incorporated by reference in its entirety).

Incorporation of silicone in a contact lens material also has undesirable effects on the biocompatibility of the contact lens, because silicone is hydrophobic and has great tendency to migrate onto the lens surface being exposed to air. As a result, a SiHy contact lens will generally require a surface modification process to eliminate or minimize the exposure of silicone of the contact lens and to maintain a hydrophilic surface, including, for example, various plasma treatments (e.g., Focus® Night & Day® and Air Optix® from CIBA Vision Corporation; PureVision® from Bausch & Lomb; and PremiO™ from Menicon); internal wetting agents physically and/or chemically embedded in the SiHy polymer matrix (e.g., Acuvue® Oasys®, Acuvue® Advance® and Acuvue® TruEye™ from Johnson & Johnson; Biofinity® and Avaira™ from CooperVision). Although surface modification techniques used in the commercial SiHy lens production may provide fresh (unused) SiHy lenses with adequately hydrophilic surfaces, a SiHy lenses worn in the eye may have dry spots and/or hydrophobic surface areas created due to air exposure, shearing forces of the eyelids, silicone migration, and/or partial failure to prevent silicone from exposure. Those dry spots and/or hydrophobic surface areas are non-wettable and susceptible to adsorbing lipids or proteins from the ocular environment and may adhere to the eye, causing patient discomfort.

Therefore, there are still needs for SiHy contact lenses with hydrophilic surfaces that have a persistent hydrophilicity, wettability, and lubricity that can be maintained in the eye throughout the entire day.

SUMMARY OF THE INVENTION

The present invention can satisfy the needs for SiHy contact lenses with hydrophilic surfaces that have a persistent surface hydrophilicity, surface wettability and surface lubricity in the eye throughout the entire day.

In one aspect, the invention provides a hydrated silicone hydrogel contact lens which comprises: an anterior (convex) surface and an opposite posterior (concave) surface; and a layered structural configuration from the anterior surface to the posterior surface, wherein the layered structural configuration includes an anterior outer hydrogel layer, an inner layer of a silicone hydrogel material, and a posterior outer hydrogel layer, wherein the silicone hydrogel material has an oxygen permeability (Dk) of at least about 50, preferably at least about 60, more preferably at least about 70, even more preferably at least about 90 barrers, most preferably at least about 110 Barrers, and a first water content (designated as $WC_{SiHy}$) of from about 10% to about 70%, preferably from about 10% to about 65%, more preferably from about 10% to about 60%, even more preferably from about 15% to about 55%, most preferably from about 15% to about 50% by weight, wherein the anterior and posterior outer hydrogel layers are substantially uniform in thickness and merge at the peripheral edge of the contact lens to completely enclose the inner layer of the silicone hydrogel material, wherein the anterior and posterior outer hydrogel layers independent of each other have a second water content higher than $WC_{SiHy}$, as characterized either by having a water-swelling ratio (designated as WSR) of at least about 100% (preferably at least about 150%, more preferably at least about 200%, even more preferably at least about 250%, most preferably at least about 300%) if $WC_{SiHy} \leq 45\%$, or by having a water-swelling ratio of at least about $[120 \cdot WC_{SiHy}/(1-WC_{SiHy})]\%$ (preferably $[130 \cdot WC_{SiHy}/(1-WC_{SiHy})]\%$ more preferably $[140 \cdot WC_{SiHy}/(1-WC_{SiHy})]\%$, even more preferably $[150 \cdot WC_{SiHy}/(1-WC_{SiHy})]\%)$ if WC>45%, wherein the thickness of each of the anterior and posterior outer hydrogel layers is from about 0.1 μm to about 20 μm, preferably from about 0.25 μm to about 15 μm, more preferably from about 0.5 μm to about 12.5 μm, even more preferably from about 1 μm to about 10 μm (as measured with atomic force microscopy across a cross section from the posterior surface to the anterior surface of the silicone hydrogel contact lens in fully hydrated state).

In another aspect, the invention provides a hydrated silicone hydrogel contact lens. A hydrated silicone hydrogel contact lens of the invention comprises: a silicone hydrogel material as bulk material, an anterior surface and an opposite posterior surface; wherein the contact lens has an oxygen transmissibility of at least about 40, preferably at least about 60, more preferably at least about 80, even more preferably at least about 110 barrers/mm, and a cross-sectional surface-modulus profile which comprises, along a shortest line between the anterior and posterior surfaces on the surface of a cross section of the contact lens, an anterior outer zone including and near the anterior surface, an inner zone including and around the center of the shortest line, and a posterior outer zone including and near the posterior surface, wherein the anterior outer zone has an average anterior surface modulus (designated as $\overline{SM_{Ant}}$) while the posterior outer zone has an average posterior surface modulus (designated as $\overline{SM_{Post}}$), wherein the inner zone has an average inner surface modulus (designated as $\overline{SM_{Inner}}$), wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least about 20%, preferably at least about 25%, more preferably at least about 30%, even more preferably at least about 35%, most preferably at least about 40%.

In a further aspect, the invention provides a hydrated silicone hydrogel contact lens. A hydrated silicone hydrogel contact lens of the invention comprises: a silicone hydrogel material as bulk material, an anterior surface and an opposite posterior surface; wherein the contact lens has (1) an oxygen transmissibility of at least about 40, preferably at least about 60, more preferably at least about 80, even more preferably at least about 110 barrers/mm, and (2) a surface lubricity characterized by having a critical coefficient of friction (designated as CCOF) of about 0.046 or less, preferably about 0.043 or less, more preferably about 0.040 or less, wherein the anterior and posterior surfaces have a low surface concentration of negatively-charged groups including carboxylic acid groups as characterized by attracting at most about 200, preferably at most about 160, more preferably at most about 120, even more preferably at most about 90, most preferably at most about 60 positively-charged particles in positively-charged-particles-adhesion test.

These and other aspects of the invention including various preferred embodiments in any combination will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
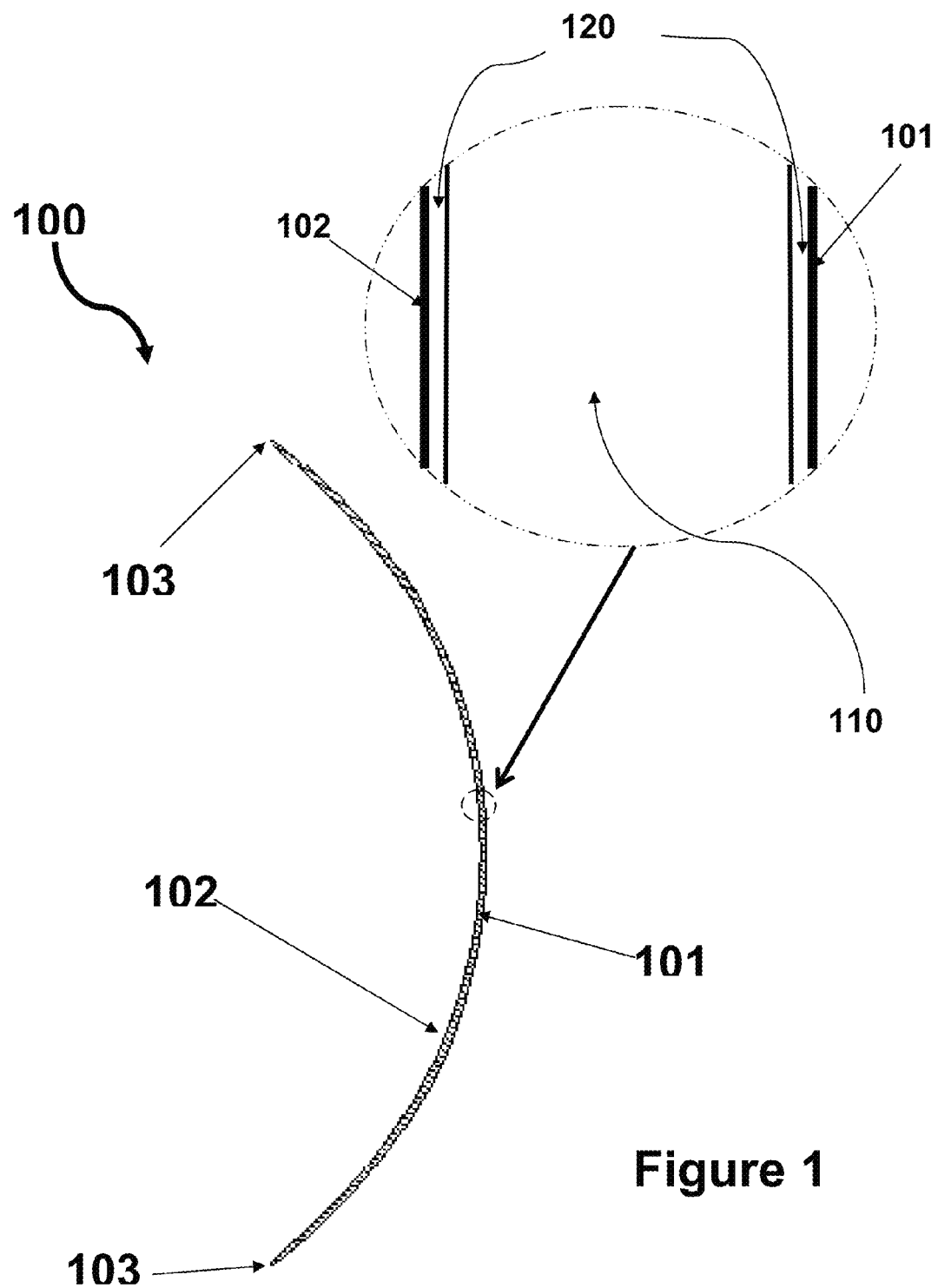
FIG. 1 schematically depicts a sectional view of the structural configuration of a SiHy contact lens according to a preferred embodiment of the invention.

Reference now will be made in detail to the embodiments of the invention. It will be apparent to those skilled in the art that various modifications, variations and combinations can be made in the present invention without departing from the scope or spirit of the invention. For instance, features illustrated or described as part of one embodiment, can be used on another embodiment to yield a still further embodiment. Thus, it is intended that the present invention cover such modifications, variations and combinations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

As used in this application, the term "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

As used in this application, the term "non-silicone hydrogel" refers to a hydrogel that is theoretically free of silicon.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

As used in this application, the term "vinylic monomer" refers to a compound that has one sole ethylenically unsaturated group and can be polymerized actinically or thermally.

As used in this application, the term "olefinically unsaturated group" or "ethylenically unsaturated group" is employed herein in a broad sense and is intended to encompass any groups containing at least one $>C=C<$ group. Exemplary ethylenically unsaturated groups include without limitation (meth)acryloyl

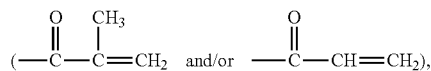

allyl, vinyl

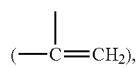

styrenyl, or other $C=C$ containing groups.

As used in this application, the term "(meth)acrylamide" refers to methacrylamide and/or acrylamide.

As used in this application, the term "(meth)acrylate" refers to methacrylate and/or acrylate.

As used in this application, the term "hydrophilic vinylic monomer" refers to a vinylic monomer which as a homopolymer typically yields a polymer that is water-soluble or can absorb at least 10 percent by weight water.

As used in this application, the term "hydrophobic vinylic monomer" refers to a vinylic monomer which as a homopolymer typically yields a polymer that is insoluble in water and can absorb less than 10 percent by weight water.

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "crosslinker" refers to a compound having at least two ethylenically unsaturated groups. A "crosslinking agent" refers to a crosslinker having a molecular weight of about 700 Daltons or less.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

As used in this application, the term "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of amine groups of the polyamine or polyamidoamine into azetidinium groups.

As used in this application, the term "azetidinium group" refers to a positively charged group of

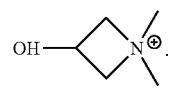

As used in this application, the term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable (i.e., greater than about 5%) for a period of about one hour.

As used in this application, the term "phosphorylcholine" refers to a zwitterionic group of

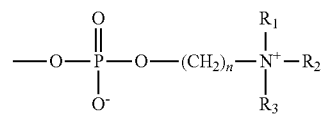

in which n is an integer of 1 to 5 and $R_1$, $R_2$ and $R_3$ independently of each other are $C_1$-$C_8$ alkyl or $C_1$-$C_8$ hydroxyalkyl.

As used in this application, the term "reactive vinylic monomer" refers to a vinylic monomer having a carboxyl group or an amino group (i.e., a primary or secondary amino group).

As used in this application, the term "non-reactive hydrophilic vinylic monomer" refers to a hydrophilic vinylic monomer which is free of any carboxyl group or amino group (i.e., primary or secondary amino group). A non-reactive vinylic monomer can include a tertiary or quaternium amino group.

As used in this application, the term "water-soluble" in reference to a polymer means that the polymer can be dissolved in water to an extent sufficient to form an aqueous solution of the polymer having a concentration of up to about 30% by weight at room temperature (defined above).

As used in this application, the term "water contact angle" refers to an average water contact angle (i.e., contact angles measured by Sessile Drop method), which is obtained by averaging measurements of contact angles.

As used in this application, the term "intactness" in reference to a coating on a SiHy contact lens is intended to describe the extent to which the contact lens can be stained by Sudan Black in a Sudan Black staining test described in Example 1. Good intactness of the coating on a SiHy contact lens means that there is practically no Sudan Black staining of the contact lens.

As used in this application, the term "durability" in reference to a coating on a SiHy contact lens is intended to describe that the coating on the SiHy contact lens can survive a digital rubbing test.

As used in this application, the term "surviving a digital rubbing test" or "surviving a durability test" in reference to a coating on a contact lens means that after digitally rubbing the lens according to a procedure described in Example 1, water contact angle on the digitally rubbed lens is still about 100 degrees or less, preferably about 90 degrees or less, more preferably about 80 degrees or less, most preferably about 70 degrees or less.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm\ Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)] \times 10^{-9}$.

The "ion permeability" through a lens correlates with the Ionoflux Diffusion Coefficient. The Ionoflux Diffusion Coefficient, D (in units of [mm²/min]), is determined by applying Fick's law as follows:

$$D = -n'/(A \times dc/dx)$$

where n'=rate of ion transport [mol/min]; A=area of lens exposed [mm²]; dc=concentration difference [mol/L]; dx=thickness of lens [mm].

As used in this application, the term "ophthalmically compatible" refers to a material or surface of a material which may be in intimate contact with the ocular environment for an extended period of time without significantly damaging the ocular environment and without significant user discomfort.

As used in this application, the term "ophthalmically safe" with respect to a packaging solution for sterilizing and storing contact lenses is intended to mean that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

As used in this application, the term "cross section" of a SiHy contact lens refers to a lens section obtained by cutting through the lens with a knife or cutting tool at an angle substantially normal to either of the anterior and posterior surfaces of the lens. A person skilled in the art knows well to cut manually (i.e., hand cut), or with Cryosta Microtome or with a lath, a contact lens to obtain a cross section of the contact lens. A resultant cross section of a contact lens can be polished by using ion etching or similar techniques.

The terms "surface modulus", "surface softness", "surface elastic modulus", "surface Young' modulus", or surface compression modulus are used interchangeably in this application to means a nanomechnical property (elastic property) which is measured by atomic force microscopy (AFM) on a surface of a material or a cross section of a contact lens in fully hydrated state (in phosphate buffered solution, pH~7.3±0.2), using contact mode, nanoindentation method, Peakforce QNM method, or Harmonic Force method, as known to a person skilled in the art. Jan Domke and Manfred Radmacher reported that the elastic properties of thin films can be measured with AMF (*Langmuir* 1998, 14, 3320-3325, herein incorporated by reference in its entirety). AFM nanoindentation can be performed according to the experimental protocol described by González-Méijome J M, Almeida J B and Parafita M A in Microscopy: Science, Technology, Applications and Education, "Analysis of Surface Mechanical Properties of Unworn and Worn Silicone Hydrogel Contact Lenses Using Nanoindentation with AFM", pp 554-559, A. Méndez-Vilas and J. Díaz (Eds.), Formatex Research Center, Badajoz, Spain (2010), herein incorporated by reference in its entirety. It is noted that the surface of a cross section of a contact lens, not the anterior or posterior surface of a contact lens (as done by González-Méijome J M, Almeida J B and Parafita M A in their article), is analyzed using nanoindentation with AFM. Nanoindentation method, Peakforce QNM method and Harmonic Force method are described in the paper by Kim Sweers, et al. in Nanoscale Research Letters 2011, 6:270, entitled "Nanomechanical properties of a-synuclein amyloid fibrils: a comparative study by nanoindentation, harmonic force microscopy, and Peakforce QNM" (herein incorporated by reference in its entirety. It is also understood that when measurements of surface elastic modulus is carried out with AFM across a cross section of a fully hydrated SiHy contact lens from the anterior surface to the bulk or from the bulk to the posterior surface (or vice versa), a surface modulus profile across a cross section of a contact lens can be established along a shortest line between the anterior and posterior surfaces on the surface of the cross section of the contact lens. It is further understood that as a good approximation, any experimentally and directly measured quantity can be used to represent the surface modulus so long as the measured quantity is proportional to the surface modulus.

As used in this application, the term "anterior outer hydrogel layer" in reference to a SiHy contact lens of the invention means a hydrogel layer that includes the anterior surface of the contact lens, is substantially uniform in thickness (i.e., variation in thickness is not more than about 10% from the average thickness of that layer), and has an average thickness of at least about 0.1 μm. The "average thickness" of an anterior outer hydrogel layer is simply referred to as the "thickness of an anterior outer hydrogel layer" in this application.

As used in this application, the term "posterior outer hydrogel layer" in reference to a SiHy contact lens of the invention means a hydrogel layer that includes the posterior surface of the contact lens, is substantially uniform in thickness (i.e., variation in thickness is not more than about 10% from the average thickness of that layer), and has an average thickness of at least about 0.1 μm. The "average thickness" of a posterior outer hydrogel layer is simply referred to as the "thickness of a posterior outer hydrogel layer" in this application.

As used in this application, the term "inner layer" in reference to a SiHy contact lens of the invention means a layer that includes a central curved plane (which divides the contact lens into two parts, one containing the anterior surface and the other containing the posterior surface) and has a variable thickness.

As used in this application, the term "crosslinked coating" or "hydrogel coating" interchangeably is used to describe a crosslinked polymeric material having a three-dimensional network that can contain water when fully hydrated. The three-dimensional network of a crosslinked polymeric material can be formed by crosslinking of two or more linear or branched polymers through crosslinkages.

As used in this application, the term "water-swelling ratio," in reference to an anterior or posterior outer hydrogel layer of a hydrogel material of a SiHy contact lens of the invention, means a value determined with AFM according to $$WSR = \frac{L_{Wet}}{L_{Dry}} \times 100\%$$

in which WSR is the water-swelling ratio of one of the anterior and posterior outer hydrogel layer, $L_{wet}$ is the average thickness of that outer hydrogel layer of the SiHy contact lens in fully hydrated state as measured with AFM on a cross section of the SiHy contact lens in fully hydrated state (i.e., in phosphate buffered solution, pH ~7.3±0.2), and $L_{Dry}$ is the average thickness of that outer hydrogel layer of the SiHy contact lens in dry state as measured with AFM on a cross section of the SiHy contact lens in dry state (dried without preserving the porosity of the hydrogel material, e.g., vacuum dried) and in substantially dry atmosphere. It is believed that a water-swelling ratio of each outer hydrogel layer (of a SiHy contact lens of the invention) is proportional to the water content possessed by each outer hydrogel layer and a water-swelling ratio of at least about 100% or $$\frac{120 \cdot WC_{SiHy}}{1 - WC_{SiHy}}\%$$

(whichever is larger, $WC_{SiHy}$ is the water content of the bulk (or inner layer of) silicone hydrogel material of a SiHy contact lens of the invention) can be served as a good indicator of the nature of the outer hydrogel layers having a higher water content relative to the bulk (or inner layer of) silicone hydrogel material of a SiHy contact lens of the invention.

As used in the this application, the term "reduced surface modulus", in reference to either or both of the anterior and posterior outer hydrogel layers of a SiHy contact lens of the invention, is intended to mean a value calculated based on the following equation $$RSM = \frac{\overline{SM_{Inner}} - \overline{SM_{Outer}}}{\overline{SM_{Inner}}} \times 100\%$$

In which RSM is the reduced modulus of the anterior or posterior outer hydrogel layer relative to the inner layer, $\overline{SM_{Outer}}$ is the average surface modulus of the posterior or anterior outer hydrogel layer, and $\overline{SM_{Inner}}$ is the average surface modulus of the inner layer. $\overline{SM_{Outer}}$ and $\overline{SM_{Inner}}$ are obtained from a cross-sectional surface modulus profile of the SiHy contact lens in fully hydrated state (as measured by analyzing surface mechanic properties, i.e., surface moduli of a cross section of the fully hydrated SiHy contact lens using AFM), as described above. It is expected that the cross-sectional surface modulus profile (i.e., a graph of surface modulus vs. distance from one of the anterior and posterior surfaces to the other surface along a shortest line between the anterior and posterior surfaces on the surface of a cross section of a SiHy lens in fully hydrated state) should have at least two outer zones (one including the anterior surface and the other including the posterior surface) and one inner zone (corresponding to the bulk silicone hydrogel material. The average surface modulus for the outer zone (i.e., outer hydrogel layer) is obtained by averaging all surface moduli in the outer zone excluding a region of about 1 to about 2 microns between the outer zone and the inner zone (i.e., in and/or near the boundary region or transition zone).

A "critical coefficient of friction" is the tangent of the critical angle which is the highest inclined angle of an inclined plate at which a lens begins sliding on the inclined plate after being pushed, but stops, or takes longer than 10 seconds, before reaching the end. The procedures for determining the critical coefficient of friction (CCOF) are described in Example 29. It is believed that the critical coefficient of friction (CCOF) of a contact lens correlates with the surface lubricity of that contact lens and can be used to quantify the surface lubricity of a contact lens.

As used in this application, the "positively-charged-particles-adhesion test" refers a test for characterizing the surface concentration of negatively-charged groups (e.g., carboxylic acid groups) of a hydrated SiHy contact lens. The positively-charged-particles-adhesion test is performed as follows. An aqueous dispersion of DOWEX™ 1×4 20-50 Mesh resins, which are spherical, Type I strong base resins (styrene/divinylbenzene copolymers containing $N^+(CH_3)_3Cl^-$ functional groups and 4% divinylbenzene) is prepared by dispersing a given amount of DOWEX™ 1×4 20-50 Mesh resins in a phosphate buffered saline (pH ~7.3) to have a resin concentration of 5% by weight and then mixed well by shaking or stirring or vortexing at approximately 1000 rpm for 10 seconds. Hydrated silicone hydrogel contact lenses are immersed in the aqueous dispersion of DOWEX™ 1×4 20-50 Mesh resins prepared above and stirred vortexed at an rpm of about 1000-1100 for 1 about minute, followed by rinsing with DI water and vortexing in DI water for about 1 minute. Then, the lenses are placed in water in glass Petri dishes and images of lenses are taken with Nikon optical microscope, using bottom lighting. The number of positively-charged particles adhered onto the surface of each lens can be counted. The number of positively-charged particles adhered onto the surface of the lens is proportional to the surface concentration of negatively-charged groups of a contact lens.

As used in this application, the term "carboxylic acid content", in reference to the crosslinked coating or an outer hydrogel layer of a SiHy contact lens of the invention, means the weight percentage of carboxylic group (COOH) based on the weight of the crosslinked coating or the outer hydrogel layer of the SiHy contact lens. The carboxylic acid content of a crosslinked coating or an outer hydrogel layer can be estimated theoretically based on the composition of starting materials for making the crosslinked coating or the outer hydrogel layer and on the carboxylic acid content of each starting materials.

The invention is related to a SiHy contact lens having a layered structural configuration and unique water gradient from inside to outside of the SiHy contact lens: a lower water content silicone hydrogel core (or bulk material) completely covered with an outer (surface) hydrogel layer having a higher water content and adequate thickness (at least about 0.1 μm) and being substantially free of silicone (preferably totally free of silicone); and the water content of the outer hydrogel layer being at least about 1.2 folds (or 120%), preferably at least about 1.3 folds (or 130%), more preferably at least about 1.4 folds (or 140%), even more preferably at least about 1.5 folds (150%), most preferably at least about 2 folds (or 200%) of the water content of the bulk material. FIG. 1 schematically illustrates a SiHy contact lens having a layered structural configuration, according to a preferred embodiment. In accordance with this preferred embodiment of the invention, the SiHy contact lens 100 has an anterior surface (or front curve or convex surface) 101 and an opposite posterior surface (or base curve or concave surface) 102 which is rest on the cornea of the eye when worn by a user. The SiHy contact lens 100 comprises an inner (or middle) layer 110 and two outer layers 120. The inner layer 110 is the bulk material of SiHy contact lens 100 and has a 3-dimensional shape very close to the SiHy contact lens 100. The inner layer 110 is preferably made of a lower water content silicone hydrogel. The two outer layers 120, substantially identical to each other, are substantially uniform in thickness and made of a hydrogel material substantially free of silicone (preferably totally free of silicone) having a higher water content relative to that of the inner layer 110. The two outer layers 120 merge at the peripheral edge 103 of the contact lens 100 and cover completely the inner layer 110.

A SiHy contact lens with a layered structural configuration of the invention can offer several advantages over contact lenses in the prior art. First, such a SiHy contact lens can still possess high oxygen permeability, which is required to maintain the corneal health of the eye. Second, because the inner layer (bulk material) provides bulk mechanical strength and rigidity required for a contact lens, the outer hydrogel layers may have no limit with respect to the water content and can contain water as much as possible. As such, the outer hydrogel layers can provide the contact lens with a skin super-enriched with water or a water content gradient in the lens structural configuration (highest water content in the region near and including the lens surface and lowest water content in the lens core). Third, a SiHy contact lens with a layered structural configuration of the invention may have low in-eye dehydration, may cause less dryness sensation in the eye, and consequently can have enhanced end-day wearing comfort. It is believed that the inner layer (i.e., the bulk material of the lens) with low water content will control (limit) the rate of water diffusion through a lens from the posterior surface to the anterior surface and in turn the evaporation (water loss) at the anterior surface of the lens. It is also believed that a layered structural configuration of the invention may create an inward water concentration gradient (i.e., the water content decreasing as going inwardly from the anterior surface toward the lens core), which is unfavorable for water diffusion through a lens from the posterior surface to the anterior surface based on Fick's laws of diffusion. Fourth, a SiHy contact lens with a layered structural configuration of the invention may provide high biocompatibility, because water is highly biocompatible with the tear and because high water content (e.g., preferably >75% $H_2O$) in the outer hydrogel layers is located in and nears the anterior and posterior surfaces with which the eye is in direct contact and where the biocompatibility counts most. Fifth, high water content in the outer hydrogel layers with adequate thickness may provide a SiHy contact lens with a highly soft surface, i.e., a "water cushion." Sixth, a SiHy contact lens with a layered structural configuration of the invention may have a highly lubricious surface. It is believed that the outer hydrogel layer with much higher water content and with adequate thickness would provide a "water-loving" surface which can attract tears to be spread on the lens surface. It is believed that the outer hydrogel layer with much higher softness than that of the bulk lens material (the inner layer) may be very susceptible to deformation under pressure (i.e., shearing forces of the eyelids) and may provide elastohydrodynamic lubrication when such a SiHy contact lens is worn in the eye. Seventh, a layered structural configuration in a SiHy contact lens of the invention may prevent silicone from exposure. It is believed that the three dimensional mesh network (i.e., polymeric matrix) of the outer hydrogel layers with adequate thickness can sheath silicone and prevent silicone from migrating onto the lens surface. Eighth, a SiHy contact lens of the invention can have a low surface concentration of negatively-charged groups (e.g., carboxylic acid groups) and is less susceptible to high debris adhesion during patient handling and high protein adhesion during wearing (a majority of proteins in tears is believed to be positively charged).

In one aspect, the invention provides a hydrated silicone hydrogel contact lens which comprises: an anterior (convex) surface and an opposite posterior (concave) surface; and a layered structural configuration from the anterior surface to the posterior surface, wherein the layered structural configuration includes an anterior outer hydrogel layer, an inner layer of a silicone hydrogel material, and a posterior outer hydrogel layer, wherein the silicone hydrogel material has an oxygen permeability (Dk) of at least about 50, preferably at least about 60, more preferably at least about 70, even more preferably at least about 90, most preferably at least about 110 barrers, and a first water content (designated as $WC_{SiHy}$) of from about 10% to about 70%, preferably from about 10% to about 65%, more preferably from about 10% to about 60%, even more preferably from about 15% to about 55%, most preferably from about 15% to about 50% by weight, wherein the anterior and posterior outer hydrogel layers are substantially uniform in thickness and merge at the peripheral edge of the contact lens to completely enclose the inner layer of the silicone hydrogel material, and wherein the anterior and posterior outer hydrogel layers independent of each other have a second water content higher than $WC_{SiHy}$, as characterized either by having a water-swelling ratio of at least about 100% (preferably at least about 150%, more preferably at least about 200%, even more preferably at least about 250%, most preferably at least about 300%) if $WC_{SiHy} \leq 45\%$, or by having a water-swelling ratio of at least about $$\frac{120 \cdot WC_{SiHy}}{1 - WC_{SiHy}}\%$$

(preferably $$\frac{130 \cdot WC_{SiHy}}{1 - WC_{SiHy}}\%,$$

more preferably $$\frac{140 \cdot WC_{SiHy}}{1 - WC_{SiHy}}\%,$$

even more preferably $$\frac{150 \cdot WC_{SiHy}}{1 - WC_{SiHy}}\%) \text{ if } WC_{SiHy} > 45\%,$$

wherein the thickness of each outer hydrogel layer is from about 0.1 μm to about 20 μm, preferably from about 0.25 μm to about 15 μm, more preferably from about 0.5 μm to about 12.5 μm, even more preferably from about 1 μm to about 10 μm (as measured with atomic force microscopy across a cross section from the posterior surface to the anterior surface of the silicone hydrogel contact lens in fully hydrated state). Preferably, the anterior and posterior surfaces have a low surface concentration of negatively-charged groups (e.g., carboxylic acid groups) as characterized by attracting at most at most about 200, preferably at most about 160, more preferably at most about 120, even more preferably at most about 90, most preferably at most about 60 positively-charged particles in positively-charged-particles-adhesion test. Also preferably, the hydrated silicone hydrogel contact lens has a surface lubricity characterized by having a critical coefficient of friction (designated as CCOF) of about 0.046 or less, preferably about 0.043 or less, more preferably about 0.040 or less.

In accordance with the invention, the inner layer of a SiHy contact lens is practically the bulk material of the lens. It can be derived directly from a preformed SiHy contact lens in a surface modification process where two outer hydrogel layers are applied and attached directly and/or indirectly onto the preformed SiHy contact lenses. A preformed SiHy contact lens can be any commercial SiHy lens, such as, one of those described above. Alternatively, a preformed SiHy can be made according to any methods well known to a person skilled in the art. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses. For production of preformed SiHy contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

Any suitable silicone-containing vinylic monomers can be used in the invention. Examples of preferred silicone-containing vinylic monomers include without limitation N-[tris (trimethylsiloxy)silylpropyl]-(meth)acrylamide, N-[tris (dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth)acrylamide monomers of formula (1) are N-[tris(trimethylsiloxy)silylpropyl]acrylamide, TRIS, N-[2-hydroxy-3-(3-(t-butyldimethylsilyl)propyloxy)propyl]acrylamide, or combinations thereof.

A class of preferred silicone-containing vinylic monomers or macromers is polysiloxane-containing vinylic monomers or macromers. Examples of such polysiloxane-containing vinylic monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyalkyleneoxides could also be of utility. For example, one might use methacrylate end capped polyethyleneoxide-block-polydimethylsiloxane-block-polyethyleneoxide to enhance oxygen permeability. Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

Another class of preferred silicone-containing macromers is silicon-containing prepolymers comprising hydrophilic segments and hydrophobic segments. Any suitable of silicone-containing prepolymers with hydrophilic segments and hydrophobic segments can be used in the invention. Examples of such silicone-containing prepolymers include those described in commonly-owned U.S. Pat. Nos. 6,039,913, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Nos. 61/180,449 and 61/180,453; all of which are incorporated herein by references in their entireties.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethyl methacrylate (HEMA), 2-hydroxyethyl acrylate (HEA), hydroxypropyl acrylate, hydroxypropyl methacrylate (HPMA), trimethylammonium 2-hydroxy propyl- methacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred cross-linking agents include without limitation tetraethyleneglycol diacrylate, triethyleneglycol diacrylate, ethyleneglycol diacylate, diethyleneglycol diacrylate, tetraethyleneglycol dimethacrylate, triethyleneglycol dimethacrylate, ethyleneglycol dimethacylate, diethyleneglycol dimethacrylate, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylmethacrylate, 1,3-bis(methacrylamidopropyl)-1,1,3,3-tetrakis(trimethylsiloxy)disiloxane, N,N'-methylenebisacrylamide, N,N'-methylenebismethacrylamide, N,N'-ethylenebisacrylamide, N,N'-ethylenebismethacrylamide, 1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamidopropyl)-1,1,3,3-tetrakis(trimethylsiloxy)disiloxane, 1,3-bis(methacryloxyethylureidopropyl)-1,1,3,3-tetrakis(trimethylsiloxy)disiloxane, and combinations thereof. A preferred cross-linking agent is tetra(ethyleneglycol)diacrylate, tri(ethyleneglycol)diacrylate, ethyleneglycol diacrylate, di(ethyleneglycol)diacrylate, methylenebisacrylamide, triallyl isocyanurate, or triallyl cyanurate. The amount of a cross-linking agent used is expressed in the weight content with respect to the total polymer and is preferably in the range from about 0.05% to about 4%, and more preferably in the range from about 0.1% to about 2%.

Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Any suitable polymerizable UV-absorbing agents can be used in the invention. Preferably, a polymerizable UV-absorbing agent comprises a benzotriazole-moiety or a benzophenone-moiety. Examples of preferred polymerizable UV absorbers include without limitation 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butylphenyl)-5-chlorobenzotriazo le, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone.

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olapitidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 1,00,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In accordance with the invention, a SiHy lens formulation can be a solution or a melt at a temperature from about 20° C. to about 85° C. Preferably, a polymerizable composition is a solution of all desirable components in a suitable solvent, or a mixture of suitable solvents.

A SiHy lens formulation can be prepared by dissolving all of the desirable components in any suitable solvent, such as, water, a mixture of water and one or more organic solvents miscible with water, an organic solvent, or a mixture of one or more organic solvents, as known to a person skilled in the art.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

Numerous SiHy lens formulations have been described in numerous patents and patent applications published by the filing date of this application. All of them can be used in obtaining a preformed SiHy lens which in turn becomes the inner layer of a SiHy contact lens of the invention, so long as they will yield a SiHy material having a Dk and water content specified above. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, filcon II 3, can also be used in making preformed SiHy contact lenses (the inner layer of a SiHy contact lens of the invention).

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711 to Schad; 4,460,534 to Boehm et al.; 5,843,346 to Morrill; and 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, the silicone hydrogel (bulk material) of the inner layer has an oxygen permeability of at least about 50, preferably at least about 60, more preferably at least about 70, even more preferably at least about 90 barrers, most preferably at least about 110 Barrers. The silicone hydrogel material can also have a (first) water content $WC_{SiHy}$ of from about 10% to about 70%, preferably from about 10% to about 65%, more preferably from about 10% to about 60%; even more preferably from about 15% to about 55%, most preferably from about 15% to about 50% by weight. The silicone hydrogel material can further have a bulk elastic modulus or bulk Young Modulus (hereinafter the terms, "softness," "elastic modulus," and "Young's modulus" are interchangeably used in this application to mean bulk elastic modulus if the term is not modified by the word "surface.") of from about 0.3 MPa to about 1.8 MPa, preferably from 0.4 MPa to about 1.5 MPa, more preferably from about 0.5 MPa to about 1.2 MPa. The oxygen permeability, elastic modulus and water content of the inner layer of the silicone hydrogel material of a SiHy contact lens of the invention can be determined by measuring the oxygen permeability, elastic modulus and water content of the preformed SiHy lens from which the inner layer is derived. It is understood that as a reasonable approximation, the elastic modulus of a SiHy contact lens of the invention can be considered to be the elastic modulus of the silicone hydrogel material of the inner layer, because of the much thinner outer hydrogel layers. A person skilled in the art knows well how to determine the elastic modulus and water content of a silicone hydrogel material or a SiHy contact lens. For example, all commercial SiHy contact lenses have reported values of elastic modulus and water content.

The two outer hydrogel layers of a SiHy contact lens of the invention preferably are substantially identical to each other and are a crosslinked coating which is applied onto a preformed SiHy contact lens having a desired Dk, water content, and bulk elastic modulus.

The layered structure configuration of a SiHy contact lens of the invention can be established by analysis with atomic force microscopy (AFM) of a cross section of a SiHy contact lens in fully hydrated state (i.e., directly in water or a buffered saline) as described above and shown in Examples. The surface moduli of a cross section can be characterized (imaged) with AFM (e.g., Force-Volume mode) in order to visualize any changes in surface modulus from the posterior surface side to the anterior surface side across the cross section. A significant change (e.g., about 20% or greater, preferably about 30% or greater) observed in surface modulus (by examining the AFM image) over a thickness of about 0.04 µm, preferably about 0.03 µm, more preferably about 0.02 µm, even more preferably about 0.01 µm along a shortest line between the anterior and posterior surfaces across a cross section of the SiHy contact lens in fully hydrated state indicates a transition from one layer to a different layer. The average thickness of each outer hydrogel layer can be determined from the AFM image as well known to a person skilled in the art.

The two outer hydrogel layers of a SiHy contact lens of the invention are substantially uniform in thickness. They merge at the peripheral edge of the contact lens to completely enclose the inner layer of the silicone hydrogel material. The thickness of each outer hydrogel layer is from about 0.1 µm to about 20 µm, preferably from about 0.25 µm to about 15 µm, even more preferably from about 0.5 µm to about 12.5 µm, most preferably from about 1 µm to about 10 µm. The thickness of the outer hydrogel layers (or crosslinked coating) of a SiHy contact lens of the invention is determined by AFM analysis of a cross section of the SiHy contact lens in fully hydrated state as described above. In a more preferred embodiment, the thickness of each outer hydrogel layer is preferably at most about 30% (i.e., 30% or less), preferably at most about 20% (20% or less), more preferably at most about 10% (10% or less) of the center thickness of the SiHy contact lens in fully hydrated state.

It is understood that the layered structure configuration of a SiHy contact lens of the invention can also be established qualitatively by analysis with scanning electron microscopy (SEM) of a cross section of the freeze-dried SiHy contact lens as shown in Examples. SEM can show the different compositions and/or structures of each layers of a cross section of the SiHy contact lens in freeze-dried state. A significant change (e.g., about 20% or greater, preferably about 30% or greater) observed in the compositions and/or a significant (visually noticeable) changes in structures (by examining the SEM image) over a thickness of about 0.04 µm, preferably about 0.03 µm, more preferably about 0.02 µm, even more preferably about 0.01 µm across a cross section of the SiHy contact lens in freeze-dried state indicates a transition from one layer to a different layer. However, the thickness value based on SEM analysis of a cross section of a SiHy lens in freeze-dried state is typically lower than actual value because of collapse of the outer hydrogel layers, transition layer if applicable, and the inner layer after being freeze-dried.

In accordance with this aspect of the invention, the two outer hydrogel layers (the anterior and posterior outer hydrogel layers) of a SiHy contact lens of the invention comprise a (second) water content that must be higher than the (first) water content ($WC_{SiHy}$) of the inner layer of the silicone hydrogel material and more specifically must be at least about 1.2 folds (i.e., 120%) of the (first) water content ($WC_{SiHy}$) of the inner layer of the silicone hydrogel material. It is believed that the water-swelling ratio of each outer hydrogel layer correlates with its water content and as a good approximation can represent reasonably the water content of the outer hydrogel layer. In alternatively preferred embodiments, where the water content ($WC_{SiHy}$) of the inner layer of the silicone hydrogel material is about 55% or less, the water-swelling ratio of each outer hydrogel layer is at least about 150%; where the water content ($WC_{SiHy}$) of the inner layer of the silicone hydrogel material is about 60% or less, the water-swelling ratio of each outer hydrogel layer is at least about 200%; where the water content ($WC_{SiHy}$) of the inner layer of the silicone hydrogel material is about 65% or less, the water-swelling ratio of each outer hydrogel layer is at least about 250%; where the water content ($WC_{SiHy}$) of the inner layer of the silicone hydrogel material is about 70% or less, the water-swelling ratio of each outer hydrogel layer is at least about 300%.

It is understood that the water content of the anterior and posterior outer hydrogel layers (the crosslinked coating) can be determined more accurately according to the procedures described in Example 23. Alternatively, the water content of the two outer hydrogel layers (the crosslinked coating) can be determined with an article comprising a non-water-absorbent thin substrate and a crosslinked coating thereon, wherein the crosslinked coating is applied onto the non-water-absorbent thin substrate according to the identical coating process for the SiHy contact lens under substantial identical conditions. The water content of each outer hydrogel layer then can be determined based on the difference between dry and hydrated weights of the article with the crosslinked coating.

In accordance with the invention, each of the two outer hydrogel layers is substantially free of silicone, preferably totally free of silicone. However, it is well known that when X-ray photoelectron spectroscopy (XPS) is used to establish the presence or absence of silicon in the outer hydrogel layer (generally a probing depth of from 1.5 to 6 nm), samples are inevitably contaminated by the environmental silicon, as shown by the detection by XPS of silicon on the surface of samples which are theoretically free of any silicon atom, such as, for example, a polyethylene sheet, a DAILIES® AquaComfortPlus™ contact lens from CIBA VISION Corporation or an ACUVUE® Moist from Johnson & Johnson (see Example 21 below). As such, the term "substantially free of silicon" is used in this application to mean that a surface silicon atomic percentage measured by XPS on a SiHy contact lens is less than about 200%, preferably less than about 175%, more preferably less than about 150%, even more preferably less than about 125% of the silicon atomic percentage of a control sample known to be inherently (theoretically) free of silicon (e.g., a polyethylene sheet, a DAILIES® AquaComfortPlus™ contact lens from CIBA VISION Corporation or an ACUVUE® Moist from Johnson & Johnson). Alternatively, each outer hydrogel layer of a SiHy contact lens of the invention is substantially free of silicon, as characterized by having a silicon atomic percentage of about 5% or less, preferably about 4% or less, even more preferably about 3% or less, of total elemental percentage, as measured by XPS analysis of the contact lens in dried state. It is understood that a small percentage of silicone may be optionally (but preferably not) incorporated into the polymer network of the outer hydrogel layer so long as it would not significantly deteriorate the surface properties (hydrophilicity, wettability, and/or lubricity) of a SiHy contact lens.

In a preferred embodiment, the anterior and posterior outer hydrogel layers (the crosslinked coating) have a crosslinking density (or crosslink density) sufficient low to provide the crosslinked coating or the outer hydrogel layers (i.e., the SiHy contact lens) with a high digital-rubbing resistance as characterized by having no surface cracking lines visible under dark field after the SiHy contact lens is rubbed between fingers. It is believed that digital-rubbing-induced surface cracking may reduce the surface lubricity and/or may not be able prevent silicone from migrating onto the surface (exposure). Surface cracking may also indicate excessive crosslinking density in the surface layers which may affect the surface elastic modulus. Preferably, the non-silicone hydrogel material in the outer hydrogel layers (the crosslinked coating) comprises crosslinkages derived from azetidinium groups in a thermally-induced coupling reaction.

In another preferred embodiment, the anterior and posterior surfaces have a low surface concentration of negatively-charged groups including carboxylic acid groups as characterized by attracting at most at most about 200, preferably at most about 160, more preferably at most about 120, even more preferably at most about 90, most preferably at most about 60 positively-charged particles in positively-charged-particles-adhesion test. It is desirable to have a minimal surface concentration of negatively charged groups (e.g., carboxylic acid groups) on a SiHy contact lens of the invention, because contact lenses with a high surface concentration of negatively charged groups (e.g., carboxylic acid groups) are susceptible to high debris adhesion during patient handling, high protein adhesion during wearing (a majority of proteins in tears is believed to be positively charged), high deposition and accumulation of antimicrobials such Polyhexamethylene Biguanide (PHMB) present in contact lens care solutions. To have a low surface concentration of negatively charged groups (e.g., carboxylic acid groups), the anterior and posterior outer hydrogel layers should have a relatively low carboxylic acid content. Preferably the anterior and posterior outer hydrogel layers have a carboxylic acid content of about 20% by weight or less, preferably about 15% by weight or less, even more preferably about 10% by weight or less, most preferably about 5% by weight or less.

In another preferred embodiment, a SiHy contact lens of the invention has a good surface lubricity characterized by having a critical coefficient of friction (designated as CCOF) of about 0.046 or less, preferably about 0.043 or less, more preferably about 0.040 or less. Alternatively, a SiHy contact lens of the invention preferably has a lubricity better than ACUVUE OASYS or ACUVUE TruEye as measured in a blind test according to the lubricity evaluation procedures described in Example 1.

Figure 2:
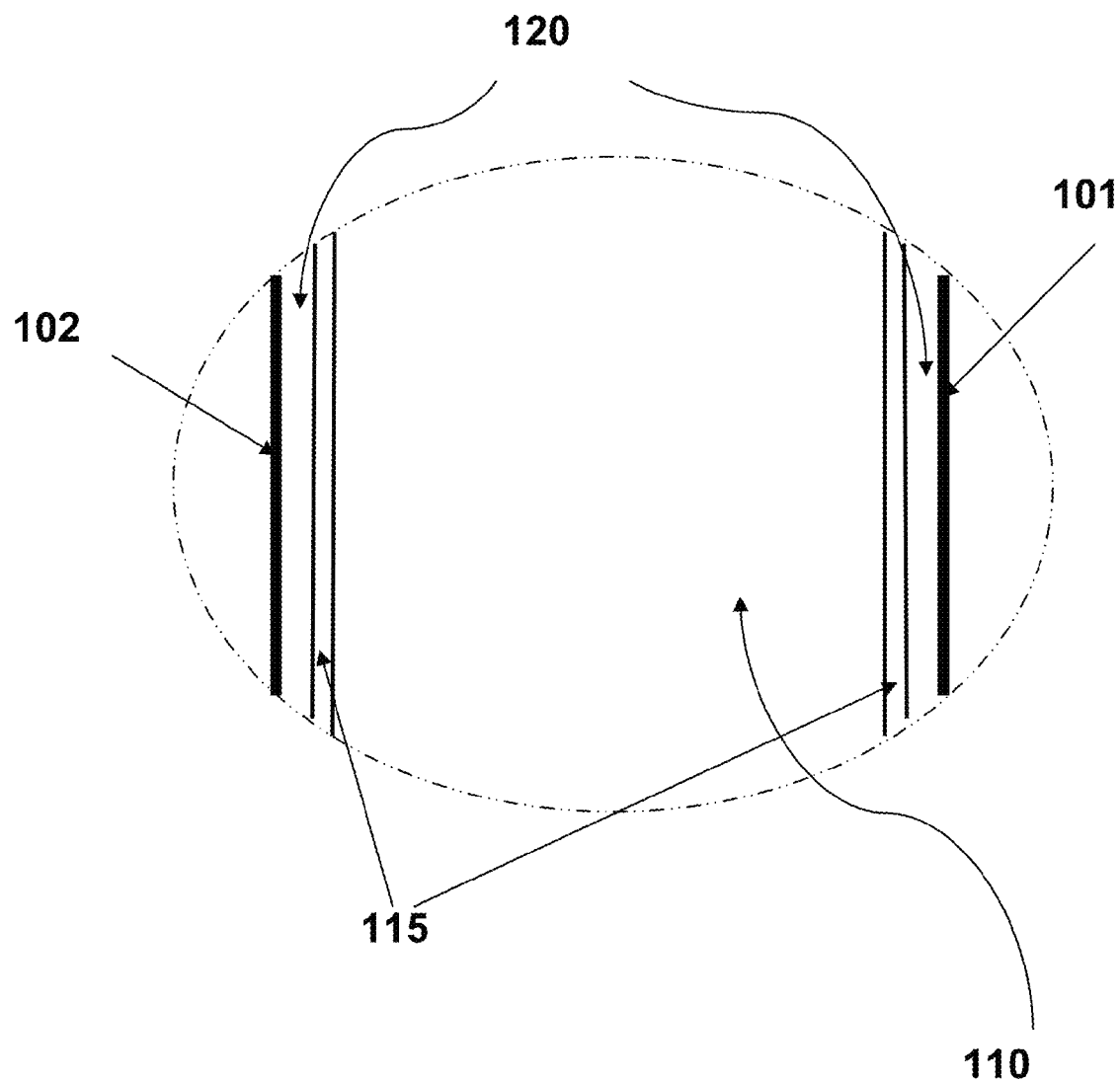
FIG. 2 schematically depicts a sectional view of the structural configuration of a SiHy contact lens according to another preferred embodiment of the invention.

In another preferred embodiment, a SiHy contact lens of the invention further comprises, in its layered structural configuration, two transition layers of polymeric material(s), as schematically illustrated in FIG. 2. Each of the two transition layers 115 is located between the inner layer 110 and one of the two outer hydrogel layers 120. Each transition layer is substantially uniform in thickness. The thickness of each transition layer is at least about 0.05 µm, preferably from about 0.05 µm to about 10 µm, more preferably from about 0.1 µm to about 7.5 µm, even more preferably from about 0.15 µm to about 5 µm. The transition layers merge at the peripheral edge of the contact lens to completely enclose the inner layer of the silicone hydrogel material. The presence and thickness of the transition layers can be determined preferably by AFM analysis of a cross section of the SiHy contact lens in fully hydrated state as described above for the outer hydrogel layers and inner layers.

The two transition layers of a SiHy contact lens of the invention essentially are a base (or primer) coating which is applied onto a preformed SiHy contact lens having a desired Dk, water content, and bulk elastic modulus, before the crosslinked coating (the outer hydrogel layers) is applied thereon. The transition layers (base coating) function to anchor/attach the outer hydrogel layers. Preferably, the transition layers comprise a carboxyl (COOH)-containing polymer, preferably a homo or copolymer of acrylic acid or methacrylic acid or $C_2$-$C_{12}$ alkylacrylic acid. It is understood that the carboxyl-containing polymer may penetrate into the bulk material and extend into the outer hydrogel layers. When such penetration into the inner layer of the silicone hydrogel material occurs, each transition layer would comprise the carboxyl-containing polymer and the silicone hydrogel which are intertwined together. It is also believed that the presence of the transition layers, especially when comprising a carboxyl-containing polymer, may provide a relatively-high water content over a thicker layer and/or a water reservoir for the outer hydrogel layers, because of the high water-binding properties of carboxyl groups. Moreover, even if the transition layer may contain high carboxylic acid groups, it would have a minimal adverse impact upon the surface concentration of carboxylic acid groups of the SiHy contact lens, because the surface concentration of carboxylic acid groups is predominantly determined by the outer hydrogel layers which fully cover the transition layer. The outer hydrogel layers with a low surface concentration of carboxylic acid groups can prevent the deposition of positively-charged proteins from the tears of a patient wearing the lens.

In another preferred embodiment, the anterior and posterior outer hydrogel layers independent of each other have a reduced surface modulus of at least about 20%, preferably at least about 25%, more preferably at least about 30%, even more preferably at least about 35%, most preferably at least about 40%, relative to the inner layer.

The anterior and posterior outer hydrogel layers are preferably made of the same or substantially identical material(s) (preferably totally free of silicone) and can be formed by applying and crosslinking a water-soluble and crosslinkable hydrophilic polymeric material onto a preformed SiHy contact lens that comprises amino and/or carboxyl groups on and/or near the surface of the contact lens, or a base coating comprising amino and/or carboxyl groups, wherein the preformed SiHy contact lens becomes the inner layer after crosslinking.

In accordance with the invention, a preformed SiHy contact lens can either inherently comprise or be modified to comprise amino groups and/or carboxyl groups on and/or near its surface.

Where a preformed SiHy contact lens inherently comprises amino groups and/or carboxyl groups on and/or near its surface, it is obtained by polymerizing a silicone hydrogel lens formulation comprising a reactive vinylic monomer.

Examples of preferred reactive vinylic monomers include without limitation amino-$C_2$-$C_6$ alkyl (meth)acrylate, $C_1$-$C_6$ alkylamino-$C_2$-$C_6$ alkyl (meth)acrylate, allylamine, vinylamine, amino-$C_1$-$C_6$ alkyl (meth)acrylamide, $C_1$-$C_6$ alkylamino-$C_2$-$C_6$ alkyl (meth)acrylamide, acrylic acid, $C_1$-$C_{12}$ alkylacrylic acid (e.g., methacrylic acid, ethylacrylic acid, propylacrylic acid, butylacrylic acid, pentylacrylic acid, etc.), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carbobxy-4-phenyl butadiene-1,3, itaconic acid, citraconic acid, mesaconic acid, glutaconic acid, aconitic acid, maleic acid, fumaric acid, tricarboxy ethylene, and combinations thereof. Preferably, the SiHy contact lens is made from a lens formulation comprising at least one reactive vinylic monomer selected from the group consisting of amino-$C_2$-$C_6$ alkyl (meth)acrylate, $C_1$-$C_6$ alkylamino-$C_2$-$C_6$ alkyl (meth)acrylate, allylamine, vinylamine, amino-$C_1$-$C_6$ alkyl (meth)acrylamide, $C_1$-$C_6$ alkylamino-$C_2$-$C_6$ alkyl (meth)acrylamide, acrylic acid, $C_1$-$C_{12}$ alkylacrylic acid, N,N-2-acrylamidoglycolic acid, and combinations thereof.

The lens formulation comprises preferably from about 0.1% to about 10%, more preferably from about 0.25% to about 7%, even more preferably from about 0.5% to about 5%, most preferably from about 0.75% to about 3%, by weight of a reactive vinylic monomer described above.

A preformed SiHy contact lens can also be subjected either to a surface treatment to form a reactive base coating having amino groups and/or carboxyl groups on the surface of the contact lens. Examples of surface treatments include without limitation a surface treatment by energy (e.g., a plasma, a static electrical charge, irradiation, or other energy source), chemical treatments, chemical vapor deposition, the grafting of hydrophilic vinylic monomers or macromers onto the surface of an article, layer-by-layer coating ("LbL coating") obtained according to methods described in U.S. Pat. Nos. 6,451,871, 6,719,929, 6,793,973, 6,811,805, and 6,896,926 and in U.S. Patent Application Publication Nos. 2007/0229758A1, 2008/0152800A1, and 2008/0226922A1, (herein incorporated by references in their entireties). "LbL coating", as used herein, refers to a coating that is not covalently attached to the polymer matrix of a contact lens and is obtained through a layer-by-layer ("LbL") deposition of charged or chargeable (by protonation or deprotonation) and/or non-charged materials on the lens. An LbL coating can be composed of one or more layers.

Preferably, the surface treatment is an LbL coating process. In this preferred embodiment (i.e., the reactive LbL base coating embodiment), a resultant silicone hydrogel contact lens comprises a reactive LbL base coating (i.e., the two transition layers) including at least one layer of a reactive polymer (i.e., a polymer having pendant amino groups and/or carboxyl groups), wherein the reactive LbL base coating is obtained by contacting the contact lens with a solution of a reactive polymer. Contacting of a contact lens with a coating solution of a reactive polymer can occur by dipping it into the coating solution or by spraying it with the coating solution. One contacting process involves solely dipping the contact lens in a bath of a coating solution for a period of time or alternatively dipping the contact lens sequentially in a series of baths of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

In accordance with this reactive LbL base coating embodiment, the reactive polymer can be a linear or branched polymer having pendant amino groups and/or carboxyl groups. Any polymers having pendant amino groups and/or carboxyl groups can be used as a reactive polymer for forming base coatings on silicone hydrogel contact lenses. Examples of such reactive polymers include without limitation: a homopolymer of a reactive vinylic monomer; a copolymer of two or more reactive vinylic monomers; a copolymer of a reactive vinylic monomer with one or more non-reactive hydrophilic vinylic monomers (i.e., hydrophilic vinylic monomers free of any carboxyl or (primary or secondary) amino group); polyethyleneimine (PEI); polyvinylalcohol with pendant amino groups; a carboxyl-containing cellulose (e.g., carboxymethylcellulose, carboxyethylcellulose, carboxypropylcellulose); hyaluronate; chondroitin sulfate; poly (glutamic acid); poly(aspartic acid); and combinations thereof.

Any preferred reactive vinylic monomers described above can be used in this embodiment for forming a reactive polymer for forming a reactive LbL base coating.

Preferred examples of non-reactive hydrophilic vinylic monomers free of carboxyl or amino group include without limitation acrylamide (AAm), methacrylamide N,N-dimethylacrylamide (DMA), N,N-dimethylmethacrylamide (DMMA), N-vinylpyrrolidone (NVP), N,N,-dimethylaminoethylmethacrylate (DMAEM), N,N-dimethylaminoethylacrylate (DMAEA), N,N-dimethylaminopropylmethacrylamide (DMAPMAm), N,N-dimethylaminopropylacrylamide (DMAPAAm), glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), a phosphorylcholine-containing vinylic monomer (including (meth)acryloyloxyethyl phosphorylcholine and those described in U.S. Pat. No. 5,461,433, herein incorporated by reference in its entirety), and combinations thereof.

Preferably, the reactive polymers for forming a reactive LbL base coating are polyacrylic acid, polymethacrylic acid, poly($C_2$-$C_{12}$ alkylacrylic acid), poly(acrylic acid-co-methacrylic acid), poly[$C_2$-$C_{12}$ alkylacrylic acid-co-(meth)acrylic acid], poly(N,N-2-acrylamidoglycolic acid), poly[(meth) acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinylpyrrolidone], hydrolyzed poly[(meth)acrylic acid-co-vinylacetate], hydrolyzed poly[$C_2$-$C_{12}$ alkylacrylic acid-co-vinylacetate], polyethyleneimine (PEI), polyallylamine hydrochloride (PAH) homo- or copolymer, polyvinylamine homo- or copolymer, or combinations thereof.

The weight average molecular weight $M_w$ of a reactive polymer for forming a reactive LbL base coating is at least about 10,000 Daltons, preferably at least about 50,000 Daltons, more preferably from about 100,000 Daltons to 5,000,000 Daltons.

A solution of a reactive polymer for forming a reactive LbL base coating on contact lenses can be prepared by dissolving one or more reactive polymers in water, a mixture of water and one or more organic solvents miscible with water, an organic solvent, or a mixture of one or more organic solvent. Preferably, the reactive polymer is dissolved in a mixture of water and one or more organic solvents, an organic solvent, or a mixture of one or more organic solvent. It is believed that a solvent system containing at least one organic solvent can swell a preformed SiHy contact lens so that a portion of the reactive polymer may penetrate into the preformed SiHy contact lens and increase the durability of the reactive base coating. Any organic solvents described above can be used in preparation of a solution of the reactive polymer, so long as it can dissolve the reactive polymer.

In another preferred embodiment, a preformed SiHy contact lens comprises inherently amino groups and/or carboxyl groups on and/or near its surface and is further subjected to a surface treatment to form a reactive LbL base coating having amino groups and/or carboxyl groups therein.

In another preferred embodiment (reactive plasma base coating), a preformed SiHy contact lens is subjected to a plasma treatment to form a covalently-attached reactive plasma base coating on the contact lens, i.e., polymerizing one or more reactive vinylic monomers (any one of those described previously) under the effect of plasma generated by electric discharge (so-called plasma-induced polymerization). The term "plasma" denotes an ionized gas, e.g. created by electric glow discharge which may be composed of electrons, ions of either polarity, gas atoms and molecules in the ground or any higher state of any form of excitation, as well as of photons. It is often called "low temperature plasma". For a review of plasma polymerization and its uses reference is made to R. Hartmann "Plasma polymerisation: Grundlagen, Technik and Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341. Preferably, the plasma-induced polymerization is an "after-glow" plasma-induced polymerization as described in WO98028026 (herein incorporated by reference in its entirety). For "after-glow" plasma polymerization the surface of a contact lens is treated first with a non-polymerizable plasma gas (e.g. H2, He or Ar) and then in a subsequent step the surface thus activated is exposed to a vinylic monomer having an amino group or carboxyl group (any reactive vinylic monomer described above), while the plasma power having been switched off. The activation results in the plasma-induced formation of radicals on the surface which in the subsequent step initiate the polymerization of the vinylic monomer thereon.

In accordance with the invention, the water-soluble and crosslinkable hydrophilic polymeric material for forming the outer hydrogel layers (or crosslinked coating) comprises crosslinkable groups, preferably thermally-crosslinkable groups, more preferably azetidinium groups. Preferably, the water-soluble and crosslinkable hydrophilic polymeric material for forming the outer hydrogel layers (or crosslinked coating) is a partially-crosslinked polymeric material that comprises a three-dimensional network and crosslinkable (preferably thermally-crosslinkable) groups, more preferably azetidinium groups within the network. The term "partially-crosslinked" in reference to a polymeric material means that the crosslinkable groups of starting materials for making the polymeric material in crosslinking reaction have not been fully consumed. Examples of crosslinkable groups include without limitation azetidinium groups, epoxy groups, isocyanate groups, aziridine groups, azlactone groups, and combinations thereof.

In a preferred embodiment, the water-soluble and crosslinkable hydrophilic polymeric material for forming the outer hydrogel layers (or crosslinked coating) comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains.

With such a water-soluble and crosslinkable hydrophilic polymeric material, the outer hydrogel layers (or crosslinked coating) can be formed by simply heating a preformed SiHy contact lens (having amino and/or carboxyl groups on and/or near the surface of the contact lens, or a base coating comprising amino and/or carboxyl groups) in an aqueous solution in the presence of the hydrophilic polymeric material to and at a temperature from about 40° C. to about 140° C. for a period of time sufficient to covalently attach the hydrophilic polymeric material onto the surface of the contact lens through covalent linkages each formed between one azetidinium group of the hydrophilic polymeric material and one of the amino and/or carboxyl groups on and/or near the surface of the contact lens, thereby forming a crosslinked hydrophilic coating on the contact lens. It is understood that any water-soluble and crosslinkable hydrophilic polymeric material containing crosslinkable groups (e.g., those described above) can be used in the invention to form the anterior and posterior outer hydrogel layers of a SiHy contact lens.

A water-soluble and thermally-crosslinkable hydrophilic polymeric material containing azetidinium groups comprises (i.e., has a composition including) from about 20% to about 95%, preferably from about 35% to about 90%, more preferably from about 50% to about 85%, by weight of first polymer chains derived from an epichlorohydrin-functionalized polyamine or polyamidoamine and from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, thiol group, and combination thereof. The composition of the hydrophilic polymeric material is determined by the composition (based on the total weight of the reactants) of a reactants mixture used for preparing the thermally-crosslinkable hydrophilic polymeric material according to the crosslinking reactions shown in Scheme I above. For example, if a reactant mixture comprises about 75% by weight of an epichlorohydrin-functionalized polyamine or polyamidoamine and about 25% by weight of at least one hydrophilicity-enhancing agent based on the total weight of the reactants, then the resultant hydrophilic polymeric material comprise about 75% by weight of first polymer chains derived from the epichlorohydrin-functionalized polyamine or polyamidoamine and about 25% by weight of hydrophilic moieties or second polymer chains derived from said at least one hydrophilicity-enhancing agent. The azetidinium groups of the thermally-crosslinkable hydrophilic polymeric material are those azetidinium groups (of the epichlorohydrin-functionalized polyamine or polyamidoamine) which do not participate in crosslinking reactions for preparing the thermally-crosslinkable hydrophilic polymeric material.

An epichlorohydrin-functionalized polyamine or polyamidoamine can be obtained by reacting epichlorohydrin with a polyamine polymer or a polymer containing primary or secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer. Similarly, a homopolymer or copolymer of aminoalkyl(meth)acrylate, mono-alkylaminoalkyl (meth)acrylate, aminoalkyl (meth)acrylamide, or mono-alkylaminoalkyl (meth)acrylamide can also react with epichlorohydrin to form an epichlorohydrin-functionalized polyamine. The reaction conditions for epichlorohydrin-functionalization of a polyamine or polyamidoamine polymer are taught in EP1465931 (herein incorporated by reference in its entirety). A preferred epichlorohydrin-functionalized polymer is polyaminoamide-epichlorohydrin (PAE) (or polyamide-polyamine-epichlorohydrin or polyamide-epichlorohydrin), such as, for example, Kymene® or Polycup® resins (epichlorohydrin-functionalized adipic acid-diethylenetriamine copolymers) from Hercules or Polycup® or Servamine® resins from Servo/Delden.

Any suitable hydrophilicity-enhancing agents can be used in the invention so long as they contain at least one amino group, at least one carboxyl group, and/or at least one thiol group.

A preferred class of hydrophilicity-enhancing agents include without limitation: amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more amino, carboxyl and/or thiol groups. More preferably, the content of monomeric units having an amino (—NHR' with R' as defined above), carboxyl (—COOH) and/or thiol (—SH) group in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are amino- or carboxyl-containing polysaccharides, for example, such as, carboxymethylcellulose (having a carboxyl content of about 40% or less, which is estimated based on the composition of repeating units, —$[C_6H_{10-m}O_5(CH_2CO_2H)_m]$— in which m is 1 to 3), carboxyethylcellulose (having a carboxyl content of about 36% or less, which is estimated based on the composition of repeating units, —$[C_6H_{10-m}O_5(C_2H_4CO_2H)_m]$— in which m is 1 to 3) carboxypropylcellulose (having a carboxyl content of about 32% or less, which is estimated based on the composition of repeating units, —$[C_6H_{10-m}O_5(C_3H_6CO_2H)_m]$—, in which m is 1 to 3), hyaluronic acid (having a carboxyl content of about 11%, which is estimated based on the composition of repeating units, —$(C_{13}H_{20}O_9NCO_2H)$—), chondroitin sulfate (having a carboxyl content of about 9.8%, which is estimated based on the composition of repeating units, —$(C_{12}H_{18}O_{13}NS\ CO_2H)$—), or combinations thereof.

Another preferred class of hydrophilic polymers as hydrophilicity-enhancing agents include without limitation: poly(ethylene glycol) (PEG) with mono-amino, carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a diamino- or dicarboxyl-terminated homo- or co-polymer of a non-reactive hydrophilic vinylic monomer; a monoamino- or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer and/or at least one phosphorylcholine-containing vinylic monomer; and combinations thereof. Reactive vinylic monomer(s) and non-reactive hydrophilic vinylic monomer(s) are those described previously.

More preferably, a hydrophilic polymer as a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acrylamide (AAm), N,N-dimethylacrylamide (DMA), N-vinylpyrrolidone (NVP), N-vinyl-N-methyl acetamide, glycerol (meth)acrylate, hydroxyethyl meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of (meth)acrylic acid, $C_2$-$C_{12}$ alkylacrylic acid, vinylamine, allylamine, and/or amino-$C_2$-$C_4$ alkyl meth)acrylate, and (2) (meth)acryloyloxyethyl phosphorylcholine and/or at least one non-reactive hydrophilic vinylic monomer selected from the group consisting of acrylamide, N,N-dimethylacrylamide, N-vinylpyrrolidone, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

Most preferably, the hydrophilicity-enhancing agent as a hydrophilicity-enhancing agent is PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP] with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of a carboxylic acid containing vinylic monomer and/or an amino-containing vinylic monomer, and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

As used in this application, a copolymer of a non-reactive hydrophilic vinylic monomer refers to a polymerization product of a non-reactive hydrophilic vinylic monomer with one or more additional vinylic monomers. Copolymers comprising a non-reactive hydrophilic vinylic monomer and a reactive vinylic monomer (e.g., a carboxyl-containing vinylic monomer) can be prepared according to any well-known radical polymerization methods or obtained from commercial suppliers. Copolymers containing methacryloyloxyethyl phosphorylcholine and carboxyl-containing vinylic monomer can be obtained from NOP Corporation (e.g., LIPIDURE®-A and -AF).

The weight average molecular weight $M_w$ of the hydrophilic polymer having at least one amino, carboxyl or thiol group (as a hydrophilicity-enhancing agent) is preferably from about 500 to about 1,000,000, more preferably from about 1,000 to about 500,000.

In accordance with the invention, the reaction between a hydrophilicity-enhancing agent and an epichlorohydrin-functionalized polyamine or polyamidoamine is carried out at a temperature of from about 40° C. to about 100° C. for a period of time sufficient (from about 0.3 hour to about 24 hours, preferably from about 1 hour to about 12 hours, even more preferably from about 2 hours to about 8 hours) to form a water-soluble and thermally-crosslinkable hydrophilic polymeric material containing azetidinium groups.

In accordance with the invention, the concentration of a hydrophilicity-enhancing agent relative to an epichlorohydrin-functionalized polyamine or polyamidoamine must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the epichlorohydrin-functionalized polyamine or polyamidoamine.

In accordance with the invention, heating is performed preferably by autoclaving a preformed SiHy contact lens that comprises amino and/or carboxyl groups on and/or near the surface of the contact lens, or a base coating comprising amino and/or carboxyl groups and is immersed in a packaging solution (i.e., a buffered aqueous solution) including a water-soluble thermally crosslinkable hydrophilic polymeric material in a sealed lens package at a temperature of from about 118° C. to about 125° C. for approximately 20-90 minutes. In accordance with this embodiment of the invention, the packaging solution is a buffered aqueous solution which is ophthalmically safe after autoclave. Alternatively, is performed preferably by autoclaving a preformed SiHy contact lens, which comprises a base coating and a layer of a water-soluble thermally crosslinkable hydrophilic polymeric material on top of the base coating, immersed in a packaging solution (i.e., a buffered aqueous solution) in a sealed lens package at a temperature of from about 118° C. to about 125° C. for approximately 20-90 minutes.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (or water-soluble viscosity builders) (e.g., cellulose derivatives, polyvinyl alcohol, polyvinylpyrrolidone).

The packaging solution contains a buffering agent in an amount sufficient to maintain a pH of the packaging solution in the desired range, for example, preferably in a physiologically acceptable range of about 6 to about 8.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable ocularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 20 centipoises, preferably from about 1.2 centipoises to about 10 centipoises, more preferably from about 1.5 centipoises to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble and thermally-crosslinkable hydrophilic polymeric material of the invention.

A packaging solution of the invention can contain a viscosity-enhancing polymer. The viscosity-enhancing polymer preferably is nonionic. Increasing the solution viscosity provides a film on the lens which may facilitate comfortable wearing of the contact lens. The viscosity-enhancing component may also act to cushion the impact on the eye surface during insertion and serves also to alleviate eye irritation.

Preferred viscosity-enhancing polymers include, but are not limited to, water soluble cellulose ethers (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), water-soluble polyvinylalcohols (PVAs), high molecular weight poly(ethylene oxide) having a molecular weight greater than about 2000 (up to 10,000,000 Daltons), polyvinylpyrrolidone with a molecular weight of from about 30,000 daltons to about 1,000,000 daltons, a copolymer of N-vinylpyrrolidone and at least one dialkylaminoalkyl (meth)acrylate having 7-20 carbon atoms, and combinations thereof. Water soluble cellulose ethers and copolymers of vinylpyrrolidone and dimethylaminoethylmethacrylate are most preferred viscosity-enhancing polymers. Copolymers of N-vinylpyrrolidone and dimethylaminoethylmethacrylate are commercially available, e.g., Copolymer 845 and Copolymer 937 from ISP.

The viscosity-enhancing polymer is present in the packaging solution in an amount of from about 0.01% to about 5% by weight, preferably from about 0.05% to about 3% by weight, even more preferably from about 0.1% to about 1% by weight, based on the total amount of the packaging solution.

A packaging solution can further comprises a polyethylene glycol having a molecular weight of about 1200 or less, more preferably 600 or less, most preferably from about 100 to about 500 Daltons.

Where at least one of the crosslinked coating and the packaging solution contains a polymeric material having polyethylene glycol segments, the packaging solution preferably comprises an α-oxo-multi-acid or salt thereof in an amount sufficient to have a reduced susceptibility to oxidation degradation of the polyethylene glycol segments. A commonly-owned co-pending patent application (US patent application publication No. 2004/0116564 A1, incorporated herein in its entirety) discloses that oxo-multi-acid or salt thereof can reduce the susceptibility to oxidative degradation of a PEG-containing polymeric material.

Exemplary α-oxo-multi-acids or biocompatible salts thereof include without limitation citric acid, 2-ketoglutaric acid, or malic acid or biocompatible (preferably ophthalmically compatible) salts thereof. More preferably, a α-oxo-multi-acid is citric or malic acid or biocompatible (preferably ophthalmically compatible) salts thereof (e.g., sodium, potassium, or the like).

In accordance with the invention, the packaging solution can further comprises mucin-like materials, ophthalmically beneficial materials, and/or surfactants. Exemplary mucin-like materials described above, exemplary ophthalmically beneficial materials described above, exemplary surfactants described above can be used in this embodiment.

In a preferred embodiment, a SiHy contact lens of the invention has a relatively long water break up time (WBUT). WBUT is the time needed for the water film to break (de-wet) exposing the underlying lens material under visual examination. A SiHy contact lens having a longer WBUT can hold water (tears) film on its surface for a relatively longer period time when worn on the eye. It would be less likely to develop dry spots between blinks of the eyelids and could provide enhanced wearing comfort. WBUT can be measured according to the procedures described in Example hereinafter. Preferably, a SiHy contact lens of the invention has a surface hydrophilicity characterized by having a water breakup time of at least about 10 seconds.

In a preferred embodiment, a SiHy contact lens of the invention has a surface wettability characterized by having an averaged water contact angle of about 90 degrees or less, preferably about 80 degrees or less, more preferably about 70 degrees or less, even more preferably about 60 degrees or less, most preferably about 50 degrees or less.

In a preferred embodiment, a SiHy contact lens has an oxygen transmissibility of at least about 40, preferably at least about 60, more preferably at least about 80, even more preferably at least about 100, most preferably at least about 120, barrers/mm.

It should be understood that although in this aspect of the invention various embodiments including preferred embodiments of the invention may be separately described above, they can be combined and/or used together in any desirable fashion to arrive at different embodiments of a silicone hydrogel contact lenses of the invention.

In another aspect, the invention provides a hydrated silicone hydrogel contact lens. A hydrated silicone hydrogel contact lens of the invention comprises: a silicone hydrogel material as bulk material, an anterior surface and an opposite posterior surface; wherein the contact lens has an oxygen transmissibility of at least about 40, preferably at least about 60, more preferably at least about 80, even more preferably at least about 110 barrers/mm, and a cross-sectional surface-modulus profile which comprises, along a shortest line between the anterior and posterior surfaces on the surface of a cross section of the contact lens, an anterior outer zone including and near the anterior surface, an inner zone including and around the center of the shortest line, and a posterior outer zone including and near the posterior surface, wherein the anterior outer zone has an average anterior surface modulus (designated as $\overline{SM_{Ant}}$) while the posterior outer zone has an average posterior surface modulus (designated as $\overline{SM_{Post}}$), wherein the inner zone has an average inner surface modulus (designated as $SM_{Inner}$), wherein at least one of $$\frac{\overline{SM_{Inner}} - \overline{SM_{Post}}}{\overline{SM_{Inner}}} \times 100\% \text{ and } \frac{\overline{SM_{Inner}} - \overline{SM_{Ant}}}{\overline{SM_{Inner}}} \times 100\%$$

is at least about 20%, preferably at least about 25%, more preferably at least about 30%, even more preferably at least about 35%, most preferably at least about 40%. Preferably, the anterior and posterior outer zones covers a span of at least about 0.1 µm, preferably from about 0.1 µm to about 20 µm, more preferably from about 0.25 µm to about 15 µm, even more preferably from about 0.5 µm to about 12.5 µm, most preferably from about 1 µm to about 10 µm.

In a preferred embodiment, the hydrated silicone hydrogel contact lens can have an elastic modulus (or Young's Modulus) of from about 0.3 MPa to about 1.8 MPa, preferably from about 0.4 MPa to about 1.5 MPa, more preferably from about 0.5 MPa to about 1.2 MPa; a water content of from about 10% to about 75%, preferably from about 10% to about 70%, more preferably from about 15% to about 65%; even more preferably from about 20% to about 60%, most preferably from about 25% to about 55% by weight; a surface wettability characterized by having an averaged water contact angle of about 90 degrees or less, preferably about 80 degrees or less, more preferably about 70 degrees or less, even more preferably about 60 degrees or less, most preferably about 50 degrees or less; a surface hydrophilicity characterized by having a WBUT of at least about 10 seconds; or combinations thereof.

In another preferred embodiment, the anterior and posterior surfaces have a low surface concentration of negatively-charged groups (e.g., carboxylic acid groups) as characterized by attracting at most about 200, preferably at most about 160, more preferably at most about 120, even more preferably at most about 90, most preferably at most about 60 positively-charged particles in positively-charged-particles-adhesion test. To have a low surface concentration of negatively charged groups (e.g., carboxylic acid groups), the anterior and posterior outer hydrogel layers should have a relatively low carboxylic acid content. Preferably the anterior and posterior outer hydrogel layers have a carboxylic acid content of about 20% by weight or less, preferably about 15% by weight or less, even more preferably about 10% by weight or less, most preferably about 5% by weight or less.

In another preferred embodiment, a SiHy contact lens of the invention has a good surface lubricity characterized by having a critical coefficient of friction (designated as CCOF) of about 0.046 or less, preferably about 0.043 or less, more preferably about 0.040 or less. Alternatively, a SiHy contact lens of the invention preferably has a lubricity better than ACUVUE OASYS or ACUVUE TruEye as measured in a blind test according to the lubricity evaluation procedures described in Example 1.

In another preferred embodiment, the hydrated SiHy contact lens preferably has a high digital-rubbing resistance as characterized by having no surface cracking lines visible under dark field after the SiHy contact lens is rubbed between fingers. It is believed that digital-rubbing-induced surface cracking may reduce the surface lubricity and/or may not be able prevent silicone from migrating onto the surface (exposure).

In another preferred embodiment, a hydrated SiHy contact lens of the invention comprises an inner layer of the silicone hydrogel material, an anterior outer hydrogel layer, and a posterior outer hydrogel layer, wherein the anterior and posterior outer hydrogel layers are substantially uniform in thickness and merge at the peripheral edge of the contact lens to completely enclose the inner layer of the silicone hydrogel material. It is understood that the first and second outer zones in the cross-sectional surface modulus profile correspond to the two outer hydrogel layers while the inner zone corresponds to the inner layer of the silicone hydrogel material. All of the various embodiments of the outer hydrogel layers (crosslinked coating) as described above for the other aspect of the invention can be used, alone or in any combination, in this aspect of the invention as the outer hydrogel layers. All of the various embodiments of the inner layer of a silicone hydrogel material as described above for the other aspect of the invention can be used, alone or in any combination, in this aspect of the invention as the inner layer of the silicone hydrogel material.

In accordance with this aspect of the invention, the outer hydrogel layers are substantially uniform in thickness and have a thickness of at least about 0.1 µm, preferably from about 0.1 µm to about 20 µm, more preferably from about 0.25 µm to about 15 µm, even more preferably from about 0.5 µm to about 12.5 µm, most preferably from about 1 µm to about 10 µm. The thickness of each outer hydrogel layer of a SiHy contact lens of the invention is determined by AFM analysis of a cross section of the SiHy contact lens in fully hydrated state as described above. In a more preferred embodiment, the thickness of each outer hydrogel layer is at most about 30% (i.e., 30% or less), preferably at most about 20% (20% or less), more preferably at most about 10% (10% or less) of the center thickness of the SiHy contact lens in fully hydrated state. In addition, each of the two outer hydrogel layers is substantially free of silicone (as characterized by having a silicon atomic percentage of about 5% or less, preferably about 4% or less, even more preferably about 3% or less, of total elemental percentage, as measured by XPS analysis of the contact lens in dried state), preferably totally free of silicone. It is understood that a small percentage of silicone may be optionally (but preferably not) incorporated into the polymer network of the outer hydrogel layer so long as it would not significantly deteriorate the surface properties (hydrophilicity, wettability, and/or lubricity) of a SiHy contact lens.

In another preferred embodiment, the two outer hydrogel layers of a hydrated SiHy contact lens of the invention comprise a water content higher than the water content (designated $WC_{Lens}$) of the hydrated silicone hydrogel contact lens and more specifically must be at least about 1.2 folds (i.e., 120%) of $WC_{Lens}$. It is believed that the water-swelling ratio of each outer hydrogel layer can represent approximately the water content of the outer hydrogel layer as discussed above. Where $WC_{Lens}$ is about 45% or less, the water-swelling ratio of each outer hydrogel layer is preferably at least at least about 150%, more preferably at least about 200%, more preferably at least about 250%, even more preferably at least about 300%. Where $WC_{Lens}$ is higher than 45%, the water-swelling ratio of each outer hydrogel layer is at least about $$\frac{120 \cdot WC_{Lens}}{1 - WC_{Lens}}\%,$$

preferably about $$\frac{130 \cdot WC_{Lens}}{1 - WC_{Lens}}\%,$$

more preferably about $$\frac{140 \cdot WC_{Lens}}{1 - WC_{Lens}}\%,$$

even more preferably about $$\frac{150 \cdot WC_{Lens}}{1 - WC_{Lens}}\%.$$

In alternatively preferred embodiments, where $WC_{Lens}$ is about 55% or less, the water-swelling ratio of each outer hydrogel layer is at least about 150%; where $WC_{Lens}$ is about 60% or less, the water-swelling ratio of each outer hydrogel layer is at least about 200%; where $WC_{Lens}$ is about 65% or less, the water-swelling ratio of each outer hydrogel layer is at least about 250%; where $WC_{Lens}$ $WC_{Lens}$ is about 70% or less, the water-swelling ratio of each outer hydrogel layer is at least about 300%.

Preferably, the SiHy contact lens further comprises a transition layer located between the silicone hydrogel material and the outer hydrogel layer. All of the various embodiments of the transition layer as described for the previous aspect of the invention can be used, alone or in any combination, in this aspect of the invention.

A hydrated SiHy contact lens of the invention can be prepared according to the methods described above. All of the various embodiments of the inner layer (i.e., silicone hydrogel material) described above can be used, alone or in any combination, in this aspect of the invention as the silicone hydrogel core. All of the various embodiments as described above for the previous aspect of the invention can be used, alone or in any combination, in this aspect of the invention.

It should be understood that although in this aspect of the invention various embodiments including preferred embodiments of the invention may be separately described above, they can be combined and/or used together in any desirable fashion to arrive at different embodiments of a silicone hydrogel contact lenses of the invention. All of the various embodiments described above for the previous aspect of the invention can be used alone or in combination in any desirable fashion in this aspect of the invention.

In a further aspect, the invention provides a hydrated silicone hydrogel contact lens. A hydrated silicone hydrogel contact lens of the invention comprises: a silicone hydrogel material as bulk material, an anterior surface and an opposite posterior surface; wherein the contact lens has (1) an oxygen transmissibility of at least about 40, preferably at least about 60, more preferably at least about 80, even more preferably at least about 110 barrers/mm, and (2) a surface lubricity characterized by having a critical coefficient of friction (designated as CCOF) of about 0.046 or less, preferably about 0.043 or less, more preferably about 0.040 or less, wherein the anterior and posterior surfaces have a low surface concentration of negatively-charged groups including carboxylic acid groups as characterized by attracting at most about 200, preferably at most about 160, more preferably at most about 120, even more preferably at most about 90, most preferably at most about 60 positively-charged particles in positively-charged-particles-adhesion test.

In a preferred embodiment, the hydrated silicone hydrogel contact lens has an elastic modulus (or Young's Modulus) of from about 0.3 MPa to about 1.8 MPa, preferably from about 0.4 MPa to about 1.5 MPa, more preferably from about 0.5 MPa to about 1.2 MPa; a water content of from about 10% to about 75%, preferably from about 10% to about 70%, more preferably from about 15% to about 65%; even more preferably from about 20% to about 60%, most preferably from about 25% to about 55% by weight; a surface wettability characterized by having an averaged water contact angle of about 90 degrees or less, preferably about 80 degrees or less, more preferably about 70 degrees or less, even more preferably about 60 degrees or less, most preferably about 50 degrees or less; a surface hydrophilicity characterized by having a WBUT of at least about 10 seconds; or combinations thereof.

In another preferred embodiment, the hydrated SiHy contact lens preferably has a high digital-rubbing resistance as characterized by having no surface cracking lines visible under dark field after the SiHy contact lens is rubbed between fingers. It is believed that digital-rubbing-induced surface cracking may reduce the surface lubricity and/or may not be able prevent silicone from migrating onto the surface (exposure).

In another preferred embodiment, a hydrated SiHy contact lens of the invention comprises an inner layer of the silicone hydrogel material, an anterior outer hydrogel layer, and a posterior outer hydrogel layer, wherein the anterior and posterior outer hydrogel layers are substantially uniform in thickness and merge at the peripheral edge of the contact lens to completely enclose the inner layer of the silicone hydrogel material. It is understood that the first and second outer zones in the cross-sectional surface modulus profile correspond to the two outer hydrogel layers while the inner zone corresponds to the inner layer of the silicone hydrogel material. All of the various embodiments of the outer hydrogel layers (crosslinked coating) as described above for the other aspect of the invention can be used, alone or in any combination, in this aspect of the invention as the outer hydrogel layers. All of the various embodiments of the inner layer of a silicone hydrogel material as described above for the other aspect of the invention can be used, alone or in any combination, in this aspect of the invention as the inner layer of the silicone hydrogel material.

In accordance with this aspect of the invention, the outer hydrogel layers are substantially uniform in thickness and have a thickness of at least about 0.1 µm, preferably from about 0.1 µm to about 20 µm, more preferably from about 0.25 µm to about 15 µm, even more preferably from about 0.5 µm to about 12.5 µm, most preferably from about 1 µm to about 10 µm. The thickness of each outer hydrogel layer of a SiHy contact lens of the invention is determined by AFM analysis of a cross section of the SiHy contact lens in fully hydrated state as described above. In a more preferred embodiment, the thickness of each outer hydrogel layer is preferably at most about 30% (i.e., 30% or less), preferably at most about 20% (20% or less), more preferably at most about 10% (10% or less) of the center thickness of the SiHy contact lens in fully hydrated state. In addition, each of the two outer hydrogel layers is substantially free of silicone (as characterized by having a silicon atomic percentage of about 5% or less, preferably about 4% or less, even more preferably about 3% or less, of total elemental percentage, as measured by XPS analysis of the contact lens in dried state), preferably totally free of silicone. It is understood that a small percentage of silicone may be optionally (but preferably not) incorporated into the polymer network of the outer hydrogel layer so long as it would not significantly deteriorate the surface properties (hydrophilicity, wettability, and/or lubricity) of a SiHy contact lens. To have a low surface concentration of negatively charged groups (e.g., carboxylic acid groups), the anterior and posterior outer hydrogel layers should have a relatively low carboxylic acid content. Preferably the anterior and posterior outer hydrogel layers have a carboxylic acid content of about 20% by weight or less, preferably about 15% by weight or less, even more preferably about 10% by weight or less, most preferably about 5% by weight or less.

In another preferred embodiment, the two outer hydrogel layers of a hydrated SiHy contact lens of the invention comprise a water content higher than the water content (designated $WC_{Lens}$) of the hydrated silicone hydrogel contact lens and more specifically must be at least about 1.2 folds (i.e., 120%) of the water content ($WC_{Lens}$) of the hydrated silicone hydrogel contact lens. It is believed that the water-swelling ratio of each outer hydrogel layer can represent approximately the water content of the outer hydrogel layer as discussed above. Where $WC_{Lens}$ is about 45% or less, the water-swelling ratio of each outer hydrogel layer is preferably at least at least about 150%, more preferably at least about 200%, more preferably at least about 250%, even more preferably at least about 300%. Where $WC_{Lens}$ is higher than 45%, the water-swelling ratio of each outer hydrogel layer is at least about $$\frac{120 \cdot WC_{Lens}}{1 - WC_{Lens}}\%,$$

preferably about $$\frac{130 \cdot WC_{Lens}}{1 - WC_{Lens}}\%,$$

more preferably about $$\frac{140 \cdot WC_{Lens}}{1 - WC_{Lens}}\%,$$

even more preferably about $$\frac{150 \cdot WC_{Lens}}{1 - WC_{Lens}}\%.$$

In alternatively preferred embodiments, where $WC_{Lens}$ is about 55% or less, the water-swelling ratio of each outer hydrogel layer is at least about 150%; where $WC_{Lens}$ is about 60% or less, the water-swelling ratio of each outer hydrogel layer is at least about 200%; where $WC_{Lens}$ is about 65% or less, the water-swelling ratio of each outer hydrogel layer is at least about 250%; where $WC_{Lens}$ is about 70% or less, the water-swelling ratio of each outer hydrogel layer is at least about 300%.

In another preferred embodiment, the anterior and posterior outer hydrogel layers independent of each other have a reduced surface modulus of at least about 20%, preferably at least about 25%, more preferably at least about 30%, even more preferably at least about 35%, most preferably at least about 40%, relative to the inner layer.

Preferably, the SiHy contact lens further comprises a transition layer located between the silicone hydrogel material and the outer hydrogel layer. All of the various embodiments of the transition layer as described for the previous aspect of the invention can be used, alone or in any combination, in this aspect of the invention.

A hydrated SiHy contact lens of the invention can be prepared according to the methods described above. All of the various embodiments of the inner layer (i.e., silicone hydrogel material) described above can be used, alone or in any combination, in this aspect of the invention as the silicone hydrogel core. All of the various embodiments as described above for the previous aspect of the invention can be used, alone or in any combination, in this aspect of the invention.

It should be understood that although in this aspect of the invention various embodiments including preferred embodiments of the invention may be separately described above, they can be combined and/or used together in any desirable fashion to arrive at different embodiments of a silicone hydrogel contact lenses of the invention. All of the various embodiments described above for the previous aspect of the invention can be used alone or in combination in any desirable fashion in this aspect of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various aspects and various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

EXAMPLE 1

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$/min., while a nitrogen stream is passed on the opposite side of the lens at a rate of about 10 to 20 $cm^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters $O_2$/$cm^2$-minute]
$P_{oxygen}$=($P_{measured}$-$P_{water}$ vapor)=(% $O_2$ in air stream) [mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
$Dk_{app}$ is expressed in units of barrers.

The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference lotrafilcon A (Focus® N&D®) from CIBA VISION CORPORATION) or lotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of lotrafilcon A or lotrafilcon B (reference) lenses using the same equipment according to the procedure for apparent Dk measurements described above, to obtain the intrinsic Dk value ($Dk_i$) of the reference lens. A thickness series should cover a thickness range of approximately 100 μm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum\left(\frac{t}{Dk_{app}} - \frac{t}{Dk_i}\right)}{n} \quad (1)$$

in which t is the thickness of the test lens (i.e., the reference lens too), and n is the number of the reference lenses measured. Plot the residual oxygen resistance value, $R_r$ vs. t data and fit a curve of the form Y=a+bX where, for the jth lens, $Y_j=(\Delta P/J)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c = t/[(t/Dk_a) - R_r] \quad (2)$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for lotrafilcon A=85 μm. The standard thickness for lotrafilcon B=60 μm.

$$Dk_{a\_std} = t_{std}/[(t_{std}/Dk_c) + R_{r\_std}] \quad (3)$$

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm²/minute.

Lubricity Evaluation

The lubricity rating is a qualitative ranking scheme where 0 is assigned to control lenses coated with polyacrylic acid, 1 is assigned to Oasys™/TruEye™ commercial lenses and 4 is assigned to commercial Air Optix™ lenses. The samples are rinsed with excess DI water for at least three times and then transferred to PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than Air Optix™ lenses, then they are assigned a number 3. For consistency, all ratings are independently collected by the same two operators in order to avoid bias and the data reveal good qualitative agreement and consistency in the evaluation.

Surface Wettability Tests. Water contact angle on a contact lens is a general measure of the surface wettability of the contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩ cm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-Up Time (WBUT) Tests. The surface hydrophilicity of the lenses (after autoclave) is assessed by determining the time required for the water film to start breaking on the lens surface. Briefly, lenses are removed from the vial and washed 3 times in ~200 ml of fresh DI water in order to remove loosely bound packaging additives from the lens surface. The lens is removed from the solution and held with tweezers against a bright light source. The time that is needed for the water film to break (de-wet) exposing the underlying lens material is noted visually. Uncoated lenses typically instantly break upon removal from DI water and are assigned a WBUT of 0 seconds. Lenses exhibiting WBUT≥5 seconds are considered good hydrophilicity and are expected to exhibit adequate ability to support the tear film on-eye.

Coating Intactness Tests. The intactness of a coating on the surface of a contact lens can be tested according to Sudan Black stain test as follow. Contact lenses with a coating (an LbL coating, a plasma coating, or any other coatings) are dipped into a Sudan Black dye solution (Sudan Black in vitamin E oil) and then rinsed extensively in water. Sudan Black dye is hydrophobic and has a great tendency to be absorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated.

Tests of Coating Durability. The lenses are digitally rubbed with Solo-Care® multi-purpose lens care solution for 30 times and then rinsed with saline. The above procedure is repeated for a given times, e.g., from 1 to 30 times, (i.e., number of consecutive digital rubbing tests which imitate cleaning and soaking cycles). The lenses are then subjected to Sudan Black test (i.e., coating intactness test described above) to examine whether the coating is still intact. To survive digital rubbing test, there is no significantly increased staining spots (e.g., staining spots covering no more than about 5% of the total lens surface). Water contact angles are measured to determine the coating durability.

Determination of Azetidinium Content. The azetidinium content in PAE can be determined according to one of the following assays.

PPVS Assays. PAE charge density (i.e., azetidinium content) can be determined according to PPVS assay, a colorimetric titration assay where the titrant is potassium vinyl sulfate (PPVS) and Toluidine Blue is the indicator. See, S-K Kam and J. Gregory, "Charge determination of synthetic cationic polyelectrolytes by colloid titration," in Colloid & Surface A: Physicochem. Eng. Aspect, 159: 165-179 (1999). PPVS binds positively-charged species, e.g., Toluidine Blue and the azetidinium groups of PAE. Decreases in Toluidine Blue absorbance intensities are indicative of proportionate PAE charge density (azetidinium content).

PES-Na Assay. PES-Na assay is another colorimetric titration assay for determining PAE charge density (azetidinium content). In this assay, the titrant is Sodium-polyethylensulphonate (PES-Na) instead of PPVS. The assay is identical to the PPVS assay described above.

PCD Assays. PCD assay is a potentiometric titration assay for determining PAE charge density (azetidinium content). The titrant is Sodium-polyethylensulphonate (PES-Na), PPVS or other titrant. PAE charge is detected by an electrode, for example using the Mütek PCD-04 Particle Charge Detector from BTG. The measuring principle of this detector can be found in BTG's website http://www.btg.com/products.asp?langage=1&appli=5&numProd=357&cat=prod).

NMR Method. The active positively charged moiety in PAE is the azetidinium group (AZR). The NMR ratio method is a ratio of the number of AZR group-specific protons versus the number of non-AZR related protons. This ratio is an indicator of the charge or AZR density for PAE.

Debris Adhesion Test. Contact lenses with a highly charged surface can be susceptible to increased debris adhesion during patient handling. A paper towel is rubbed against gloved hands and then both sides of the lens are rubbed with the fingers to transfer any debris to the lens surface. The lens is briefly rinsed and then observed under a microscope. A qualitative rating scale from 0 (no debris adhesion) to 4 (debris adhesion equivalent to a PAA coated control lens) is used to rate each lens. Lenses with a score of "0" or "1" are deemed to be acceptable.

EXAMPLE 2

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. About 0.235 g of DBTDL is added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

EXAMPLE 3

Preparation of Lens Formulations

A lens formulation is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Preparation of Lenses

Lenses are prepared by cast-molding from the lens formulation prepared above in a reusable mold, similar to the mold shown in FIGS. 1-6 in U.S. Pat. Nos. 7,384,590 and 7,387,759 (FIGS. 1-6). The mold comprises a female mold half made of $CaF_2$ and a male mold half made of PMMA. The UV irradiation source is a Hamamatsu lamp with the WG335+TM297 cut off filter at an intensity of about 4 $mW/cm^2$. The lens formulation in the mold is irradiated with UV irradiation for about 25 seconds. Cast-molded lenses are extracted with isopropanol (or methyl ethyl ketone, MEK), rinsed in water, coated with polyacrylic acid (PAA) by dipping lenses in a propanol solution of PAA (0.1% by weight, acidified with formic acid to about pH 2.5), and hydrated in water. Resultant lenses having a reactive PAA-LbL base coating thereon are determined to have the following properties: ion permeability of about 8.0 to about 9.0 relative to Alsacon lens material; apparent Dk (single point) of about 90 to 100; a water content of about 30% to about 33%; and a bulk elastic modulus of about 0.60 MPa to about 0.65 MPa.

EXAMPLE 4

An in-package coating (IPC) saline is prepared by adding 0.2% polyamidoamine-epichlorohydrin (PAE) (Kymene from Ashland as an aqueous solution and used as received, azetidinium content of 0.46 assayed with NMR) in phosphate buffer saline (PBS hereinafter) (about 0.044 w/w % $NaH_2PO_4.H_2O$, about 0.388 w/w % $Na_2HPO_4.2H_2O$, about 0.79 w/w % NaCl) and the pH is then adjusted to 7.2-7.4.

Lenses from Example 3 are placed in a polypropylene lens packaging shell with 0.6 mL of the IPC saline (half of the IPC saline is added prior to inserting the lens). The blister is then sealed with foil and autoclaved for about 30 minutes at 121° C., forming crosslinked coatings (PAA-x-PAE coating) on the lenses.

Then the lenses are evaluated for debris adhesion, surface cracking, lubricity, contact angle and water break-up time (WBUT). The test lenses (packaged/autoclaved in the IPC saline, i.e., lenses having PAA-x-PAE coating thereon) show no debris adhesion after being rubbed against a paper towel while control lenses (packaged/autoclaved in PBS, i.e., lenses having a PAA-LbL base coating thereon) show severe debris adhesion. The water contact angle (WCA) of the test lenses is low (~20 degrees) but the WBUT is less than 2 seconds. When observed under dark field microscope, severe cracking lines are visible after handling the lens (lens inversion and rubbing between the fingers). The test lenses are much less lubricous than the control lenses as judged by a qualitative finger-rubbing test.

EXAMPLE 5

Poly(acrylamide-co-acrylic acid) (or PAAm-PAA or poly(AAm-co-AA) or p(AAm-co-AA)) partial sodium salt (~80% solid content, Poly(AAm-co-AA)(80/20), Mw. 520,000, Mn 150,000) is purchased from Aldrich and used as received.

An IPC saline is prepared by dissolving 0.02% of Poly(AAm-co-AA)(80/20) and 0.2% of PAE (Kymene from Ashland as an aqueous solution and used as received, azetidinium content of 0.46 assayed with NMR) in PBS. The pH is adjusted to 7.2~7.4. PBS is prepared by dissolving 0.76% NaCl, 0.044% $NaH_2PO_4.H_2O$ and 0.388% $Na_2HPO_4.2H_2O$ in water.

Lenses having a PAA-LbL base coating thereon prepared in Example 3 are placed in a polypropylene lens packaging shell with 0.6 mL of the IPC saline (half of the saline is added prior to inserting the lens). The blister is then sealed with foil and autoclaved for about 30 minutes at about 121° C. It is believed that a crosslinked coating composed of three layers PAA-x-PAE-x-poly(AAm-co-AA) is formed on the lenses during autoclave.

The test lenses (packaged/autoclaved in the IPC saline, i.e., lenses having PAA-x-PAE-x-poly(AAm-co-AA) crosslinked coating thereon) have no debris adhesion after being rubbed against a paper towel. The test lenses have a WBUT of longer than 10 seconds. When observed under dark field microscope, cracking lines are visible after rubbing the test lenses. The test lenses are much more lubricous than the test lenses from Example 4 but still not as lubricous as the control lenses packaged in PBS.

EXAMPLE 6

An IPC saline is prepared by dissolving 0.02% of poly(AAm-co-AA) (80/20) and 0.2% of PAE (Kymene from Ashland as an aqueous solution and used as received, azetidinium content of 0.46 assayed with NMR) in PBS and adjusting the pH to 7.2~7.4. Then the saline is then treated by heating to and at about 70° C. for 4 hours (heat pre-treatment). During this heat pretreatment, poly(AAm-co-AA) and PAE are partially crosslinked between each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the final IPC saline is filtered using a 0.22 micron polyether sulphone (PES) membrane filter and cooled down back to room temperature.

Lenses having a PAA-LbL base coating thereon prepared in Example 3 are placed in a polypropylene lens packaging shell with 0.6 mL of the IPC saline (half of the saline is added prior to inserting the lens). The blister is then sealed with foil and autoclaved for about 30 minutes at about 121° C., forming a crosslinked coating (PAA-x-hydrophilic polymeric material) on the lenses.

The test lenses (packaged in the heat-pretreated IPC saline, i.e., lenses having PAA-x-hydrophilic polymeric material coating thereon) show no debris adhesion after being rubbed against paper towel while the control lenses (packaged in PBS, i.e., lenses having a non-covalently attached layer of PAA thereon) show severe debris adhesion. The test lenses have a WBUT of longer than 10 seconds. When observed under dark field microscope, no cracking lines are visible after rubbing the test lens. The test lenses are very lubricious in a finger rubbing test and equivalent to the control lenses.

A series of experiments are carried out to study the effects of the conditions (duration and/or temperature) of heat pre-treatment of the IPC saline upon the surface properties of resultant lenses coated with the IPC saline. Heat treatment times of about 6 hours or longer at about 70° C. result in lenses that are susceptible to debris adhesion similar to the control lenses. It is believed that longer preheating treat may consume most azetidinium groups and as such numbers of azetidinium groups left in the branched polymer network of the resultant water-soluble polymeric material are insufficient to attach the polymeric material to the PAA coating. Heat treatment for only 4 hours at 50° C. results in lenses that show surface cracking lines under dark field microscopy after being rubbed between the fingers similar to the test lenses in Example 5 where the IPC saline is not heat pre-treated. It is believed that shorter preheating treat may consume a small amount azetidinium groups and as such numbers of azetidinium groups left in the branched polymer network of the resultant water-soluble polymeric material are high so that the resultant crosslinked coating (PAA-x-hydrophilic polymeric material) on the lenses may have too high crosslinking density.

EXAMPLE 7

Poly(acrylamide-co-acrylic acid) partial sodium salt (~90% solid content, poly(AAm-co-AA) 90/10, Mw 200,000) is purchased from Polysciences, Inc. and used as received.

An IPC saline is prepared by dissolving 0.07% of PAAm-PAA (90/10) and 0.2% of PAE (Kymene from Ashland as an aqueous solution and used as received, azetidinium content of 0.46 assayed with NMR) in PBS and adjusting the pH to 7.2~7.4. Then the saline is heat pre-treated for about 4 hours at about 70° C. (heat pre-treatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron polyether sulphone [PES] membrane filter and cooled down back to room temperature.

Lenses having a PAA-LbL base coating thereon prepared in Example 3 and uncoated Lotrafilcon B lenses (from CIBA VISION CORPORATION) that are dipped into an acidic propanol solution of PAA (ca. 0.1%, pH ~2.5) are placed in a polypropylene lens packaging shells with 0.6 mL of the heat-pretreated IPC saline (half of the IPC saline is added prior to inserting the lens). The blister is then sealed with foil and autoclaved for about 30 minutes at 121° C., forming a crosslinked coating (PAA-x-hydrophilic polymeric material) on the lenses.

The test lenses (both Lotrafilcon B and Example 3 lenses having a PAA-x-hydrophilic polymer thereon) have no debris adhesion after being rubbed against paper towel. The test lenses have a WBUT of longer than 10 seconds. When observed under dark field microscope, cracking lines are not visible after rubbing the lenses between the fingers. The lenses are extremely lubricous in qualitative finger rubbing tests.

EXAMPLE 8

In design of experiments (DOE), IPC salines are produced to contain from between about 0.05% and about 0.09% PAAm-PAA and from about 0.075% to about 0.19% PAE (Kymene from Ashland as an aqueous solution and used as received, azetidinium content of 0.46 assayed with NMR) in PBS. The IPC salines are heat-treated for 8 hours at 60° C. and lenses from Example 3 are packaged in the heat-pretreated IPC salines. No differences in the final lens surface properties are observed and all lenses showed excellent lubricity, resistance to debris adhesion, excellent wettability, and no evidence of surface cracking.

EXAMPLE 9

In design of experiments (DOE), IPC salines are produced to contain about 0.07% PAAm-PAA and sufficient PAE to provide an initial azetidinium content of approximately 8.8 millimole equivalents/Liter (~0.15% PAE). The heat pre-treatment conditions are varied in a central composite design from 50° C. to 70° C. and the pre-reaction time is varied from about 4 to about 12 hours. A 24 hour pre-treatment time at 60° C. is also tested. 10 ppm hydrogen peroxide is then added to the salines to prevent bioburden growth and the IPC salines are filtered using a 0.22 micron polyether sulphone [PES] membrane filter.

Lenses from Example 3 are packaged in the heat-pretreated IPC salines and the blisters are then autoclaved for 45 minutes at 121° C. All lenses have excellent lubricity, wettability, and resistance to surface cracking. Some of the lenses show debris adhesion from paper towels as indicated in Table 1.

TABLE 1

Debris Adhesion Evaluation

| Time (hrs) | Temperature (° C.) | | | | |
|---|---|---|---|---|---|
| | 50 | 55 | 60 | 65 | 70 |
| 4 | | | pass | | |
| 6 | | pass | | pass | |
| 8 | pass | | pass | | fail |
| 10 | | pass | | fail | |
| 12 | | | pass | | |
| 24 | | | | | fail |

EXAMPLE 10

Copolymers of methacryloyloxyethyl phosphorylcholine (MPC) with one carboxyl-containing vinylic monomer ($CH_2$=$CH(CH_3)C(O)OC_2H_4OC(O)C_2H_4COOH$ (MS), methacrylic acid (MA)) in the absence or presence of butyl-methacrylate (BMA) are evaluated in an in-package coating systems in combination with PAE.

PBS containing NaCl (0.75% by weight), $NaH_2PO_4.H2O$ (0.0536% by weight), $Na_2HPO_4.2H_2O$ (0.3576% by weight) and DI water (97.59% by weight) is prepared and 0.2% PAE (polycup 3160) is added. The pH is adjusted to about 7.3.

0.25% of one of several MPC copolymers is then added to form an IPC saline and the IPC saline is heat pre-treated at 70° C. for 4 hours (heat pre-treatment). During this heat pretreatment, MPC and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After 4 hours, the heat-pretreated IPC saline is filtered through 0.2 micron Polyether sulphone [PES} membrane filters (Fisher Scientific catalog#09-741-04, Thermo Scientific nalgene #568-0020 (250 ml).

Lenses having a PAA-LbL base coating thereon prepared in Example 3 are packaged in the heat-pretreated IPC saline and autoclaved for about 30 minutes at 121° C. Table 2 shows that all lenses possess excellent surface properties.

TABLE 2

| MPC Copolymer* | D.A. | Cracking | Lubricity | Wettability WBUT (sec.) |
|---|---|---|---|---|
| Poly(MPC/MA) 90/10 | pass | pass | excellent | excellent |
| Poly(MPC/BMA/MA) 40/40/20 | pass | pass | excellent | excellent |
| Poly(MPC/BMA/MA) 70/20/10 | pass | pass | excellent | excellent |
| Poly(MPC/BMA/MS) 70/20/10 | pass | pass | excellent | excellent |

*The numbers are molar percents of monomer units in the copolymer.
D.A. = Debris Adhesion WBUT is longer than 10 seconds.

EXAMPLE 11

PAA-Coated Lenses. Lenses cast-molded from a lens formulation prepared in Example 3 according to the molding process described in Example 3 are extracted and coated by dipping in the following series of baths: 3 MEK baths (22, 78 and 224 seconds); DI water bath (56 seconds); 2 baths of PAA coating solution (prepared by dissolving 3.6 g of PAA (M.W.: 450 kDa, from Lubrizol) in 975 ml of 1-propanol and 25 ml of formic acid) for 44 and 56 seconds separately; and 3 DI water baths each for 56 seconds.

PAE/PAA-Coated Lenses. The above-prepared lenses with a PAA base coating thereon are dipped successively into the following baths: 2 baths of PAE coating solution, which is prepared by dissolving 0.25 wt % of PAE (Polycup 172, from Hercules) in DI water and adjusting the pH to about 5.0 using sodium hydroxide and finally filtering the resultant solution using a 5 um filter, for 44 and 56 seconds respectively; and 3 baths of DI water each for 56 seconds. After this treatment, the lenses have one layer of PAA and one layer of PAE.

Lenses with PAA-x-PAE-x-CMC Coatings Thereon. One batch of lenses with one layer of PAA and one layer of PAE thereon are packaged in a 0.2% Sodium carboxymethylcellulose (CMC, Product#7H 3SF PH, Ashland Aqualon) in phosphate buffer saline (PBS) and the pH is then adjusted to 7.2-7.4. The blisters are then sealed and autoclaved for about 30 minutes at 121° C., forming crosslinked coatings (PAA-x-PAE-x-CMC) on the lenses.

Lenses with PAA-x-PAE-x-HA Coatings Thereon. Another batch of lenses with one layer of PAA and one layer of PAE thereon are packaged in 0.2% Hyaluronic acid (HA, Product#6915004, Novozymes) in phosphate buffer saline (PBS) and the pH is then adjusted to 7.2-7.4. The blisters are then sealed and autoclaved for about 30 minutes at 121° C., forming crosslinked coatings (PAA-x-PAE-x-HA) on the lenses.

The resultants lenses either with PAA-x-PAE-x-CMC coating or with PAA-x-PAE-x-HA coating thereon show no Sudan black staining, no debris adhesion, and no cracking under microscopy examination. The lenses with PAA-x-PAE-x-CMC coating thereon have an average contact angle of 30±3 degrees, while the lenses PAA-x-PAE-x-HA coating thereon have an average contact angle of 20±3 degrees.

EXAMPLE 12

IPC Solution Preparation. A reaction mixture is prepared by dissolving 2.86% by weight of mPEG-SH 2000 (Methoxy-Poly(Ethylene Glycol)-Thiol, Avg MW 2000, Product #MPEG-5H-2000, Laysan Bio Inc.) along with 2% by weight of PAE (Kymene from Ashland as an aqueous solution and used as received, azetidinium content of 0.46 assayed with NMR) in PBS and the final pH adjusted to 7.5. The solution is heat-treated for about 4 hours at 45° C. (heat pre-treatment). During this heat pretreatment, mPEG-SH 2000 and PAE are reacted with each other to form a water-soluble and thermally-crosslinkable hydrophilic polymeric material containing azetidinium groups and chemically-grafted polyethyleneglycol polymer chains. After the heat-treatment, the solution is diluted with 10-fold PBS containing 0.25% sodium citrate, pH adjusted to 7.2~7.4, and then filtered using 0.22 micron polyether sulphone (PES) membrane filter. The final IPC saline contains 0.286% by weight of hydrophilic polymeric material (consisting of about 59% by weight of MPEG-5H-2000 chains and about 41% by weight of PAE chains) and 0.25% Sodium citrate dihydrate. The PBS is prepared by dissolving 0.74% NaCl, 0.053% $NaH_2PO_4 \cdot H_2O$ and 0.353% $Na_2HPO_4 \cdot 2H_2O$ in water.

Lenses with Crosslinked Coatings Thereon. PAA-coated lenses from Example 11 are packaged in the above IPC saline in polypropylene lens packaging shells and then autoclaved for about 30 minutes at about 121° C., forming a crosslinked coating on the lenses.

The final lenses show no debris adhesion, no cracking lines after rubbing the lens. The lenses are very lubricious in a finger rubbing test comparable to control PAA-coated lenses.

A series of experiments are carried out to study the effects of the conditions (reaction time and solution concentration of mPEG-SH2000 (with constant PAE concentration 2%) upon the surface properties of the resultant lenses coated with the IPC saline. The results are shown in Table 3.

TABLE 3

| [mPEG-SH2000][1] (wt %) | Reaction time @ 45° C. (hr) | D.A. | Cracking | Lubricity Test 1 | Test 2 | WCA |
|---|---|---|---|---|---|---|
| 2.86 | 0 | 0,2 | 0, 2; 2, NA | 3 | 3 | 17 |
| 2.86 | 0.5 | 0,0 | 0, 2; 0, 2 | 2-3 | 2 | 21 |
| 2.86 | 2 | 0,0 | 0, 0; 0, 0 | 2 | 2 | 20 |
| 2.86 | 4 | 0,0 | 0, 0; 0, 0 | 1-2 | 1 | 37 |
| 0.5 | 4 | 0 | 0, 2; NA | 4 | 3-4 | 15 |
| 1.5 | 4 | 0 | 0, 0; NA | 3 | 3 | 20 |
| 6 | 4 | 0 | 0, 0; NA | 0-1 | 0 | 51 |

D.A. = debris adhesion;
WCA = water contact angle.
[1]PAE concentration: 2% by weight.

As the solution concentration of mPEGSH2000 increases, the lens lubricity increases accordingly. It is believed that the increase in the contact angle of the surface may be due to the increasing density of terminal methyl groups on the surface with increasing grafting density. At high grafting densities, corresponding to a solution concentration of 0.6%, the contact angle approaches measurements obtained on Polyethylene glycol (PEG) monolayer grafted flat substrates (Reference: *Langmuir* 2008, 24, 10646-10653).

EXAMPLE 13

A series of experiments are carried out to study the effects of molecular weight of the mPEG-SH. The IPC saline is prepared similar to the procedure described in Example 12. However, the following mPEG-SH are used to prepare the saline: mPEG-SH 1000, mPEG-SH 2000, mPEG-SH 5000 and mPEG-SH 20000. All the salines are subjected to heat treatment at 45° C. for 4 hours and 10-fold dilution. The results and the reaction conditions are shown below:

| mPEG-SH M.W. (Daltons) | Conc. (%)* | D.A. | Cracking | Lubricity Test 1 | Test 2 | WCA |
|---|---|---|---|---|---|---|
| 1000 | 1.5 | No | No | 2 | 1 | 21 |
| 1000 | 2.86 | No | No | 1 | 1 | 27 |
| 2000 | 1.5 | No | No | 2 | 2 | 28 |
| 2000 | 2.86 | No | No | 0-1 | 0 | 21 |
| 5000 | 1.5 | No | No | 2 | 2 | 18 |
| 5000 | 2.86 | No | No | 0-1 | 0-1 | 26 |
| 20000 | 1.5 | No | No | 3 | 2 | 21 |
| 20000 | 2.86 | No | No | 2 | 1 | 21 |

D.A. = debris adhesion;
WCA = water contact angle.
*The initial concentration of MPEG-SH in the IPC saline with 2% PAE therein before the heat pretreatment and the 10-fold dilution.

EXAMPLE 14

A reaction mixture is prepared by dissolving 2.5% of mPEG-SH 2000, 10% of PAE (Kymene from Ashland as an aqueous solution and used as received, azetidinium content of 0.46 assayed with NMR) in PBS and 0.25% of sodium citrate dihydrate. The pH of this solution is then adjusted to 7.5 and also degassed by bubbling nitrogen gas through the container for 2 hours. This solution is later heat treated for about 6 hours at 45° C. forming a thermally crosslinkable hydrophilic polymeric material containing mPEG-5H-2000 groups chemically grafted onto the polymer by reaction with the Azetidinium groups in PAE. After the heat-treatment, the solution is diluted 50-fold using PBS containing 0.25% sodium citrate, pH adjusted to 7.2~7.4, and then filtered using 0.22 micron polyether sulphone (PES) membrane filter. The final IPC saline contains about 0.30% by weight of the polymeric material (consisting of about 17% wt.mPEG-5H-2000 and about 83% wt. PAE) and 0.25% Sodium citrate dihydrate.

PAA-coated lenses from Example 11 are packaged in the above IPC saline in polypropylene lens packaging shells and then autoclaved for about 30 minutes at about 121° C., forming a crosslinked coating on the lenses.

The final lenses show no debris adhesion, no cracking lines after rubbing the lens. The test lenses are very lubricious in a finger rubbing test comparable to control PAA-coated lenses.

EXAMPLE 15

A reaction mixture is prepared by dissolving 3.62% of mPEG-NH$_2$ 550 (methoxy-poly(ethyleneglycol)-amine, M.W. ~550 (Product #MPEG-NH$_2$-550, Laysan Bio Inc.) along with 2% of PAE (Kymene from Ashland as an aqueous solution and used as received, azetidinium ratio of 0.46 assayed with NMR) in PBS and the final pH adjusted to 10. The solution is heat-treated for about 4 hours at 45° C. forming a thermally crosslinkable hydrophilic polymeric material containing MPEG-NH$_2$-550 groups chemically grafted onto the polymer by reaction with the azetidinium groups in PAE. After the heat-treatment, the solution is diluted with 10-fold PBS containing 0.25% sodium citrate, pH adjusted to 7.2~7.4, and then filtered using 0.22 micron polyether sulphone (PES) membrane filter. The final IPC saline contains about 0.562% wt. of polymeric material (consisting of 64% wt. MPEG-SH-2000 and about 36% wt. PAE) and 0.25% Sodium citrate dihydrate. PBS is prepared by dissolving 0.74% NaCl, 0.053% NaH$_2$PO$_4$.H$_2$O and 0.353% Na$_2$HPO$_4$.2H$_2$O in water.

PAA-coated lenses from Example 11 are packaged in the above IPC saline in polypropylene lens packaging shells and then autoclaved for about 30 minutes at about 121° C., forming a crosslinked coating on the lenses.

The final lenses show no debris adhesion, and no cracking lines are observed after digitally (finger) rubbing the lens.

EXAMPLE 16

Poloxamer 108 (sample) and nelfilcon A (CIBA VISION) are used as received. Nelfilcon A is a polymerizable polyvinyl alcohol obtained by modifying a polyvinyl alcohol (e.g., Gohsenol KL-03 from Nippon Gohsei or the like) with N-(2,2-Dimethoxyethyl)acrylamide under cyclic-acetal formation reaction conditions (Bühler et al., CHIMIA, 53 (1999), 269-274, herein incorporated by reference in its entirety). About 2.5% of vinyl alcohol units in nelfilcon A is modified by N-(2,2-Dimethoxyethyl)acrylamide.

IPC saline is prepared by dissolving 0.004% poloxamer 108, 0.8% nelfilcon A, 0.2% PAE (Kymene, Polycup 3160), 0.45% NaCl, and 1.1% Na$_2$HPO$_4$.2H$_2$O in DI water. The saline is heat pre-treated by stirring for 2 hrs at about 65-70° C. After heated pre-treatment, the saline is allowed to cool to room temperature and then filtered using a 0.2 μm PES filter.

Lenses prepared in Example 3 are placed in a polypropylene lens packaging shell with 0.6 mL of the IPC saline (half of the saline is added prior to inserting the lens). The blister is then sealed with foil and autoclaved for about 30 minutes at 121° C.

The test lenses show no debris adhesion after being rubbed against paper towel. The lenses had a WBUT of >10 seconds. When observed under dark foiled microscope, cracking lines are not visible after rubbing the lenses between the fingers. The lens is much more lubricous than the lenses from Example 4 but still not as lubricous as the PAA coated control lenses packaged in PBS.

EXAMPLE 17

A. Synthesis of 80% Ethylenically-Functionalized Chain-Extended Polysiloxane

KF-6001A (α,ω-bis(2-hydroxyethoxypropyl)-polydimethylsiloxane, Mn=2000, from Shin-Etsu) and KF-6002A (α,ω-bis(2-hydroxyethoxypropyl)-polydimethylsiloxane, Mn=3400, from Shin-Etsu) are separately dried at about 60° C. for 12 hours (or overnight) under high vacuum in a single neck flask. The OH molar equivalent weights of KF-6001A and KF-6002A are determined by titration of hydroxyl groups and are used to calculate the millimolar equivalent to be used in the synthesis.

A one-liter reaction vessel is evacuated overnight to remove moisture, and the vacuum broken with dry nitrogen. 75.00 g (75 meq) of dried KF6001A is charged to the reactor, and then 16.68 g (150 meq) of freshly distilled IPDI is added into the reactor. The reactor is purged with nitrogen and heated to 45° C. with stirring and then 0.30 g of DBTDL is added. The reactor is sealed, and a positive flow of nitrogen is maintained. An exotherm occurs, after which the reaction mixture is allowed to cool and stir at 55° C. for 2 hours. After reaching the exotherm, 248.00 g (150 meq) of dried KF6002A is added to the reactor at 55° C. and then 100 μL of DBTDL is added. The reactor is stirred for four hours. Heating is discontinued and the reactor is allowed to cool overnight. The nitrogen bubble is discontinued and the reactor is opened to atmosphere for 30 minutes with moderate stirring. A hydroxyl-terminated chain-extended polysiloxane having 3 polysiloxane segments, HO-PDMS-IPDI-PDMS-IPDI-PDMS-OH (or HO-CE-PDMS-OH), is formed.

For 80% ethylenically-functionalized polysiloxane, 18.64 g (120 meq) of IEM is added to the reactor, along with 100 μL of DBTDL. The reactor is stirred for 24 hours, and then product (80% IEM-capped CE-PDMS) is decanted and stored under refrigeration.

B: Synthesis of Non-UV-Absorbing Amphiphilic Branched Polysiloxane Prepolymer

A 1-L jacketed reactor is equipped with 500-mL addition funnel, overhead stirring, reflux condenser with nitrogen/vacuum inlet adapter, thermometer, and sampling adapter. The reactor is charged with 45.6 g of 80% IEM-capped CE-PDMS prepared above and sealed. A solution of 0.65 g of hydroxyethyl methacrylate (HEMA), 25.80 g of DMA, 27.80 g of (tris(trimethylsilyl))-siloxypropyl)methacrylate (TRIS), in 279 g of ethyl acetate is charged to the addition funnel. The reactor is degassed at <1 mbar for 30 minutes at RT with a high-vacuum pump. The monomer solution is degassed at 100 mbar and RT for 10 minutes for three cycles, breaking vacuum with nitrogen between degas cycles. The monomer solution is then charged to the reactor, and then the reaction mixture is stirred and heated to 67° C. While heating, a solution of 1.50 g of mercaptoethanol (chain transfer agent, CTA) and 0.26 g of azoisobutyronitrile dissolved in 39 g of ethyl acetate is charged to the addition funnel and deoxygenated three times at 100 mbar, RT for 10 minutes. When the reactor temperature reaches 67° C., the initiator/CTA solution is added to the PDMS/monomer solution in the reactor. The reaction is allowed to proceed for 8 hours, and then heating is discontinued and reactor temperature is brought to room temperature within 15 minutes.

The resultant reaction mixture then is siphoned to a dry single-neck flask with airtight lid, and 4.452 g of IEM is added with 0.21 g of DBTDL. The mixture is stirred 24 hs at room temperature, forming non-UV-absorbing amphiphilic branched polysiloxane prepolymer. To this mixture solution, 100 uL of hydroxy-tetramethylene piperonyloxy solution in ethyl acetate (2 g/20 mL) is added. The solution is then concentrated to 200 g (~50%) using rota-yap at 30° C. and filtered through 1 um pore size filter paper. After solvent exchange to 1-propanol, the solution is further concentrated to the desired concentration.

C. Synthesis of UV-Absorbing Amphiphilic Branched Polysiloxane Prepolymer

A 1-L jacketed reactor is equipped with 500-mL addition funnel, overhead stirring, reflux condenser with nitrogen/vacuum inlet adapter, thermometer, and sampling adapter. The reactor is then charged with 45.98 g of 80% IEM-capped CE-PDMS prepared above and the reactor is sealed. A solution of 0.512 g of HEMA, 25.354 g of DMA, 1.38 g of Norbloc methacrylate, 26.034 g of TRIS, in 263 g of ethyl acetate is charged to the addition funnel. The reactor is degassed at <1 mbar for 30 minutes at RT with a high-vacuum pump. The monomer solution is degassed at 100 mbar and RT for 10 minutes for three cycles, breaking vacuum with nitrogen between degas cycles. The monomer solution is then charged to the reactor, and then the reaction mixture is stirred and heated to 67° C. While heating, a solution of 1.480 g of mercaptoethanol (chain transfer agent, CTA) and 0.260 g of azoisobutyronitrile dissolved in 38 g of ethyl acetate is charged to the addition funnel and deoxygenated three times at 100 mbar, room temperature for 10 minutes. When the reactor temperature reaches 67° C., the initiator/CTA solution is added to the PDMS/monomer solution in the reactor. The reaction is allowed to proceed for 8 hours, and then heating is discontinued and reactor temperature is brought to room temperature within 15 min.

The resultant reaction mixture then is siphoned to a dry single-neck flask with airtight lid, and 3.841 g of isocyanatoethyl acrylate is added with 0.15 g of DBTDL. The mixture is stirred 24 hs at room temperature, forming a UV-absorbing amphiphilic branched polysiloxane prepolymer. To this mixture solution, 100 uL of hydroxy-tetramethylene piperonyloxy solution in ethyl acetate (2 g/20 mL) is added. The solution is then concentrated to 200 g (~50%) using rota-yap at 30° C. and filtered through 1 um pore size filter paper.

D-1: Lens Formulation with Non-UV-Absorbing Polysiloxane Prepolymer

In a 100 mL amber flask, 4.31 g of synthesized macromer solution (82.39% in 1-propanol) prepared above is added. In a 20 mL vial, 0.081 g of TPO and 0.045 g of 1,2-dimyristoyl-sn-glycero-3-phosphocholine (DMPC) are dissolved in 10 g of 1-propanol and then transferred to the macromer solution. After the mixture is concentrated to 5.64 g using rota-yap at 30° C., 0.36 g of DMA is added and the formulation is homogenized at room temperature. 6 g of clear lens formulation D-1 is obtained.

D-2: Lens Formulation with UV-Absorbing Polysiloxane Prepolymer (4% DMA)

In a 100 mL amber flask, 24.250 g of macromer solution prepared above (43.92% in ethyl acetate) is added. In a 50 mL vial, 0.15 g of TPO and 0.75 g of DMPC is dissolved in 20 g of 1-propanol and then transferred to the macromer solution. 20 g of solvent is pulled off using rota-yap at 30° C., followed by addition of 20 g of 1-propanol. After two cycles, the mixture is concentrated to 14.40 g. 0.6 g of DMA is added to this mixture and the formulation is homogenized at room temperature. 15 g of clear lens formulation D-2 is obtained.

D-3: Lens Formulation with UV-Absorbing Polysiloxane Prepolymer (2% DMA/2% HEA)

In a 100 mL amber flask, 24.250 g of macromer solution prepared above (43.92% in ethyl acetate) is added. In a 50 mL vial, 0.15 g of TPO and 0.75 g of DMPC is dissolved in 20 g of 1-propanol and then transferred to the macromer solution. 20 g of solvent is pulled off using rota-yap at 30° C., followed by addition of 20 g of 1-propanol. After two cycles, the mixture is concentrated to 14.40 g. 0.3 g of DMA and 0.3 g of HEA is added to this mixture and the formulation is homogenized at room temperature. 15 g of clear lens formulation D-3 is obtained.

EXAMPLE 18

Example E: Covalent Attachment of Modified PAE Coating Polymers

Monomers containing amine groups, N-(3-Aminopropyl) methacrylamide hydrochloride (APMAA-HCl) or N-(2-aminoethyl) methacrylamide hydrochloride (AEMAA-HCl) are purchased from Polysciences and used as received. Poly(amidoamine epichlorohydrine) (PAE) is received from Ashland as an aqueous solution and used as received. Poly(acrylamide-co-acrylic acid) (poly(AAm-co-AA) (90/10) from Polysciences, mPEG-SH from Laysan Bio, and poly(MPC-co-AeMA) (i.e., a copolymer of methacryloyloxyethyl phosphorylcholine (MPC) and aminoethylmethacrylate (AeMA)) from NOF are used as received.

APMAA-HCl monomer is dissolved in methanol and added to the lens formulations D-1, D-2 and D-3 (prepared in Example 17) to achieve a 1 wt % concentration.

Reactive packaging saline is prepared by dissolving the components listed in Table 4 along with appropriate buffer salts in DI water. The saline is heat pre-treated by stirring for 8 hrs at about 60° C. After heated pre-treatment, the saline is allowed to cool to room temperature and then filtered using a 0.2 μm PES filter.

TABLE 4

| | Package Saline Sample | | | | |
|---|---|---|---|---|---|
| | 1 | 2 | 3 | 4 | 5 |
| pH | 7.4 | 7.4 | 7.4 | 8 | 8 |
| PAE | 0.2% | 0.2% | 0.2% | 0.2% | 0.2% |
| Poly(AAm-co-AA) (90/10) | 0.07% | 0.2% | — | — | — |
| mPEG-SH, Mw = 2000 | — | — | 0.3% | — | — |
| mPEG-SH, Mw = 10000 | — | — | — | 0.2% | — |
| Poly(MPC-Co-AeMA) (90/10) | — | — | — | — | 0.2% |

Lens formulation D-1 prepared in Example 17 is modified by addition of the APMAA-HCl monomer (stock solution of APMMA-HCL in 1:1 methanol:propanol) and cured at 16 mW/cm$^2$ with 330 nm filter. Lens Formulations D-2 and D-3 prepared in Example 17 are modified by addition of the APMAA-HCl monomer and cured at 4.6 mW/cm$^2$ with 380 nm filter.

DSM Lenses. Female portions of polypropylene lens molds are filled with about 75 microliters of a lens formulation prepared as above, and the molds are closed with the male portion of the polypropylene lens molds (base curve molds). Contact lenses are obtained by curing the closed molds for about 5 minutes with an UV irradiation source (Hamamatsu lamp with a 330 nm-cut-off filter at an intensity of about 16 mW/cm$^2$.

LS Lenses. LS lenses are prepared by cast-molding from a lens formulation prepared as above in a reusable mold, similar to the mold shown in FIGS. 1-6 in U.S. Pat. Nos. 7,384,590 and 7,387,759 (FIGS. 1-6). The mold comprises a female mold half made of CaF$_2$ and a male mold half made of PMMA. The UV irradiation source is a Hamamatsu lamp with a 380 nm-cut-off filter at an intensity of about 4.6 mW/cm$^2$. The lens formulation in the mold is irradiated with UV irradiation for about 30 seconds.

Lens formulation D-1 modified with APMAA-HCl is cured according to DSM and LS methods described above, while with lens formulation D-2 or D-3 is cured according to the LS method described above.

Molded lenses are extracted in methyl ethyl ketone, hydrated, and packaged in one of the salines described in Table 4. Lenses are placed in a polypropylene lens packaging shell with 0.6 mL of the IPC saline (half of the saline is added prior to inserting the lens). The blister is then sealed with foil and autoclaved for 30 min at 121° C.

Evaluation of the lens surface shows that all test lenses had no debris adhesion after being rubbed against paper towel. When observed under dark-field microscope, cracking lines are not visible after rubbing the lenses between the fingers.

The lens surface wettability (WBUT), lubricity, and contact angle are measured and results are summarized in Table 5. The lenses are made according DSM method unless specified otherwise. Lubricity is rated against a qualitative scale from 0 to 5 where lower numbers indicate greater lubricity. In general, all properties are shown to improve after application of the in-package coating.

TABLE 5

| Lens formulation for making lenses | Saline[1] | WBUT (second) | Lubricity | Contact Angle [°] |
|---|---|---|---|---|
| D1 as control (free of APMAA) | 1 | 0 | 4-5 | 114 |
|  | 3 | 0 | 4 | 119 |
| D1 w/1% APMAA | 1 | 10 | 0-1 | 104 |
|  | 3 | 2 | 0-1 | 99 |
| D2 as control (free of APMAA) | 1 | 0 | 4-5 | 115 |
|  | 3 | 0 | 3 | 107 |
|  | 4 | 0[2] | 3-4[2] | 116[2] |
| D2 w/1% APMAA | 1 | 5 | 2-3 | 90 |
|  | 3 | 6 | 1 | 95 |
|  | 4 | 5-10[2] | 3[2] | 106[2] |
| D3 w/1% APMAA | 2 | 9 | 3-4 | 103 |
|  | 3 | 14 | 2-3 | 91 |
|  | 4 | 15 | 3 | 54 |
|  | 5 | 13 | 2 | 69 |

[1]The number is the packaging saline number shown in Table 4.
[2]LS lenses

EXAMPLE 19

Preparation of Lens Formulations. A lens formulation is prepared by dissolving components in 1-propanol to have the following composition: about 32% by weight of CE-PDMS macromer prepared in Example 2, about 21% by weight of TRIS-Am, about 23% by weight of DMA, about 0.6% by weight of L-PEG, about 1% by weight of DC1173, about 0.1% by weight of visitint (5% copper phthalocyanine blue pigment dispersion in TRIS), about 0.8% by weight of DMPC, about 200 ppm H-tempo, and about 22% by weight of 1-propanol.

Preparation of Lenses. Lenses are prepared by cast-molding from the lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradiation (13.0 mW/cm$^2$) for about 24 seconds.

PAA-Coating Solution. A PAA coating solution is prepared by dissolving an amount of PAA (M.W.: 450 kDa, from Lubrizol) in a given volume of 1-propanol to have a concentration of about 0.36% by weight and the pH is adjusted with formic acid to about 2.0.

PAA-Coated Lenses. Cast-molded contact lenses as above are extracted and coated by dipping in the following series of baths: DI water bath (about 56 seconds); 6 MEK baths (about 44, 56, 56, 56, 56, and 56 second respectively); DI water bath (about 56 seconds); one bath of PAA coating solution (about 0.36% by weight, acidified with formic acid to about pH 2.0) in 100% 1-propanol (about 44 seconds); one bath of a water/1-propanol 50%/50% mixture (about 56 seconds); 4 DI water baths each for about 56 seconds; one PBS bath for about 56 seconds; and one DI water bath for about 56 seconds.

IPC Saline. Poly(AAm-co-AA)(90/10) partial sodium salt (~90% solid content, poly(AAm-co-AA) 90/10, Mw 200,000) is purchased from Polysciences, Inc. and used as received. PAE (Kymene, an azetidinium content of 0.46 assayed with NMR) is purchased from Ashland as an aqueous solution and used as received. An IPC saline is prepared by dissolving about 0.07% w/w of poly(AAm-co-AA)(90/10) and about 0.15% of PAE (an initial azetidinium millimolar equivalents of about 8.8 millimole) in PBS (about 0.044 w/w % NaH$_2$PO$_4$.H$_2$O, about 0.388 w/w/% Na$_2$HPO$_4$.2H$_2$O, about 0.79 w/w % NaCl) and adjusting the pH to 7.2~7.4. Then the IPC saline is heat pre-treated for about 4 hours at about 70° C. (heat pretreatment) During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron PES membrane filter and cooled down back to room temperature. 10 ppm hydrogen peroxide is then added to the final IPC saline to prevent bioburden growth and the IPC saline is filtered using a 0.22 micron PES membrane filter.

Application of Crosslinked Coating. Lenses having a PAA-LbL base coating thereon prepared above are placed in polypropylene lens packaging shells (one lens per shell) with 0.6 mL of the IPC saline (half of the saline is added prior to inserting the lens). The blisters are then sealed with foil and autoclaved for about 30 minutes at about 121° C., forming SiHy contact lenses with crosslinked coatings (PAA-x-hydrophilic polymeric material) thereon.

Characterization of SiHy Lenses. The resultant SiHy contact lenses with crosslinked coatings (PAA-x-hydrophilic polymeric material) thereon show no debris adhesion after being rubbed against paper towel while the control lenses (packaged in PBS, i.e., lenses having a non-covalently attached layer of PAA thereon) show severe debris adhesion. The lenses have an oxygen permeability (Dk$_c$ or estimated intrinsic Dk) of 146 barrers, a bulk elastic modulus of 0.76 MPa, a water content of about 32% by weight, a relative ion permeability of about 6 (relative to Alsacon lens), a contact angle of from about 34 to 47 degrees, a WBUT of longer than 10 seconds. When observed under dark field microscope, no cracking lines are visible after rubbing the test lens. The lenses are very lubricious in a finger rubbing test and equivalent to the control lenses.

EXAMPLE 20

SiHy lenses and IPC salines in lens packages after autoclave, which are prepared in Examples 6, 14 and 19, are subjected to following biocompatibility studies.

In-Vitro Cytotoxicity Evaluation. SiHy lenses are evaluated by the USP Direct Contact Material Assay. Lens extracts are evaluated by the USP MEM Elution and ISO CEN Cell Growth Inhibition Assay, and the IPC saline in the packages after autoclave is evaluated by a Modified Elution test. All lens and lens extracts evaluated are well within acceptance criteria for each test and no unacceptable cytotoxicity is observed.

In-Vivo Testing. ISO Systemic Toxicity in the Mouse shows that there is no evidence of systemic toxicity in the mouse with extracts of lenses. ISO Ocular Irritation Study in the Rabbit shows that extracts of lenses are not considered irritants to the ocular tissue of the rabbit. ISO Ocular Irritation Study in the Rabbit shows that the IPC saline in the packages after autoclave is not considered an irritant to the ocular tissue of the rabbit. Lenses worn in a daily disposable wear mode for 22 consecutive days are nonirritating to the rabbit model, and eyes treated with test lenses are similar to eyes treated with the control lenses. ISO Sensitization Study (Guinea Pig Maximization Testing of Packaging Solutions) shows that the IPC saline after autoclave do not cause any delayed dermal contact sensitization in the guinea pig. ISO Sensitization Study (Guinea Pig Maximization Testing of Lens Extracts) shows that Sodium chloride and sesame oil extracts of the lenses do not cause delayed dermal contact sensitization in the guinea pig.

Genotoxicity Testing. When IPC salines from the lens packages and SiHy lens extracts are tested in Bacterial Reverse Mutation Assay (Ames Test), it is found that the lens extracts and IPC salines are considered to be nonmutagenic to *Salmonella typhimurium* test strains TA98, TA100, TA1535 and TA1537 and to *Escherichia coli* WPuvrA. When SiHy lens extracts are tested in Mammalian Erythrocyte Micronucleus Assay, they have no clastogenic activity and to be negative in the mouse bone marrow micronucleus test. When IPC salines from the lens packages are tested according to Chromosome Aberration Test in Chinese Hamster Ovary, the IPC salines are negative for the induction of structural and numerical chromosome aberrations assays using CHO cells in both non-activated and S9-activated test systems. When SiHy lens extracts are tested according to Cell Gene Mutation Test (Mouse Lymphoma Mutagenesis Assay), the lens extracts are shown to be negative in the Mouse Lymphoma Mutagenesis Assay.

EXAMPLE 21

The surface compositions of preformed SiHy contact lenses (i.e., SiHy contact lens without any coating and prior to applying the PAA base coating), SiHy contact lenses with PAA coating (i.e., those lenses before being sealed and autoclaved in lens packages with the IPC saline), and SiHy contact lenses with a crosslinked coating thereon, all of which are prepared according to the procedures described in Example 19, are determined by characterizing vacuum dried contact lenses with X-ray photoelectron spectroscopy (XPS). XPS is a method for measuring the surface composition of lenses with a sampling depth of about 10 nm. The surface compositions of three types of lenses are reported in Table 6.

TABLE 6

| SiHy Lens | Surface Atomic Composition (%) | | | | |
|---|---|---|---|---|---|
| | C | N | O | F* | Si |
| Preformed (without coating) | 58.0 | 6.2 | 23.0 | 0.8 | 12.1 |
| With PAA coating | 48.9 | 1.6 | 42.1 | 2.9 | 4.5 |
| With crosslinked coating | 59.1 | 10.8 | 25.4 | 3.2 | 1.4 |

*Fluorine is detected, mostly likely from surface contamination during vacuum drying process XPS analysis Table 6 shows that when a PAA coating is applied onto a SiHy lens (preformed without coating), the silicon atomic composition is substantially reduced (from 12.1% to 4.5%) and the nitrogen atomic composition is also reduced (from 6.2% to 1.6%). When a crosslinked coating is further applied onto the PAA coating, the surface composition is predominated by carbon, nitrogen and oxygen, which are the three atomic composition (excluding hydrogen because XPS does not count hydrogen in the surface composition). Such results indicate that the outmost layer of the SiHy contact lens with crosslinked coating is likely to be essentially consisting of the hydrophilic polymeric material which is the reaction product of poly(AAm-co-AA) (90/10) (60% C, 22% O and 18% N) and PAE.

The following commercial SiHy lenses which are vacuum-dried are also subjected to XPS analysis. The surface compositions of those commercial SiHy contact lenses are reported in Table 7.

TABLE 7

| | Surface Atomic composition (%) | | | | |
|---|---|---|---|---|---|
| | C | N | O | F* | Si |
| N&D ® Aqua ™ | 68.4 | 9.1 | 18.6 | 1.5 | 2.4 |
| Air Optix ® Aqua ™ | 67.7 | 9.9 | 18.2 | 1.9 | 2.4 |
| PureVision ® | 58.2 | 6.9 | 26.0 | 1.1 | 7.9 |
| Premio ™ | 61.1 | 6.9 | 23.6 | 1.8 | 6.6 |
| Acuvue ® Advance ® | 61.1 | 4.9 | 24.9 | 0.7 | 8.4 |
| Acuvue ® Oasys ® | 61.5 | 5.0 | 24.4 | 0.6 | 8.5 |
| TruEye ™ | 63.2 | 4.9 | 24.2 | 0.8 | 7.0 |
| Biofinity ® | 46.5 | 1.4 | 28.9 | 5.3 | 17.9 |
| Avaira ™ | 52.4 | 2.5 | 27.8 | 4.2 | 13.1 |

*Fluorine is detected also in Advance Oasys and TruEye lenses, mostly likely from surface contamination during vacuum drying process XPS analysis It is found that a SiHy contact lens of the invention has a nominal silicon content, about 1.4%, in the surface layer, much lower than those of commercial SiHy lenses without plasma coatings (Acuvue® Advance®, Acuvue® Oasys®, TruEye™, Biofinity®, Avaira™) and PureVision® (with plasma oxidation) and Premio™ (with unknown plasma treatment), and even lower the SiHy lenses with a plasma-deposited coating having a thickness of about 25 nm (N&D® Aqua™ and Air Optix® Aqua™). This very low value of Si % is comparable to the silicon atomic percentage of a control sample, polyethylene from Goodfellow (LDPE, d=0.015 mm; LS356526 SDS; ET31111512; 3004622910). Those results indicate that the very low value in the XPS analysis of vacuum dried SiHy contact lens of the invention may be due to contaminants introduced during the preparation process including vacuum drying process and XPS analysis, similar to the observed fluorine content in the non-fluorine-containing lenses. Silicone has been successfully shielded from XPS analysis in the SiHy contact lenses of the invention.

XPS analysis of SiHy contact lenses of the invention (prepared according to the procedures described in Example 19), commercial SiHy contact lenses (CLARITI™ 1 Day, ACUVUE® TruEye™ (narafilcon A and narafilcon B)), polyethylene sheets from Goodfellow (LDPE, d=0.015 mm; LS356526 SDS; ET31111512; 3004622910), DAILIES® (polyvinylalcohol hydrogel lenses, i.e., non-silicone hydrogel lenses), ACUVUE® Moist (polyhydroxyethylmethacrylate hydrogel lenses, i.e., non-silicone hydrogel lenses) is also carried out. All lenses are vacuum-dried. Polyethylene sheets, DAILIES® and ACUVUE® Moist are used as control because they do not contain silicon. The silicon atomic compositions in the surface layers of the test samples are as following: 1.3±0.2 (polyethylene sheet); 1.7±0.9 (DAILIES®); 2.8±0.9 (ACUVUE® Moist); 3.7±1.2 (three SiHy lenses prepared according to the procedures described in Example 19); 5.8±1.5 (CLARITI™ 1 Day); 7.8±0.1 (ACUVUE® TruEye™ (narafilcon A)); and 6.5±0.1 (ACUVUE® TruEye™ (narafilcon B)). The results for SiHy contact lens of the invention are closer to those of the traditional hydrogels than to the silicone hydrogels.

EXAMPLE 22

Fluorescein Tagged PAA (PAA-F).

PAA-F is synthesized in-house by covalently attaching 5-aminofluorescein to PAA (Mw 450k). The labeling degree of fluorescein is a few %, for example, about 2 mole % (or n/(m+n)=2% in the formula shown below)

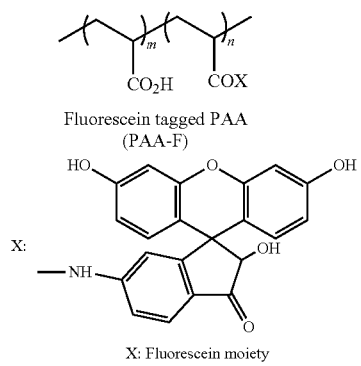

Fluorescein tagged PAA (PAA-F)

X: Fluorescein moiety

Preparation of Lenses.

Lenses are prepared by cast-molding from the lens formulation prepared above in Example 19 in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradiation (13.0 mW/cm$^2$) for about 24 seconds.

PAA-F Coating Solution.

A PAA-F coating solution is prepared by dissolving an amount of PAA-F prepared above in a given volume of 1-PrOH/water (95/5) solvent mixture to have a concentration of about 0.36% by weight and the pH is adjusted with formic acid to about 2.0. About 5% water is used in order to dissolve PAA-F.

PAA-Coated Lenses.

Cast-molded contact lenses are extracted and coated by dipping in the following series of baths: DI water bath (about 56 seconds); 6 MEK baths (about 44, 56, 56, 56, 56, and 56 second respectively); DI water bath (about 56 seconds); one bath of PAA-F coating solution (about 0.36% by weight, acidified with formic acid to about pH 2.0) in 1-PrOH/water (95/5) solvent mixture (about 44 seconds); one bath of a water/1-propanol 50%/50% mixture (about 56 seconds); 4 DI water baths each for about 56 seconds; one PBS bath for about 56 seconds; and one DI water bath for about 56 seconds.

Application of Crosslinked Coating.

Lenses having a PAA-LbL base coating thereon prepared above are placed in polypropylene lens packaging shells (one lens per shell) with 0.6 mL of the IPC saline prepared according to the procedures described in Example 19 (half of the saline is added prior to inserting the lens). The blisters are then sealed with foil and autoclaved for about 30 minutes at about 121° C., forming SiHy contact lenses with crosslinked coatings (PAA-x-hydrophilic polymeric material) thereon.

Con-Focal Laser Fluorescent Microscopy.

A cross section of a hydrated SiHy lens with crosslinked coating (prepared above) is cut and placed between two glass cover slips and the image is collected on a con-focal laser fluorescent microscope (model # Zeiss LSM 510 Vis). It is scanned from the front curve side of the lens to the base curve side of the lens, or vice versa. The presence of PAA-F is shown by the green fluorescence and con-focal laser fluorescence microscopic images can be obtained. The examination of the con-focal laser fluorescence microscopic images reveals that the PAA-F rich layer is present on both lens surfaces (anterior and posterior surfaces) and at the peripheral edge, while no PAA-F is observed in the bulk material of the hydrated lens.

Figure 3:
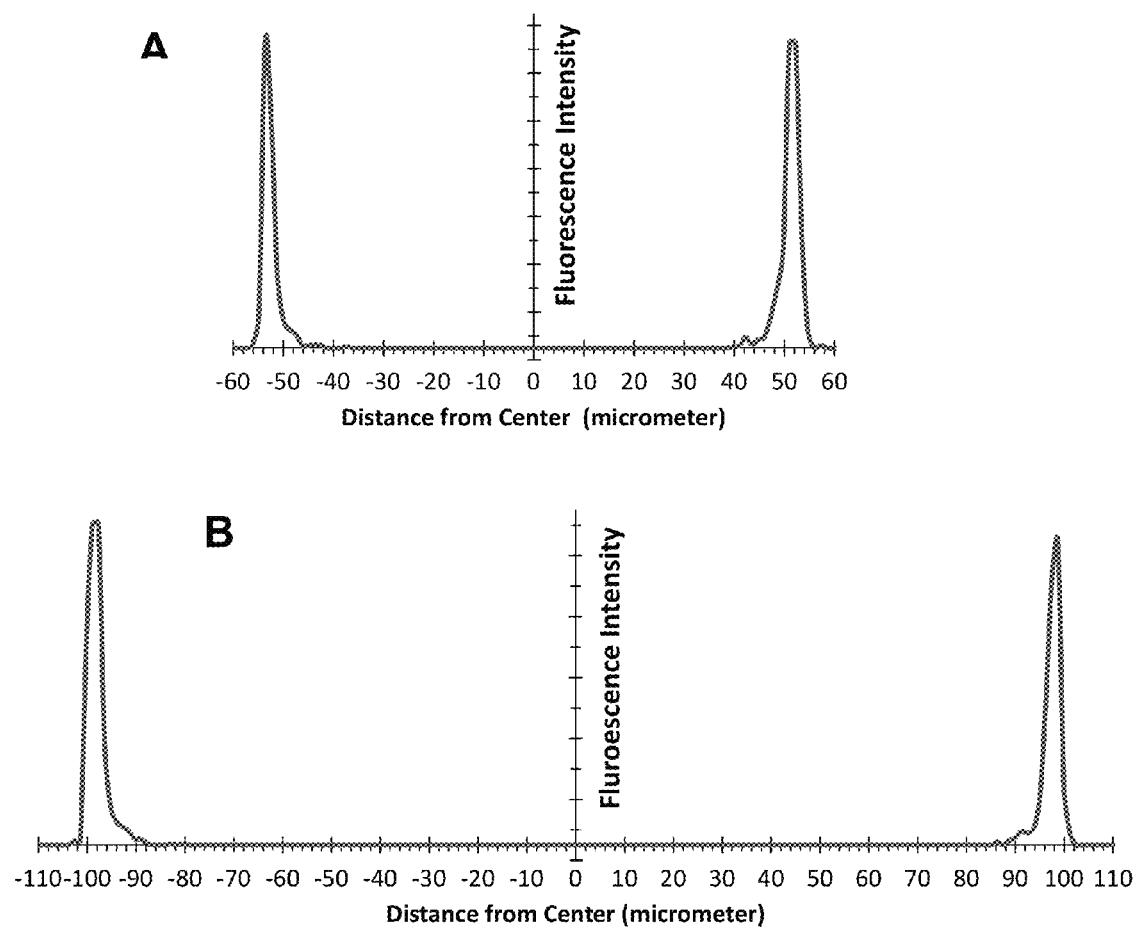
FIG. 3 shows the fluorescence intensity profiles across the cross sections of a SiHy contact lens in a con-focal laser fluorescence microscopy.

The fluorescence intensity profiles are examined across the lens cross section along a line passing through both the posterior and anterior surfaces and normal to the posterior surface. FIG. 3 shows two representative the fluorescence intensity profiles along two lines across the lens cross section, one at the point where the lens thickness is about 100 μm (panel A) and the other at the point where the lens thickness is about 200 μm (panel B). The original points in FIG. 3 are the center points between the anterior and posterior surfaces along the lines. It can be noticed in FIG. 3 that there is a PAA-F-rich layer near the outermost surfaces of the SiHy lens with crosslinked coating, no PAA-F is present at the bulk of the lens, and the coating thickness is similar on these two cross-sections regardless the thickness of the cross-sections.

The thickness of the PAA-F rich layer (i.e., the sum of the infusion depth into the outer hydrogel layer and the penetration depth of PAA-F into the bulk material (i.e., the inner layer)), or the transition layer (for schematic illustration see FIG. 2, the transition layer 115), can be estimated from the fluorescence intensity profile shown in FIG. 3. The possible thickness of the transition layer (PAA-F-rich layer) is estimated by the distance from zero intensity, after crossing the peak intensity, to zero intensity again. Considering that there are possible contribution from unknown factors (such as scattering) to the fluorescence intensity, the minimum layer thickness is the thickness for which a florescent intensity of at least 10% of the maximum peak intensity is retained. Based on such estimation, the minimum PAA-F-rich layer thickness could be at least about 5 microns. Note that the thickness for the SiHy lenses with PAA coating of the previous Examples could be higher, considering the PAA concentration used is 10 times higher than the PAA-F concentration used in the experiments here. A lens with thicker coating can also be prepared by using a dip coating time that is more than 44 seconds, 44 seconds were the dip coating time for PAA-F used in this experiment. A lens with thicker coating may also be prepared by using PAA of different molecular weight.

EXAMPLE 23

This example illustrates how to determine the water content of the crosslinked coating (the two outer hydrogel layers)

on a SiHy of the invention). In an effort to determine the potential water content of the crosslinked coating of SiHy lenses of Example 19, samples of polymer consisting of the coating components are prepared for evaluation. The resulting gels are then hydrated and tested to determine water content.

Solutions are prepared using the two polymeric components of a crosslinked coating formed in Example 19: poly (AAm-co-AA) (90/10) and PAE, to have the following composition: 12.55% w/w of PAE, 6.45% w/w of poly(AAm-co-AA) (90/10), and 81% w/w of water. The ratio of PAE/poly (AAm-co-AA) is identical to that in the IPC saline of Example 19, but the individual concentrations of the components are higher to ensure a gel is formed during autoclave.

The solution is then autoclaved about 45 minutes at 121° C. after which the sample gels. The gel samples are then prepared for water content determination by testing the samples after hydration (n=3). Hydrated samples are prepared by submerging the gel sample in SoftWear saline for at least about 6 hrs (i.e., hydrated overnight).

Hydrated samples are blotted dry and the mass at hydrated state is recorded via mass balance. Following the recording of the mass at hydrated state, the samples are all placed in a vacuum oven set at approximately 50° C. and dried under a vacuum of <1 inch Hg overnight.

Dried samples are removed from the vacuum oven after overnight drying and then measured to record dry mass. Water content is calculated using the following relationship:

Water content=(wet mass−dry mass)/wet mass×100%

The water content of the samples is determined to be 84.6±0.4 w/w %.

It is believed that this water content of this PAE/poly (AAm-co-AA) hydrogel represents the outer hydrogel layer (crosslinked coating) of the SiHy contact lenses of Example 19 for the following reasons. First, hydrophobic bulk lens polymers (silicone hydrogel) are reasonably presumed not to be present in the outer surface layer. This appears to be a very good assumption based upon the XPS data. According to the XPS data in Example 21, there is no or very low silicon content at the surface of the SiHy lens with the crosslinked coating, indicating that the outer surface layer is composed almost entirely of the coating polymers (PAE and PAAm-PAA). Second, the polyacrylic acid (PAA) base coating (the transition layer) presumably has a minimal impact on the water content of the surface layer. This assumption may not be valid. But, if any charged PAA would be present in the outer surface layer, it would further increase the water content beyond 84.6%. Third, a much higher concentration of PAE and PAAm-PAA is needed to produce PAE/poly(AAm-co-AA) hydrogel than is used in the IPC saline of Example 19. This could result in a higher crosslinking density for the PAE/poly(AAm-co-AA) hydrogel which may give an artificially low water content result. It is believed that both the presence of PAA in the outer hydrogel layer and lower crosslinking density due to the lower concentration of polymeric materials during crosslinking (in Example 19) may result in an surface layer (outer hydrogel layer) having a water content that is even higher than that measured in the tests in this example. It can be assumed that the outer coating layer of the SiHy contact lenses of Example 19 comprises at least 80% water and may be even higher when fully hydrated.

EXAMPLE 24

An Abbe refractometer is typically used to measure the refractive index of contact lenses. The refractive index difference between a testing lens and the instrument prism creates a unique angle of total internal reflectance which results in a dark visible shadow line. The angle at which this shadow line appears is directly related to the refractive index of the testing lens. Most contact lenses (including SiHy contact lenses without coating prepared in Example 19) produce a distinct shadow line in the Abbe refractometer, but SiHy with crosslinked coating (i.e., the outer hydrogel layers) of Example 19 do not produce a distinct shadow line. It is believed that this phenomenon is due to a decrease in the refractive index of the lens at the surface compared to the bulk and the fact that the transition from bulk to surface is not abrupt. It is further believed that near the surface of the lens the water content begins to increase which results in a localized decrease in the refractive index of the lens. This in effect would create simultaneous shadow lines at multiple angles resulting in a blurred image of the shadow line.

The Abbe data demonstrates that the outer surface layer is characterized by an increase in the water content near the surface of the lens, consistent with the results described in Example 23.

EXAMPLE 25

SiHy contact lenses with crosslinked coating (i.e., the outer hydrogel layers) prepared in Example 19 desalinated in ultra-pure water, placed individually in a 50 mL disposable beaker with 50 mL of ultra-pure water and frozen by placing the beaker in a bath with dry ice and isopropyl alcohol. The beakers are wrapped in aluminum foil and placed on a VirTis Freezemobile 35EL with a vacuum pressure of =30 µbar and a condenser temperature of =−70° C. After 24 hours the aluminum foil is removed to increase heat transfer and the flasks are left for another 24-48 hours for removal of residual moisture. The flasks are capped to prevent the introduction of moisture from the air until analyzed. Lens samples are cut in half and two strips are then cut from the middle of each half and mounted on their edges for imaging of cross sections. Samples are then sputter coated with Au/Pd for ~1 min and exampled by SEM using a Bruker Quantax Microanalysis System (JEOLJSM-800LV SEM). The sample stage is tilted ~0-60° at the discretion of the analyst to obtain the desired sample orientation.

Figure 4:
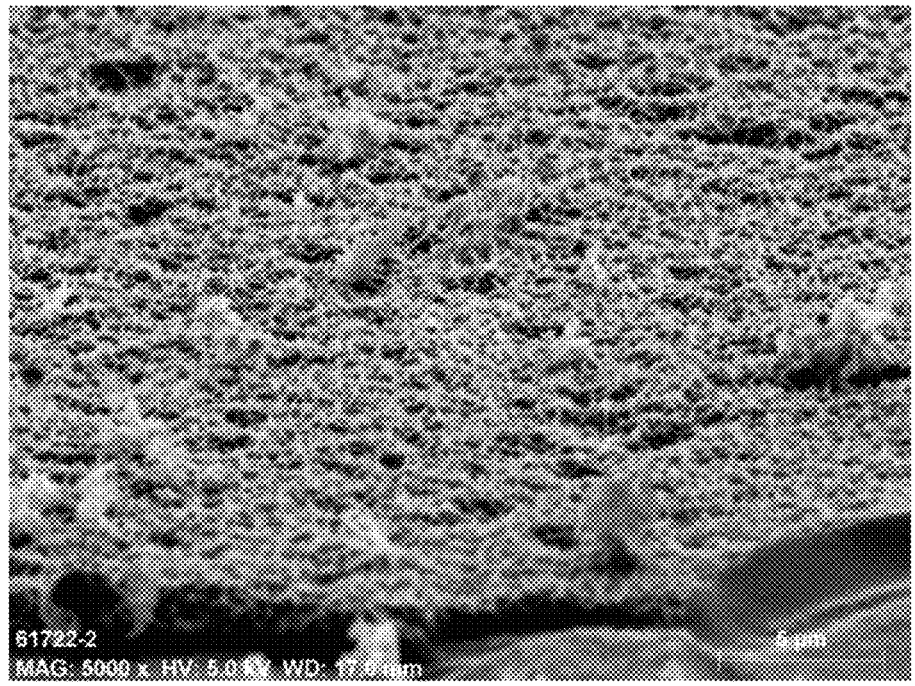
FIG. 4 shows the SEM (scanning electron microscopy) images of a SiHy contact lens of the invention in a freeze-dried state.
Figure 4:
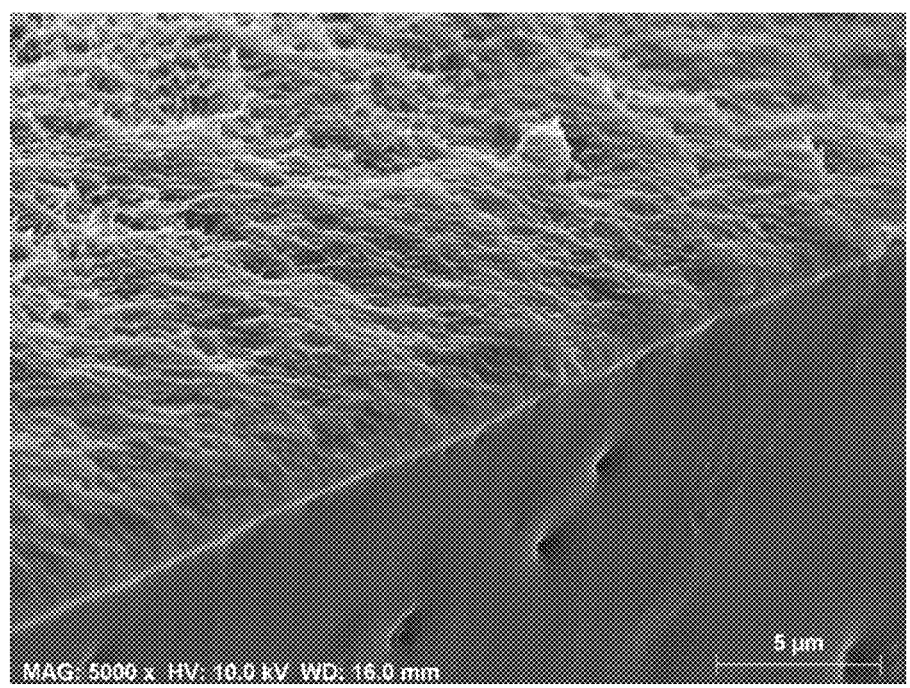
Figure 4:
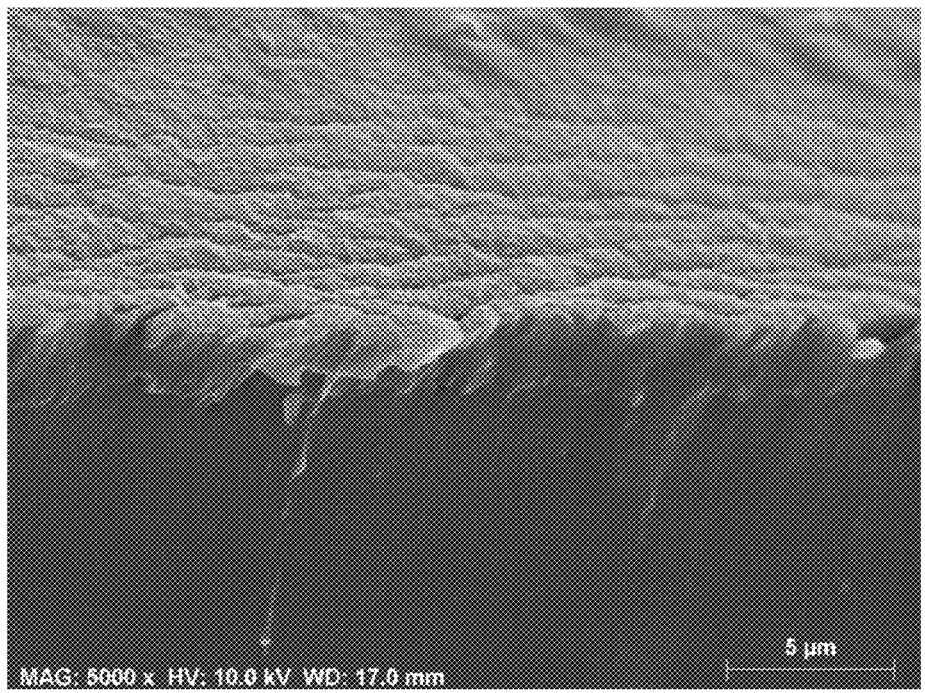

It is believed that when the SiHy contact lenses are freeze-dried, the hydrated surface structure of the lenses may be preserved or locked to some degrees. FIG. 4, panel A shows the top view of a SEM image of a surface of a freeze-dried SiHy contact lens prepared in Example 19. It can be seen from FIG. 4 that the freeze-dried SiHy contact lens has a sponge-like surface structure which would be expected for a high water content hydrogel. This result further confirms that a SiHy contact lens of the invention comprises the two outer hydrogel layers of a high water content hydrogel. FIG. 4, panels B and C show the side views at two different angles of a cross section of the freeze-dried SiHy contact lens shown in panel A. The panels B and C show the thick inner layer having a smooth surface, a transition layer (PAA layer) with a brighter color on top of the inner layer, and an outer hydrogel layer with sponge-like structures on top of the transition layer. Based on the data shown in the panels B and C, the thickness of the freeze-dried outer hydrogel layer is estimated to be between about 2 µm and 2.5 µm.

EXAMPLE 26

Fluorescein Tagged Poly(AAm-co-AA)(90/10) (referred to as PAAm-PAA-F).

PAAm-PAA-F is synthesized in-house by covalently attaching 5-aminofluorescein to PAAm-PAA (90/10), by a procedure similar to the preparation of PAA-F. Poly(AAm-co-AA)(90/10) partial sodium salt (~90% solid content, poly(AAm-co-AA) 90/10, Mw 200,000) is purchased from Polysciences, Inc. and used as received. The labeling degree of fluorescein is about 0.04 mole %.

Modified IPC Saline using PAAm-PAA-F.

This saline is prepared by the same procedure of IPC preparation, as described in Example 19, except where PAAm-PAA is replaced with PAAm-PAA-F.

PAA-Coated Lenses.

Lenses are prepared by cast-molding from the lens formulation prepared above in Example 19 in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradiation (13.0 mW/cm$^2$) for about 24 seconds. Cast-molded contact lenses are extracted and coated by dipping in the following series of baths: DI water bath (about 56 seconds); 6 MEK baths (about 44, 56, 56, 56, 56, and 56 second respectively); DI water bath (about 56 seconds); one bath of PAA coating solution (about 0.36% by weight, acidified with formic acid to about pH 2.0) in 1-PrOH solvent (about 44 seconds); one bath of a water/1-propanol 50%/50% mixture (about 56 seconds); 4 DI water baths each for about 56 seconds; one PBS bath for about 56 seconds; and one DI water bath for about 56 seconds.

Application of Crosslinked Coating.

Lenses having a PAA-base coating thereon prepared above are placed in polypropylene lens packaging shells (one lens per shell) with 0.6 mL of the modified IPC saline prepared above using PAAm-PAA-F (half of the saline is added prior to inserting the lens). The blisters are then sealed with foil and autoclaved for about 30 minutes at about 121° C., forming SiHy contact lenses with crosslinked coatings (PAA-x-hydrophilic polymeric material) thereon.

Con-Focal Laser Fluorescent Microscopy.

A piece of a hydrated SiHy lens with crosslinked coating (prepared above) is placed between two glass cover slips and the image is collected on a con-focal laser fluorescent microscope (model # Zeiss LSM 510 Vis). It is scanned from the front curve side of the lens to the base curve side of the lens, or vice versa. The presence of PAAm-PAA-F is shown by the green fluorescence and con-focal laser fluorescence microscopic images can be obtained. The examination of the con-focal laser fluorescence microscopic images reveals that the PAAm-PAA-F rich layer (i.e., the outer hydrogel layers) is present on both lens surfaces (anterior and posterior surfaces) and at the peripheral edge, while no PAAm-PAA-F is observed in the bulk material of the lens.

The fluorescence intensity profiles are examined across the lens cross section along a line passing through both the posterior and anterior surfaces and normal to the posterior surface. The thickness of the PAAm-PAA-F rich layer can be estimated from the fluorescence intensity profile across the lens. The possible thickness of the outer hydrogel layer (PAAm-PAA-F-rich layer) is estimated by the distance from zero intensity, after crossing the peak intensity, to zero intensity again. Considering that there are possible contribution from unknown factors (such as scattering) to the fluorescence intensity, the minimum layer thickness is the thickness for which a florescent intensity of at least 10% of the maximum peak intensity is retained. Based on such estimation, the minimum PAAm-PAA-F-rich layer (hydrated outer hydrogel layer) thickness could be at least about 5 microns.

EXAMPLE 27

Lenses are fabricated using lens formulation D-2 (Example 17) to which APMAA monomer has been added to a concentration of 1%. LS lenses are prepared by cast-molding from a lens formulation prepared as above in a reusable mold, similar to the mold shown in FIGS. 1-6 in U.S. Pat. Nos. 7,384,590 and 7,387,759 (FIGS. 1-6). The mold comprises a female mold half made of glass and a male mold half made of quartz. The UV irradiation source is a Hamamatsu lamp with a 380 nm-cut-off filter at an intensity of about 4.6 mW/cm$^2$. The lens formulation in the mold is irradiated with UV irradiation for about 30 seconds.

Cast-molded lenses are extracted with methyl ethyl ketone (MEK), rinsed in water, coated with polyacrylic acid (PAA) by dipping lenses in a propanol solution of PAA (0.0044% by weight, acidified with formic acid to about pH 2.5), and hydrated in water.

IPC Saline is prepared according to the composition described in Example 9 with pre-reaction conditions of 8 hrs at approximately 60° C. Lenses are placed in a polypropylene lens packaging shell with 0.6 mL of the IPC saline (half of the saline is added prior to inserting the lens). The blister is then sealed with foil and autoclaved for 30 min at 121° C.

Evaluation of the lens surface shows that all test lenses have no debris adhesion. When observed under dark-field microscope, cracking lines are not visible after rubbing the lenses between the fingers. The lens surface wettability (WBUT) is greater than 10 seconds, lubricity is rated as "1", and contact angle is approximately 20°.

EXAMPLE 28

Cast-molded SiHy contact lenses (without any coating) prepared from Example 19 are used. All lenses are extracted in MEK overnight to ensure all residual monomer is removed. The first group of lenses (lenses with hydrated crosslinked coating thereon) is soaked overnight in a PAA coating solution (0.36% by weight of PAA in 1-Propanol, pH 1.7-2.3 adjusted with formic acid), while the second group of lenses (control) is soaked in 1-propanol for the same duration. Both groups of lenses are packaged in the IPC saline prepared in Example 19 and autoclaved. Lenses after autoclave are tested (in groups of 5) using gravimetric analysis technique to determine the weights of dry and wet contact lenses (N=14 for the first group of contact lenses; N=18 for the second group of contact lenses). The results are shown in Table 8.

TABLE 8

| | Wet Weight (for 5 lens) | | Dry Weight (for 5 lens) | | Water Content % | |
|---|---|---|---|---|---|---|
| | Average | Std. Dev. | Average | Std. Dev. | Average | Std. Dev. |
| 1$^{st}$ Group | 0.144 | 0.001 | 0.0950 | 0.001 | 34.2 | 0.4 |
| 2$^{nd}$ Group | 0.137 | 0.001 | 0.0947 | 0.002 | 30.8 | 0.4 |

There is a statically significant difference (7 mg) in wet weight between the first and second groups of contact lenses, due to the presence of the hydrated crosslinked coating the contact lenses comparing with the control lenses (without coating). However, the difference in dry weight between the first and second groups of contact lenses is about 0.3 mg and is not statistically significant. The lens water content for the coated lens can be estimated to be ~96% according to the following calculation $$\left(\frac{W_{1st}^{wet} - W_{2nd}^{wet}}{(W_{1st}^{wet} - W_{2nd}^{wet}) + (W_{1st}^{dry} - W_{2nd}^{dry})} = \frac{7 \text{ mg}}{7 \text{ mg} + 0.3 \text{ mg}} \approx 96\%\right).$$

It is understood that the water content estimated here for the crosslinked coating on a contact lens may be not accurate because the difference in dry wet weight between the first and second groups of contact lens is too small and even smaller than the standard deviation.

EXAMPLE 29

Figure 5:
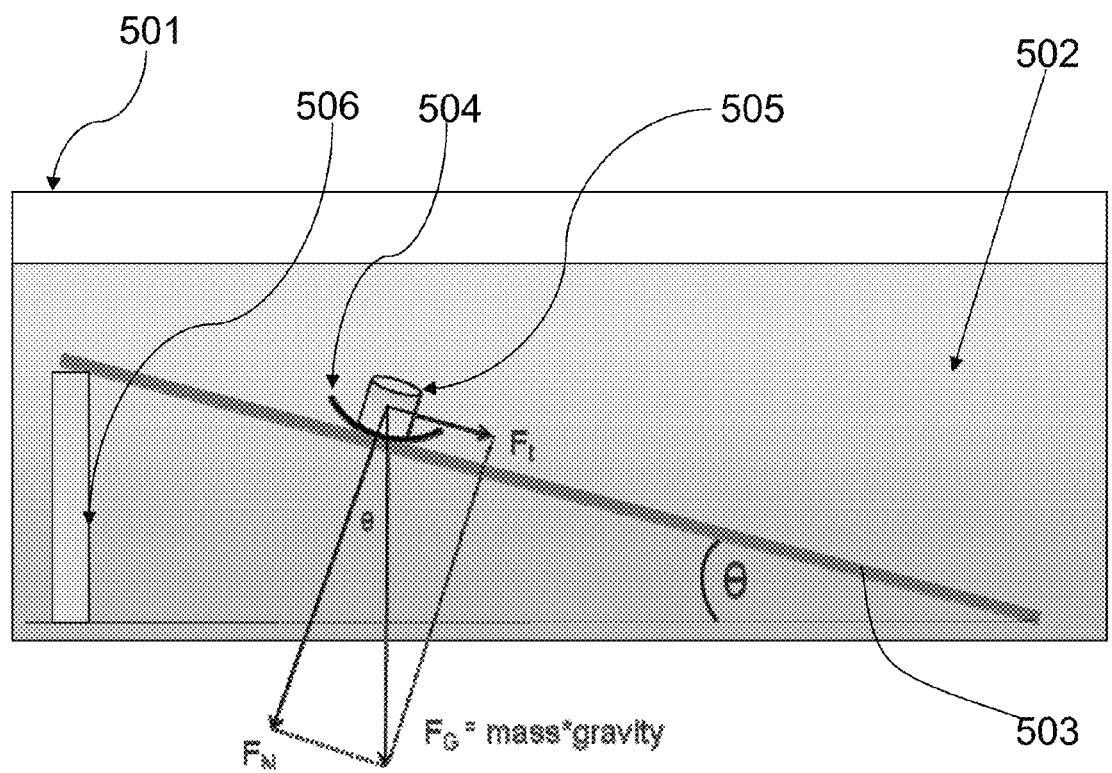
FIG. 5 schematically illustrates the set up of the inclined plate method according to a preferred embodiment.

This Example illustrates how to quantify the lubricity of SiHy contact lenses according to the inclined plate method ("Derby friction test"). The inclined plate method is a simple test to set-up as shown in FIG. 5. The set up for inclined plate method is composed of a plastic reservoir or tank 501 which is filled with a phosphate buffered saline (PBS, pH~7.3) 502, a 503 borosilicate glass plate 503 and a shim 506 with an adjustable height between 5 mm and 20 mm height. Both the borosilicate glass plate 503 and the shim 506 are submerged in the phosphate-buffered saline 502 in the plastic reservoir or tank 501. In a test, a contact lens 504 is placed on the borosilicate glass plate and then a stainless steel ferrule 505 (to provide physiologically relevant pressure).

$$\text{Critical Coefficient of Friction} = \frac{F_t}{F_N} = \tan\theta,$$

in which $\theta$ is the critical angle, $F_N$ is the normal force, and $F_t$ is the tangent force. The highest angle at which a lens continues sliding after being pushed, but stops, or takes longer than 10 seconds, before reaching the end, is defined as the "critical angle $\theta$". The critical coefficient of friction (CCOF) is the tangent of the critical angle $\theta$. A lens which does not move will be below the CCOF, while a lens which does not stop during the travel distance will be above the CCOF. Angles above or below the CCOF are removed from analysis. Derby friction test can provide a direct way of measuring the kinematic coefficient of friction.

In the tests according to the inclined plate method, all lenses are stored in PBS solution at least overnight (>6 hours) before testing, in order to remove any residual packaging solution. The glass plate (6"×4" borosilicate glass) is scrubbed with a soap solution (1% Micro-90) and wiped (AlphaWipe TX1009). Each plate is rinsed thoroughly in DI water, about 2 minutes. A section of the plate friction is tested by finger rubbing to ensure all soap solution is removed. The water is wiped with paper towels (KimTech Kimwipe #34705) and inspected under light to ensure no foreign particles remain on the glass. The glass plate is placed on shims of various heights in a plastic reservoir or tank, and the height of this plane is measured with a micrometer and recorded. The reservoir is filled with phosphate buffered saline (PBS) to ensure the lens is completely submerged (28 mm depth).

Each lens is placed on the "starting line" and a 0.79 g ferrule (¼" stainless steel to provide physiologically relevant pressure) is dropped onto the lens surface. The lens is allowed to slide down the plate, and the time the lens took to travel the 96 mm is recorded.

The lens is moved to the starting position with the weight removed prior to retesting. This "pre-loading" effect should be minimized for best repeatability. The lens may be tested at multiple angles to obtain the ideal CCOF.

Sixteen commercial contact lenses and silicone hydrogel contact lenses prepared in Example 19 are tested for CCOF and the results are reported in Table 9. The results show that a SiHy contact lens of the invention (prepared in Example 19 to have a crosslinked coating thereon) has the lowest CCOF among any class of silicone hydrogel lenses which are commercially available and tested, thereby having the highest lubricity.

TABLE 9

| Contact lenses | SiHy | C.H. (mm) | C.A. (deg) | CCOF |
|---|---|---|---|---|
| Example 19 | Y | 5.7 | 2.2 | 0.038 |
| DAILIES AquaComfortPlus | N | 6.0 | 2.3 | 0.040 |
| 1 Day Acuvue | N | 6.5 | 2.5 | 0.043 |
| Dailies Aqua | N | 6.8 | 2.6 | 0.045 |
| 1-Day Acuvue TruEye (narafilcon B) | Y | 7.2 | 2.8 | 0.048 |
| SofLens Daily Disposable | N | 7.6 | 2.9 | 0.051 |
| 1-Day Acuvue Moist | N | 7.7 | 3.0 | 0.052 |
| Proclear 1-Day | N | 8.3 | 3.2 | 0.056 |
| 1-Day Acuvue TruEye (narafilcon A) | Y | 8.8 | 3.4 | 0.059 |
| Clariti 1-Day | Y | 9.2 | 3.5 | 0.062 |
| Acuvue Moist | Y | 7.7 | 2.9 | 0.051 |
| Air Optix Aqua | Y | 8.1 | 3.1 | 0.054 |
| Biofinity | Y | 8.1 | 3.1 | 0.054 |
| PureVision | Y | 9.4 | 3.6 | 0.063 |
| Acuvue Advance | Y | 9.7 | 3.7 | 0.065 |
| Acuvue Oasys | Y | 9.9 | 3.6 | 0.066 |
| Clariti | Y | 12.5 | 4.8 | 0.084 |

C.H.: Critical Height;
C.A.: Critical angle

EXAMPLE 30

This Example illustrates how to characterize the negatively-charged surface of a SiHy contact lens according to the Positively Charged Particles Adhesion test.

The surface charge of a lens surface can be detected indirectly via its interaction with charged particles or beads. A negatively charged surface will attract positively charged particles. A surface free of negative charge or substantially free of negative charge will not attract positively charged particles or will attract few positively charged particles.

Uncoated SiHy contact lenses (i.e., cast-molded and extracted with MEK as described in Example 19), PAA-coated SiHy contact lenses (as prepared in Example 19), and SiHy contact lenses with a crosslinked coating thereon (as prepared in Examples 14 and 19) are tested as follows. The PAA coating of PAA-coated contact lenses has a surface concentration of carboxylic groups of about 62.5% by weight ($M_{COOH}/M_{AA}$ in which $M_{COOH}$ is the mass of carboxylic acid group and $M_{AA}$ is the mass of acrylic acid). The crosslinked coating of contact lenses of Example 14 is theoretically free of carboxylic acid groups, whereas the crosslinked coating of contact lenses of Example 19 may contain a low surface concentration of carboxylic acid groups (must be smaller than $$\frac{0.07\% \cdot 10\% \cdot M_{COOH}/M_{AA}}{0.07\% + 0.15\%} \approx 2\% \text{ by weight}).$$

Lenses are immersed in a dispersion with positively charged particles, after appropriate rinse, the number of particles adhered on the lens is visualized and estimated or counted.

Figure 6:
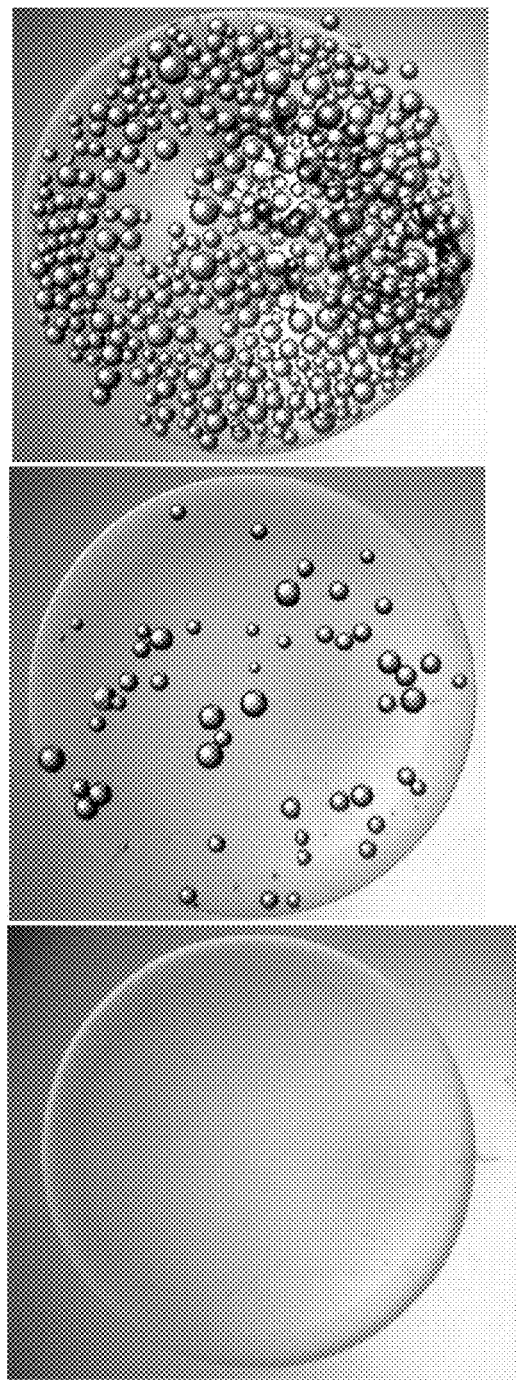
FIG. 6 shows optical microscopic images of contact lenses having different coatings thereon after being immersed in a dispersion of positively charged particles (DOWEX™ 1×4 20-50 Mesh resins).

DOWEX™ 1×4 20-50 Mesh resins are purchased from Sigma-Aldrich and used as received. DOWEX™ 1×4 20-50 Mesh resins are spherical, Type I strong base anion resins and are styrene/divinylbenzene copolymer containing $N^+(CH_3)_3Cl^-$ functional groups and 4% divinylbenzene. A 5% of 1×4 20-50 Mesh resins are dispersed in PBS and mixed well by stirring or vortexing at approximately 1000 rpm for 10 seconds. Lenses are immersed into this dispersion and vortexd between rpm 1000-1100 for 1 min, followed by rinsing with DI water and vortex for 1 min. The lenses are then placed in water in glass Petri dishes and images of lenses are taken with Nikon optical microscope, using bottom lighting. As shown in FIG. 6, almost the entire surface of PAA-coated lenses is covered with adhered positively charged particles (FIG. 6a), whereas a total of about 50 positively charged particles are adhered onto lenses with crosslinked coating prepared in Example 19 (FIG. 6B) and no positively charged particles are adhered onto lenses with crosslinked coating prepared in Example 14 (FIG. 6C). Some loosely adhered particles may fall off the lens surface and can also be found in the water surrounding the lenses.

It is understood that when positively-charged particles with larger size (i.e., DOWEX™ monosphere ion exchange resins, cross-linked polystyrene beads, chloride form, ~590 microns in size, from Sigma-Aldrich) are used in the tests, the number of particles adhered onto the particles can be decreased. About 30% of these DOWEX monosphere resins are dispersed in PBS. Lenses are immersed into this dispersion for ~1 min, followed by rinsing with DI water. The lenses are then placed in water in glass Petri dishes and images of lenses are taken with Nikon optical microscope, using bottom lighting. It is found that there are many particles (about 200 particles) adhered onto PAA-coated lenses and no particles are adhered onto lenses with crosslinked coating. Some commercially available contact lenses are also tested. No particles are observed on following lenses: Acuvue® TruEye™, Acuvue® Advance®, Acuvue® Oasys®, Avaira™, Biofinity®, Air Optix®, and Focus® Night & Day®. Particles are observed on following 4 types of lenses (in the order of increasing number of particles): PureVision®, 1 Day Acuvue® Moist®, Proclear 1 day, Acuvue® (Etafilcon A) lens. Almost the entire surface of Acuvue® (Etafilcon A) lens is covered with adhered positively charged particles.

Negatively charge resins (Amberlite CG50) are purchased from Sigma and used as received. A 5% of this Amberlite CG50 beads is dispersed in PBS and vortexed at about 1000 rpm for 10 seconds. PAA-coated lenses are immersed into this dispersion and vortexed between rpm 1000-1100 for 1 min, followed by rinsing with DI water and vortexed for 1 min. The lenses are then placed in water in glass Petri dishes and images of lenses are taken with Nikon optical microscope, using bottom lighting. No Amberlite particles (negatively charged) are found on PAA-coated lenses.

Negatively charged beads (Amberlite CG50), which are coated with polyethylenimine (PEI, a positively charged electrolytes), are used in this experiment. The PEI coating procedure is performed as follows. PEI (Lupasol SK, 24% in water, Mw of ~2000000) is purchased from BASF and used as received. Prepare an aqueous dispersion of 1% Amberlite particles and 5% PEI. Adjust the pH to 7 and make sure solution is well-mixed (e.g. by stirring for 30 min). Followed by suspending the dispersion in a large amount of water 2 to 3 times and filtered 2 to 3 times before collecting particles (PEI-coated Amberlite). A 5% of PEI-coated Amberlite CG50 particles are dispersed in PBS and vortexed at about 1000 rpm for 10 seconds. Lenses are immersed into this dispersion and vortexed between rpm 1000-1100 for 1 min, followed by rinsing with DI water and vortex for 1 min. The lenses are then placed in water in glass Petri dishes and images of lenses are taken with Nikon optical microscope, using bottom lighting. It is observed that there are a lot of PEI-coated Amberlite particles (positively charged particles because of the presence of PEI) adhered onto PAA-coated lenses (Example 19). But, there is virtually no PEI-coated Amberlite particles adhered onto uncoated SiHy contact lenses (Example 19), SiHy contact lenses with crosslinked coating (Example 19), or PAExPAA-coated lenses (Example 4).

EXAMPLE 31

Figure 7:
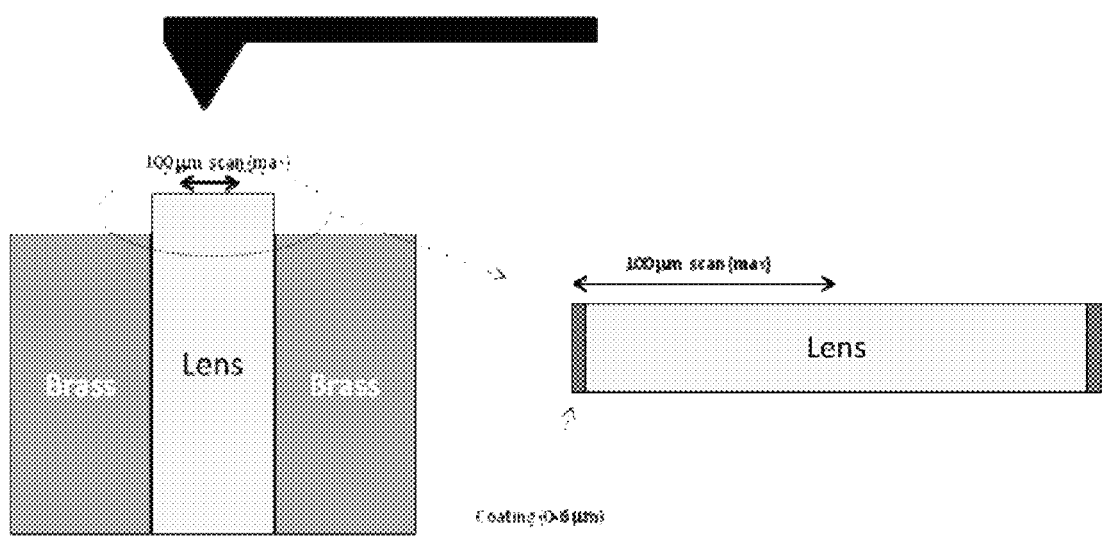
FIG. 7 schematically illustrates how to mount vertically in a metal clamp a cross-section piece of a SiHy contact lens of the invention for AFM testing.

Sample Preparation:

AFM studies have been conducted on SiHy contact lenses (prepared in Example 19) in hydrated state and in dry state. A lens is removed from its blister pack (sealed and autoclaved) and a cross-section is cut (for example by using a razor blade). The cross-section piece of the lens is mounted vertically in a metal clamp, as shown in FIG. 7. A small piece of lens is sticking out of the top of the holder to allow the AFM tip (above the lens cross section in FIG. 7) to scan it.

AFM Experiment:

Two separate AFM instruments are used to characterize the lens cross section. In both instances (except for dry samples), the AFM scan is done under a phosphate buffer solution (PBS with or without NaCl but having an osmolarity substantially identical to that of the physiological saline) to maintain fully hydrated state of the hydrogel sample.

The first AFM instrument is Veeco BioScope AFM with a Nanoscope IV controller. Data is collected utilizing triangular silicon cantilevers with a spring constant of 0.58 N/m and a nominal tip radius of curvature of 20-60 nm. Scans are done in constant contact (force-volume) mode with a probe velocity of 30 microns/second and a force-volume scan rate of 0.19 Hz. The topographic data and force-volume data are collected simultaneously. Each force curve consisted of about 30 data points. The lens is fully immersed in PBS during the AFM scan. Normally a scan size of maximum of 20 microns is used in order to achieve high enough resolution for the force-volume image. 128×128 pixels force plots are collected over about 3 hours per images.

Figure 8:
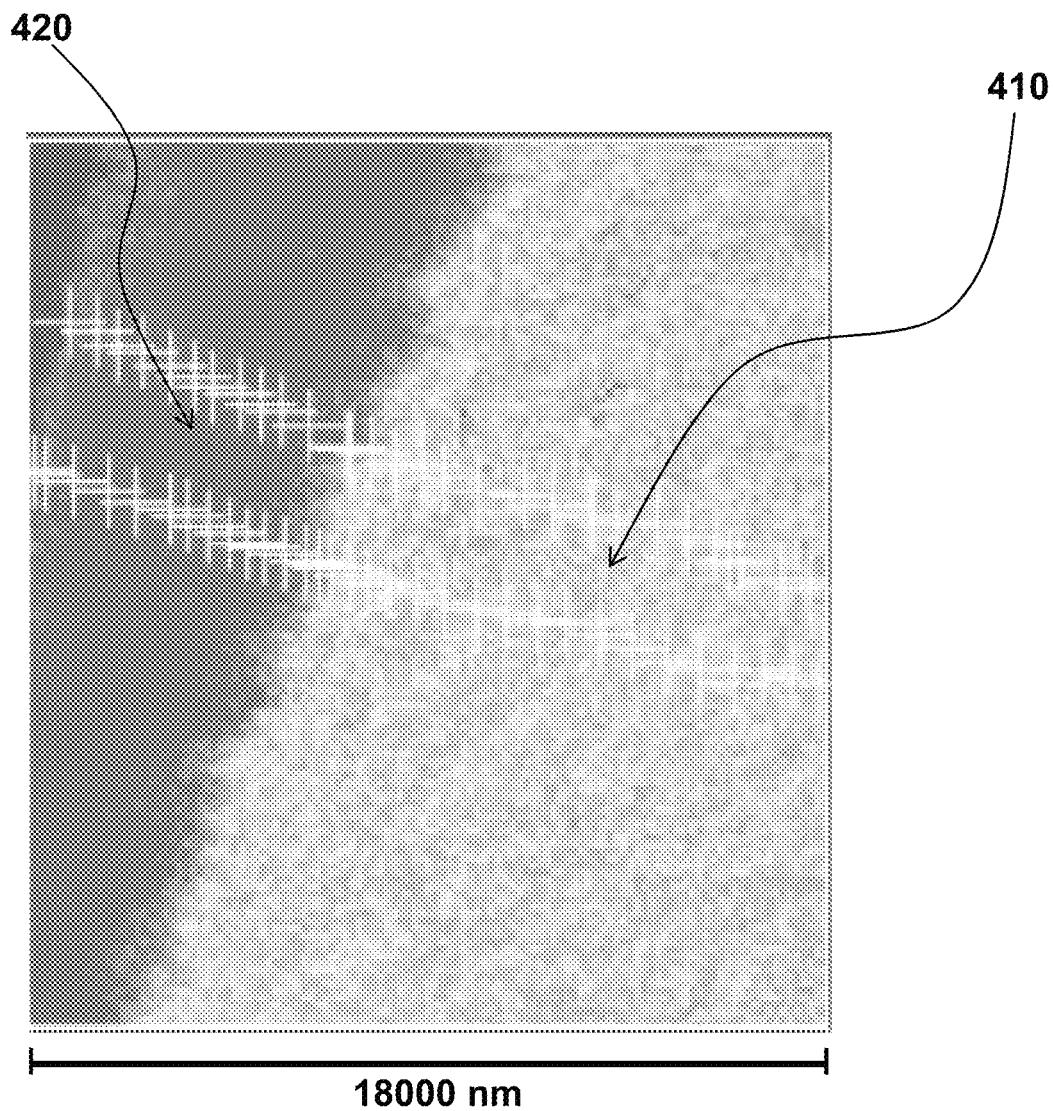
FIG. 8 shows the AFM (atomic force microscopy) image of a portion of a cross section of a SiHy contact lens in fully hydrated state (in phosphate buffered saline, pH ~7.3) according to a preferred embodiment of the invention.

An AFM image of a cross section of a SiHy contact lens with crosslinked coating (Example 19) in fully hydrated state is obtained via the Force-Volume method and shown in FIG. 8. In the image the darker colored region 420 indicates the coating and the lighter colored region 410 indicates the bulk material of the lens. The average thickness of the crosslinked coating (i.e., the anterior and posterior outer layers) of the SiHy contact lens (Example 19) is determined to be about 5.9 μm (st. dev. 0.8 μm) as obtained from 7 images, 4 lenses.

Figure 9:
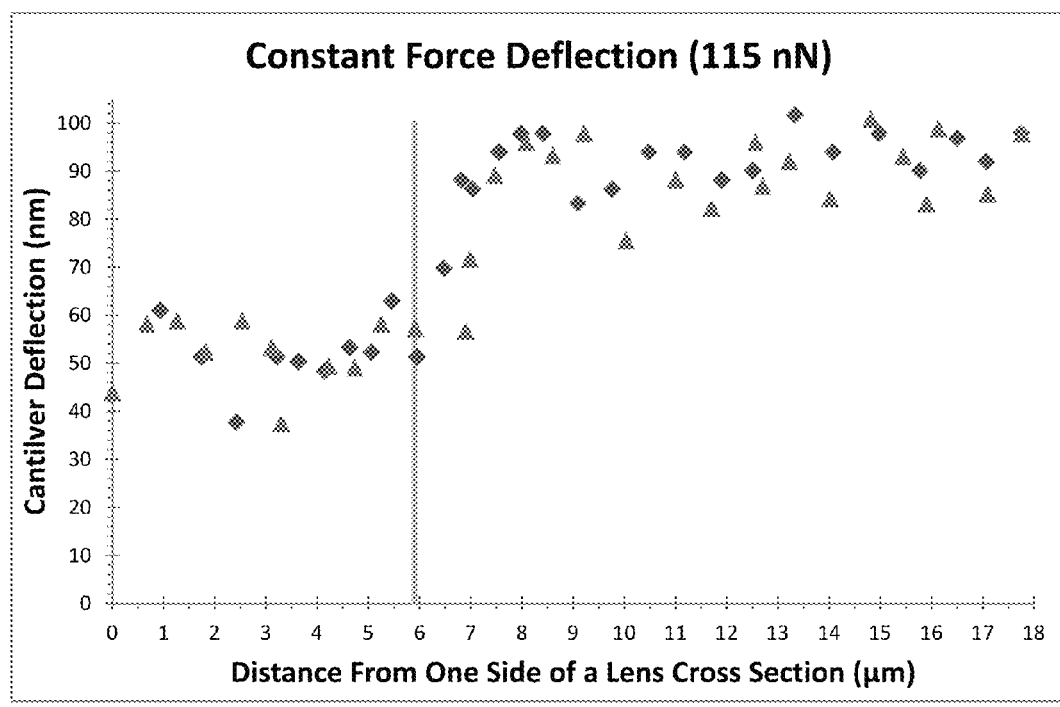
FIG. 9 shows a cross sectional surface modulus profile of a SiHy contact lens of the invention in fully hydrated state (in phosphate-buffered saline, pH ~7.3), along two shortest line between the anterior and posterior surfaces on the surface of a cross section of a SiHy contact lens, according to a preferred embodiment of the invention as represented approximately by the plots of the cantilever deflection as function of the distance.

AFM technique enables the determination of the surface modulus (surface softness) at a specific locations on the lens cross section. FIG. 9 shows a cross sectional surface modulus profile of a SiHy contact lens with a crosslinked coating (prepared in Example 19) in fully hydrated state. Because the surface modulus of a material is proportional to the cantilever deflection, a cross-sectional surface modulus profile of a contact lens can be obtained approximately by plotting the values of cantilevers deflection (as a measure for the surface modulus of a material at a specific location on the lens cross section) as a functional of the distance from the side (anterior or posterior surface) of the cross section along two lines across the cross section shown in FIG. 8. As shown in FIG. 9, the crosslinked coating (the anterior and posterior outer layers of the contact lens of Example 19) is softer than the bulk (inner layer of) silicone hydrogel lens material. Moving along the two lines, the surface modulus first remains almost constant with an average cantilever deflection of about 52 nm (i.e., average surface modulus) over the zone between 0 and about 5.9 microns and then gradually increases at locations further inside lens until reaching a maximum and remains approximately constant thereafter (plateau) with an average cantilever deflection of about 91 (i.e., average surface modulus) over the zone above about 7 microns. The transition from the softer crosslinked coating to the harder bulk SiHy material, which occurs gradually over the span of a few microns, suggests that a gradient in morphology or composition (water content) may be present between the surface of the coating and the bulk of the lens. Surface moduli in the zone between 5.9 microns and about 7 microns, i.e., a region around the border between the outer hydrogel layer and the inner layer of the silicone hydrogel material, is not used in the calculation of the average surface modulus. It can calculated that the anterior and posterior outer hydrogel layers (crosslinked coating) of the SiHy contact lens (Example 19) has a reduced surface modulus $$\frac{\overline{SM_{Inner}} - \overline{SM_{Outer}}}{\overline{SM_{Inner}}} \times 100\%$$

in which $\overline{SM_{Outer}}$ is the average surface modulus of the posterior or anterior hydrogel layer, and $\overline{SM_{Inner}}$ is the average surface modulus of the inner layer) of about 43%.

The SiHy contact lenses (prepared in Example 19) are studied with the second AFM instrument. The scanning is done using a Bruker Icon AFM in Quantitative Nanomechanical Measurements (PeakForce QNM) mode using lenses in either fully-hydrated (PBS without NaCl but with glycerol to reach at the similar osmolarity) or dry state. The lens cross section is mounted in a metal clamp as described above. Test conditions include, a Spring Constant of 1.3 N/m, Tip Radius of 33.3 nm, Sensitivity of 31 nm/V, Scan Rate of 0.4 Hz, and a scan Resolution of 512×512.

AFM image of a cross section of the SiHy contact lens (Example 19) in fully hydrated state and in dry state are obtained according to the PeakForce QNM method. By analyzing the obtained images, the thickness of the crosslinked coating in fully hydrated state is determined to be about 4.4 microns, while the thickness of the crosslinked coating in dry state is determined to be about 1.2 microns for vacuum dried sample, about 1.6 microns for oven dried sample. The water-swelling ratio $$\frac{L_{Wet}}{L_{Dry}} \times 100\%$$

(in which $L_{Wet}$ is the average thickness of the outer hydrogel layer of the SiHy contact lens in fully hydrated state, and $L_{Dry}$ is the average thickness of that outer hydrogel layer of the SiHy contact lens in dry state) of the crosslinked coating of the SiHy contact lenses (prepared in Example 19) is calculated to be about 277% (oven dried sample) or about 369% (vacuum dried sample).

EXAMPLE 32

Preparation of Lens Formulations

Formulation I is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Formulation II is prepared by dissolving components in 1-propanol to have the following composition: about 32% by weight of CE-PDMS macromer prepared in Example 2, about 21% by weight of TRIS-Am, about 23% by weight of DMA, about 0.6% by weight of L-PEG, about 1% by weight of DC1173, about 0.1% by weight of visitint (5% copper phthalocyanine blue pigment dispersion in TRIS), about 0.8% by weight of DMPC, about 200 ppm H-tempo, and about 22% by weight of 1-propanol.

Preparation of Lenses

Lenses are prepared by cast-molding from a lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The UV irradiation source is a Hamamatsu lamp with the WG335+TM297 cut off filter at an intensity of about 4 mW/cm$^2$. The lens formulation in the mold is irradiated with UV irradiation for about 25 seconds. Cast-molded lenses are extracted with methyl ethyl ketone (MEK) (or propanol or isopropanol).

Application of PAA Prime Coating onto SiHy Contact lenses

A polyacrylic acid coating solution (PAA-1) is prepared by dissolving an amount of PAA (M.W.: 450 kDa, from Lubrizol) in a given volume of 1-propanol to have a concentration of about 0.36% by weight and the pH is adjusted with formic acid to about 2.0.

Another PAA coating solution (PAA-2) is prepared by dissolving an amount of PAA (M.W.: 450 kDa, from Lubrizol) in a given volume of an organic-based solvent (50/50 1-propanol/H$_2$O) to have a concentration of about 0.39% by weight and the pH is adjusted with formic acid to about 2.0.

Above-obtained SiHy contact lenses are subjected to one of dipping processes shown in Tables 10 and 11.

TABLE 10

| | | Dipping Process | | | | | |
|---|---|---|---|---|---|---|---|
| Baths | Time | 20-0 | 20-1 | 20-2 | 20-3 | 20-4 | 20-5 |
| 1 | 56 s | H2O | H2O | H2O | H2O | H2O | H2O |
| 2 | 44 s | MEK | MEK | MEK | MEK | MEK | MEK |
| 3 | 56 s | MEK | MEK | MEK | MEK | MEK | MEK |
| 4 | 56 s | MEK | MEK | MEK | MEK | MEK | MEK |
| 5 | 56 s | MEK | MEK | MEK | MEK | MEK | MEK |
| 6 | 56 s | MEK | MEK | MEK | MEK | MEK | MEK |
| 7 | 56 s | MEK | MEK | MEK | MEK | MEK | MEK |
| 8 | 56 s | H2O | H2O | H2O | H2O | H2O | H2O |
| 9 | 44 s | PAA-1 | PAA-1 | PAA-1 | PAA-2 | PAA-2 | PAA-1 |
| 10 | 56 s | PAA-1 | PAA-1 | PAA-1 | PAA-2 | PAA-2 | PAA-1 |

TABLE 10-continued

| | | Dipping Process | | | | | |
|---|---|---|---|---|---|---|---|
| Baths | Time | 20-0 | 20-1 | 20-2 | 20-3 | 20-4 | 20-5 |
| 11 | 56 s | H2O | PrOH | H2O | H2O | H2O | H2O |
| 12 | 44 s | H2O | PrOH | PrOH | PrOH | 50/50 | 50/50 |
| 13 | 56 s | H2O | H2O | H2O | H2O | H2O | H2O |
| 14 | 56 s | H2O | H2O | H2O | H2O | H2O | H2O |
| 15 | 56 s | PBS | PBS | PBS | PBS | PBS | PBS |
| 16 | 56 s | H2O | H2O | H2O | H2O | H2O | H2O |

PrOH represents 100% 1-propanol;
PBS stands for phosphate-buffered saline;
MEK stands for methyl ethyl ketone;
50/50 stands a solvent mixture of 50/50 1-PrOH/H$_2$O.

TABLE 11

| | | Dipping Process | | | | | | |
|---|---|---|---|---|---|---|---|---|
| Baths | Time | 80-0 | 80-1 | 80-2 | 80-3 | 80-4 | 80-5 | 80-6 |
| 1 | 56 s | H2O | H2O | H2O | H2O | H2O | H2O | H2O |
| 2 | 44 s | MEK | MEK | MEK | MEK | MEK | MEK | MEK |
| 3 | 56 s | MEK | MEK | MEK | MEK | MEK | MEK | MEK |
| 4 | 56 s | MEK | MEK | MEK | MEK | MEK | MEK | MEK |
| 5 | 56 s | MEK | MEK | MEK | MEK | MEK | MEK | MEK |
| 6 | 56 s | MEK | MEK | MEK | MEK | MEK | MEK | MEK |
| 7 | 56 s | MEK | MEK | MEK | MEK | MEK | MEK | MEK |
| 8 | 56 s | H2O | H2O | H2O | H2O | H2O | H2O | H2O |
| 9 | 44 s | PAA-1 | PAA-1 | PAA-1 | PAA-1 | PAA-1 | PAA-1 | PAA-1 |
| 10 | 56 s | PAA-1 | 50/50 | PrOH | 50/50 | PrOH | PrOH | H2O |
| 11 | 56 s | H2O | H2O | H2O | 50/50 | PrOH | 50/50 | 50/50 |
| 12 | 44 s | H2O | H2O | H2O | H2O | H2O | H2O | H2O |
| 13 | 56 s | H2O | H2O | H2O | H2O | H2O | H2O | H2O |
| 14 | 56 s | H2O | H2O | H2O | H2O | H2O | H2O | H2O |
| 15 | 56 s | PBS | PBS | PBS | PBS | PBS | PBS | PBS |
| 16 | 56 s | H2O | H2O | H2O | H2O | H2O | H2O | H2O |

PrOH represents 100% 1-propanol;
PBS stands for phosphate-buffered saline;
MEK stands for methyl ethyl ketone;
50/50 stands a solvent mixture of 50/50 1-PrOH/H$_2$O.

Application of Crosslinked Hydrophilic Coating

Poly(acrylamide-co-acrylic acid) partial sodium salt, Poly (AAm-co-AA)(90/10) (~90% solid content, poly(AAm-co-AA) 90/10, Mw 200,000) is purchased from Polysciences, Inc. and used as received. PAE (Kymene, an azetidinium content of 0.46 assayed with NMR) is purchased from Ashland as an aqueous solution and used as received. An in-package-crosslinking (IPC) saline is prepared by dissolving about 0.07% w/w of poly(AAm-co-AA)(90/10) and about 0.15% of PAE (an initial azetidinium millimolar equivalents of about 8.8 millimole) in phosphate buffered saline (PBS) (about 0.044 w/w % NaH$_2$PO$_4$.H$_2$O, about 0.388 w/w % Na$_2$HPO$_4$.2H$_2$O, about 0.79 w/w % NaCl) and adjusting the pH to 7.2~7.4. Then the IPC saline is heat pre-treated for about 4 hours at about 70° C. (heat pretreatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron polyether sulphone [PES] membrane filter and cooled down back to room temperature. 10 ppm hydrogen peroxide is then added to the final IPC saline to prevent bioburden growth and the IPC saline is filtered using a 0.22 micron PES membrane filter.

Lenses having a PAA prime coating thereon prepared above are placed in polypropylene lens packaging shells (one lens per shell) with 0.6 mL of the IPC saline (half of the saline is added prior to inserting the lens). The blisters are then sealed with foil and autoclaved for about 30 minutes at about 121° C., forming SiHy contact lenses with crosslinked hydrophilic coatings thereon.

Characterization of SiHy Lenses.

The resultant SiHy contact lenses with crosslinked hydrophilic coatings thereon and a center thickness of about 0.95 microns have an oxygen permeability (Dk$_c$ or estimated intrinsic Dk) of about 142 to about 150 barrers, a bulk elastic modulus of about 0.72 to about 0.79 MPa, a water content of about 30% to about 33% by weight, a relative ion permeability of about 6 (relative to Alsacon lens), and a contact angle of from about 34 to about 47 degrees.

Characterization of the Nano-Textured Surfaces of Contact Lens

Transmission-Differential-Interference-Contrast (TDIC) Method. Contact lenses are placed on a glass slide and flattened by compressing the lens between the slide and a glass cover slip. Contact lens surfaces are located and examined by focusing through the lens using a Nikon ME600 microscope with transmission differential interference contrast optics using a 40× objective lens. The obtained TDIC images are then evaluated to determine the presence of winkled surface patterns (e.g., random and/or ordered worm-like patterns, or the likes).

Reflection-Differential-Interference-Contrast (RDIC) Method. Lenses are placed on a glass slide and flattened by making 4 radial cuts every ~90 degrees. Excess saline is blown off the surface using compressed air. Lens surface is then examined using Nikon Optiphot-2 with reflection differential interference contrast optics for the presence of winkled surface patterns on the surfaces of a contact lens using 10×, 20× and 50× objective lenses. A representative image of each side is acquired using 50× objective lens. The contact lens is then flipped over, excess saline removed and the other side of the contact lens and is inspected in the same way. The obtained RDIC images are then evaluated to determine the presence of winkled surface patterns (e.g., random and/or ordered worm-like patterns, or the likes).

Dark Field Light Microscopy (DFLM). DFLM is generally based on dark field illumination which is a method of enhancing contrast in observed samples. This technique consists of a light source outside or blocked from the observer's field of view in order to illuminate a sample at an angle relative to normal transmitted light. Since the un-scattered light from the source is not gathered by the objective lens, it is not part of the image and the background of the image appears dark. Since the light source is illuminating the sample at an angle, the light observed in the sample image is that which is scatted by the sample toward the observer, contrast is then created between this scattered light from the sample and the dark background of the image. This contrast mechanism makes dark illumination especially useful for the observation of scattered phenomena such as haze.

DFLM is used to evaluate the haziness of contact lenses as follows. It is believed that since the dark-field setup involves scattered light, dark-field data could provide the worst-case estimate of haziness. In 8-bit grey scale digital images each image pixel is assigned a grey scale intensity (GSI) value in the range from 0-255. Zero represents a pixel that is perfectly black and 255 represents a pixel that is perfectly white. An increase in the scattered light captured in the image will produce pixels with higher GSI values. This GSI value can then be used as a mechanism to quantify the amount of scattered light observed in a dark field image. The haziness is expressed by averaging the GSI values of all pixels in an area of interest (AOI) (e.g., a whole lens or the lenticular zone or optical zone of a lens). The experimental set-up consists of a microscope or equivalent optics, an attached digital camera and a dark field stand with ring light and variable intensity light source. Optics is designed/arranged so that the entirety of the contact lens to be observed fills the field of view (typically ~15 mm×20 mm field of view). Illumination is set to a level appropriate to observe the desired changes in the relevant samples. Light intensity is adjusted/calibrated to the same level for each set of samples using a density/light scattering standard as known to a person skilled in the art. For example, a standard is composed of two overlapping plastic cover slips (identical and slight or moderately frosted). Such standard consists of areas with three different averaged GSI that include two areas with intermediate grey scale levels and saturated white (edges). The black areas represent the empty dark field. The black and saturated white areas can be used to verify gain and offset (contrast and brightness) settings of camera. The intermediate grey levels can provide three points to verify the linear response of the camera. Light intensity is adjusted so that the average GSI of the empty dark field approaches 0 and that of a defined AOI in a digital image of the standard is the same each time within ±5 GSI units. After light intensity calibration, a contact lens is immersed in 0.2 μm-filtered phosphate buffer saline in a quartz Petri dish or a dish or similar clarity which is placed on the DFLM stand. An 8-bit grey scale digital image of the lens is then acquired as viewed using the calibrated illumination and the average GSI of a defined AOI within the portion of the image containing the lens is determined. This is repeated for a sample set of contact lenses. Light intensity calibration is re-evaluated periodically over the course of a test to ensure consistency. The level of haziness under DFLM examination refers to a DFLM haziness $$\frac{GSI}{255} \times 100\%.$$

SiHy contact lenses, the PAA prime coating of which is obtained according to either of the dipping processes 20-0 and 80-0, are determined to have an averaged DFLM haziness of about 73% and show wrinkle surface patterns (random worm-like patterns) that can be visually observed by examining the contact lens in hydrated state, according to the method of either RDIC or TDIC as described above. But, the winkled surface patterns have practically no adverse effects upon the light transmissibility of the contact lenses.

SiHy contact lenses, the PAA prime coating of which is obtained according to either of the dipping processes 20-1 to 20-4, are determined to have a low averaged DFLM haziness of about 26% (probably due to the presence of visitint pigment particles) and show no noticeable wrinkle surface patterns (random worm-like patterns) when examined under either RDIC or TDIC as described above.

A high percentage of SiHy contact lenses, the PAA prime coating of which is obtained according to either of the dipping process 20-5, are determined to have a moderate averaged DFLM haziness of about 45% and show slightly noticeable wrinkle surface patterns when examined under either RDIC or TDIC as described above. But, the winkled surface patterns have practically no adverse effects upon the light transmissibility of the contact lenses.

SiHy contact lenses, the PAA prime coating of which is obtained according to either of the dipping processes 80-1, 80-2, 80-3, 80-5 and 80-6, do not show noticeable wrinkle surface patterns when examined under either RDIC or TDIC as described above. But, SiHy contact lenses, the PAA prime coating of which is obtained according to either of the dipping processes 80-0 and 80-4, show noticeable wrinkle surface patterns when examined under either RDIC or TDIC as described above. But, the winkled surface patterns have practically no adverse effects upon the light transmissibility of the contact lenses.

EXAMPLE 33

Synthesis of UV-Absorbing Amphiphilic Branched Copolymer

A 1-L jacketed reactor is equipped with 500-mL addition funnel, overhead stirring, reflux condenser with nitrogen/vacuum inlet adapter, thermometer, and sampling adapter. 89.95 g of 80% partially ethylenically functionalized polysiloxane prepared in Example 17, A, is charged to the reactor and then degassed under vacuum less than 1 mbar at room temperature for about 30 minutes. The monomer solution prepared by mixing 1.03 g of HEMA, 50.73 g of DMA, 2.76 g of Norbloc methacrylate, 52.07 g of TRIS, and 526.05 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 67° C. with adequate stirring. While heating, a solution composed of 2.96 g of mercaptoethanol (chain transfer agent, CTA) and 0.72 g of dimethyl 2,2'-azobis(2-methylpropionate) (V-601-initiator) and 76.90 g of ethyl acetate is charged to the addition funnel followed by same degas process as the monomer solution. When the reactor temperature reaches 67° C., the initiator/CTA solution is also added to reactor. The reaction is performed at 67° C. for 8 hours. After the copolymerization is completed, reactor temperature is cooled to room temperature.

Synthesis of UV-Absorbing Amphiphilic Branched Prepolymer

The copolymer solution prepared above is ethylenically functionalized to form an amphiphilic branched prepolymer by adding 8.44 g of IEM (or 2-isocyanatoethyl methacrylate in a desired molar equivalent amount) in the presence of 0.50 g of DBTDL. The mixture is stirred at room temperature under a sealed condition for 24 hours. The prepared prepolymer is then stabilized with 100 ppm of hydroxy-tetramethylene piperonyloxy before the solution is concentrated to 200 g (~50%) and filtered through 1 um pore size filter paper. After the reaction solvent is exchanged to 1-propanol through repeated cycles of evaporation and dilution, the solution is ready to be used for formulation. The solid content is measured via removing the solvent at vacuum oven at 80° C.

Preparation of Lens Formulation

A lens formulation is prepared to have the following composition: 71% by weight of prepolymer prepared above; 4% by weight of DMA; 1% by weight of TPO; 1% by weight of DMPC; 1% by weight of Brij 52 from Sigma-Aldrich), and 22% by weight of 1-PrOH.

Lens Preparation

Lenses are fabricated by cast-molding of the lens formulation prepared above using reusable mold, similar to the mold shown in FIGS. 1-6 in U.S. Pat. Nos. 7,384,590 and 7,387,759 (FIGS. 1-6) under spatial limitation of UV irradiation. The mold comprises a female mold half made of glass and a male mold half made of quartz. The UV irradiation source is a Hamamatsu lamp with a 380 nm-cut-off filter at an intensity of about 4.6 mW/cm². The lens formulation in the mold is irradiated with UV irradiation for about 30 seconds.

Cast-molded lenses are extracted with methyl ethyl ketone (MEK), rinsed in water, coated with polyacrylic acid (PAA) by dipping lenses in a propanol solution of PAA (0.004% by weight, acidified with formic acid to about pH 2.0), and hydrated in water.

IPC Saline is prepared from a composition containing about 0.07% PAAm-PAA and sufficient PAE to provide an initial azetidinium content of approximately 8.8 millimole equivalents/Liter (~0.15% PAE) under pre-reaction conditions of 6 hrs at approximately 60° C. 5 ppm hydrogen peroxide is then added to the IPC salines to prevent bioburden growth and the IPC salines are filtered using a 0.22 micron polyether sulphone [PES] membrane filter Lenses are placed in a polypropylene lens packaging shell with 0.6 mL of the IPC saline (half of the saline is added prior to inserting the lens). The blister is then sealed with foil and autoclaved for 30 min at 121° C.

Lens Characterization

The obtained lenses have the following properties: E'~0.82 MPa; $DK_c$~159.4 (using Iotrafilcon B as reference lenses, an average center thickness of 80 μm and an intrinsic Dk 110); IP~2.3; water %~26.9; and UVA/UVB % T~4.6/0.1. When observed under dark field microscope, no cracking lines are visible after rubbing the test lens. The lenses are very lubricious in a finger rubbing test and equivalent to the control lenses.

What is claimed is:

1. A silicone hydrogel contact lens having a layered structural configuration and a water content gradient from inside to outside of the silicone hydrogel contact lens, comprising:

a silicone hydrogel core (or bulk material) completely covered with an outer (surface) hydrogel layer having a thickness of at least about 0.1 μm as measured with atomic force microscopy across a cross section from the posterior surface to the anterior surface of the silicone hydrogel contact lens in fully hydrated state, wherein the outer hydrogel layer is substantially free of silicone, and wherein the water content of the outer hydrogel layer is at least about 1.2 folds (or about 120%) of the water content (designated as $WC_{SiHy}$) of the silicone hydrogel bulk material when being fully hydrated.

2. The silicone hydrogel contact lens of claim 1, wherein the outer hydrogel layer comprises two outer layers which merge at the peripheral edge of the silicone hydrogel contact lens, wherein the two outer layers are substantially identical to each other.

3. The silicone hydrogel contact lens of claim 2, wherein the outer (surface) hydrogel layer has: a thickness of from about 0.1 μm to about 20 μm as measured with atomic force microscopy across a cross section from the posterior surface to the anterior surface of the silicone hydrogel contact lens in fully hydrated state; a surface silicon atomic percentage of about 5% or less of total elemental percentage as measured by XPS analysis of the silicone hydrogel contact lens in dried state; a water content that is at least about 1.3 folds (or about 130%) of the water content of the silicone hydrogel bulk material when being fully hydrated; a reduced surface modulus of at least about 20% relative to the silicone hydrogel bulk material when being fully hydrated; or a combination thereof.

4. The silicone hydrogel contact lens of claim 2, wherein the outer (surface) hydrogel layer has: a thickness of from about 0.25 μm to about 15 μm as measured with atomic force microscopy across a cross section from the posterior surface to the anterior surface of the silicone hydrogel contact lens in fully hydrated state; a surface silicon atomic percentage of about 4% or less of total elemental percentage as measured by XPS analysis of the silicone hydrogel contact lens in dried state; a water content that is at least about 1.4 folds (or about 140%) of the water content of the silicone hydrogel bulk material when being fully hydrated; a reduced surface modulus of at least about 25% relative to the silicone hydrogel bulk material when being fully hydrated; or a combination thereof.

5. The silicone hydrogel contact lens of claim 2, wherein the outer (surface) hydrogel layer has: a thickness of from about 0.5 μm to about 12.5 μm as measured with atomic force microscopy across a cross section from the posterior surface to the anterior surface of the silicone hydrogel contact lens in fully hydrated state; a surface silicon atomic percentage of about 3% or less of total elemental percentage as measured by XPS analysis of the silicone hydrogel contact lens in dried state; a water content that is at least about 1.5 folds (or about 150%) of the water content of the silicone hydrogel bulk material when being fully hydrated; a reduced surface modulus of at least about 30% relative to the silicone hydrogel bulk material when being fully hydrated; or a combination thereof.

6. The silicone hydrogel contact lens of claim 3, wherein the outer (surface) hydrogel layer has: a thickness of from about 1 μm to about 10 μm as measured with atomic force microscopy across a cross section from the posterior surface to the anterior surface of the silicone hydrogel contact lens in fully hydrated state; a water content that is at least about 2 folds (or about 200%) of the water content of the silicone hydrogel bulk material when being fully hydrated; a reduced surface modulus of at least about 35% relative to the silicone hydrogel bulk material when being fully hydrated; or a combination thereof.

7. The silicone hydrogel contact lens of claim 4, wherein the outer (surface) hydrogel layer has: a thickness of from about 1 μm to about 10 μm as measured with atomic force microscopy across a cross section from the posterior surface to the anterior surface of the silicone hydrogel contact lens in fully hydrated state; a water content that is at least about 2 folds (or about 200%) of the water content of the silicone hydrogel bulk material when being fully hydrated; a reduced surface modulus of at least about 40% relative to the silicone hydrogel bulk material when being fully hydrated; or a combination thereof.

8. The silicone hydrogel contact lens of claim 5, wherein the outer (surface) hydrogel layer has: a thickness of from about 1 μm to about 10 μm as measured with atomic force microscopy across a cross section from the posterior surface to the anterior surface of the silicone hydrogel contact lens in fully hydrated state; a water content that is at least about 2 folds (or about 200%) of the water content of the silicone hydrogel bulk material when being fully hydrated; or a combination thereof.

9. The silicone hydrogel contact lens of claim 2, wherein the water content of the outer hydrogel layer is at least about 2 folds (or about 200%) of the water content of the silicone hydrogel bulk material when being fully hydrated.

10. The silicone hydrogel contact lens of claim 3, wherein the water content of the outer hydrogel layer is at least about 2 folds (or about 200%) of the water content of the silicone hydrogel bulk material when being fully hydrated.

11. The silicone hydrogel contact lens of claim 4, wherein the water content of the outer hydrogel layer is at least about 2 folds (or about 200%) of the water content of the silicone hydrogel bulk material when being fully hydrated.

12. The silicone hydrogel contact lens of claim 5, wherein the water content of the outer hydrogel layer is at least about 2 folds (or about 200%) of the water content of the silicone hydrogel bulk material when being fully hydrated.

13. The silicone hydrogel contact lens of claim 6, wherein the water content of the outer hydrogel layer is at least about 2 folds (or about 200%) of the water content of the silicone hydrogel bulk material when being fully hydrated.

14. The silicone hydrogel contact lens of claim 2, wherein the water content of the outer hydrogel layer is greater than 75% when being fully hydrated.

15. The silicone hydrogel contact lens of claim 2, wherein when being fully hydrated the silicone hydrogel bulk material has: a water content (designated as $WC_{SiHy}$) of from about 10% to about 70% by weight by weight; a bulk elastic modulus of from about 0.3 MPa to about 1.8 MPa; or a combination thereof.

16. The silicone hydrogel contact lens of claim 10, wherein when being fully hydrated the silicone hydrogel bulk material has a water content (designated as $WC_{SiHy}$) of from about 10% to about 60% by weight.

17. The silicone hydrogel contact lens of claim 11, wherein when being fully hydrated the silicone hydrogel bulk material has: a water content (designated as $WC_{SiHy}$) of from about 15% to about 55% by weight.

18. The silicone hydrogel contact lens of claim 12, wherein when being fully hydrated the silicone hydrogel bulk material has: a water content (designated as $WC_{SiHy}$) of from about 15% to about 50% by weight.

19. The silicone hydrogel contact lens of claim 2, wherein the silicone hydrogel contact lens has at least one property selected from the group consisting of: (a) an oxygen transmissibility of at least about 40 barrers/mm when being fully hydrated; (b) a surface hydrophilicity characterized by having a water breakup time of at least about 10 seconds when being fully hydrated; (c) a surface wettability characterized by having an averaged water contact angle of about 90 degrees or less when being fully hydrated; (d) a surface lubricity characterized by having a critical coefficient of friction (designated as CCOF) of about 0.046 or less when being fully hydrated; and (e) combinations thereof.

20. The silicone hydrogel contact lens of claim 3, wherein the silicone hydrogel contact lens has at least one property selected from the group consisting of: (a) an oxygen transmissibility of at least about 60 barrers/mm when being fully hydrated; (b) a surface hydrophilicity characterized by having a water breakup time of at least about 10 seconds when being fully hydrated; (c) a surface wettability characterized by having an averaged water contact angle of about 80 degrees or less when being fully hydrated; (d) a surface lubricity characterized by having a critical coefficient of friction (designated as CCOF) of about 0.043 or less when being fully hydrated; and (e) combinations thereof.

21. The silicone hydrogel contact lens of claim 4, wherein the silicone hydrogel contact lens has at least one property selected from the group consisting of: (a) an oxygen transmissibility of at least about 80 barrers/mm when being fully hydrated; (b) a surface hydrophilicity characterized by having a water breakup time of at least about 10 seconds when being fully hydrated; (c) a surface wettability characterized by having an averaged water contact angle of about 80 degrees or less when being fully hydrated; (d) a surface lubricity characterized by having a critical coefficient of friction (designated as CCOF) of about 0.043 or less when being fully hydrated; and (e) combinations thereof.

22. The silicone hydrogel contact lens of claim 5, wherein the silicone hydrogel contact lens has at least one property selected from the group consisting of: (a) an oxygen transmissibility of at least about 40 barrers/mm when being fully hydrated; (b) a surface hydrophilicity characterized by having a water breakup time of at least about 10 seconds when being fully hydrated; (c) a surface wettability characterized by having an averaged water contact angle of about 80 degrees or less when being fully hydrated; (d) a surface lubricity characterized by having a critical coefficient of friction (designated as CCOF) of about 0.043 or less when being fully hydrated; and (e) combinations thereof.

23. The silicone hydrogel contact lens of claim 6, wherein the silicone hydrogel contact lens has at least one property selected from the group consisting of: (a) an oxygen transmissibility of at least about 60 barrers/mm when being fully hydrated; (b) a surface hydrophilicity characterized by having a water breakup time of at least about 10 seconds when being fully hydrated; (c) a surface wettability characterized by having an averaged water contact angle of about 80 degrees or less when being fully hydrated; (d) a surface lubricity characterized by having a critical coefficient of friction (designated as CCOF) of about 0.043 or less when being fully hydrated; and (e) combinations thereof.

24. The silicone hydrogel contact lens of claim 2, wherein the outer hydrogel layer has a water content that is higher than $WC_{SiHy}$, as characterized either (a) by having a water-swelling ratio (WSR) of at least about 100% if $WC_{SiHy} \leq 45\%$ or (b) by having a water-swelling ratio of at least about $$\frac{120 \cdot WC_{SiHy}}{1 - WC_{SiHy}}\% \text{ if } WC_{SiHy} > 45\%.$$

25. The silicone hydrogel contact lens of claim 3, wherein the outer hydrogel layer has a water content that is higher than $WC_{SiHy}$, as characterized either (a) by having a water-swelling ratio (WSR) of at least about 100% if $WC_{SiHy} \leq 45\%$ or (b) by having a water-swelling ratio of at least about $$\frac{120 \cdot WC_{SiHy}}{1 - WC_{SiHy}}\% \text{ if } WC_{SiHy} > 45\%.$$

26. The silicone hydrogel contact lens of claim 4, wherein the outer hydrogel layer has a water content that is higher than $WC_{SiHy}$, as characterized either (a) by having a water-swelling ratio (WSR) of at least about 150% if $WC_{SiHy} \leq 45\%$ or (b) by having a water-swelling ratio of at least about $$\frac{130 \cdot WC_{SiHy}}{1 - WC_{SiHy}}\% \text{ if } WC_{SiHy} > 45\%.$$

27. The silicone hydrogel contact lens of claim 5, wherein the outer hydrogel layer has a water content that is higher than $WC_{SiHy}$, as characterized either (a) by having a water-swelling ratio (WSR) of at least about 150% if $WC_{SiHy} \leq 45\%$ or (b) by having a water-swelling ratio of at least about $$\frac{130 \cdot WC_{SiHy}}{1 - WC_{SiHy}}\% \text{ if } WC_{SiHy} > 45\%.$$

28. The silicone hydrogel contact lens of claim 15, wherein the outer hydrogel layer has a water content that is higher than $WC_{SiHy}$, as characterized either (a) by having a water-swelling ratio (WSR) of at least about 150% if $WC_{SiHy} \leq 45\%$ or (b) by having a water-swelling ratio of at least about $$\frac{130 \cdot WC_{SiHy}}{1 - WC_{SiHy}} \% \text{ if } WC_{SiHy} > 45\%.$$

29. The silicone hydrogel contact lens of claim 19, wherein the outer hydrogel layer has a water content that is higher than $WC_{SiHy}$, as characterized either (a) by having a water-swelling ratio (WSR) of at least about 150% if $WC_{SiHy} \leq 45\%$ or (b) by having a water-swelling ratio of at least about $$\frac{130 \cdot WC_{SiHy}}{1 - WC_{SiHy}} \% \text{ if } WC_{SiHy} > 45\%.$$

30. The silicone hydrogel contact lens of claim 22, wherein the outer hydrogel layer has a water content that is higher than $WC_{SiHy}$, as characterized either (a) by having a water-swelling ratio (WSR) of at least about 150% if $WC_{SiHy} \leq 45\%$ or (b) by having a water-swelling ratio of at least about $$\frac{130 \cdot WC_{SiHy}}{1 - WC_{SiHy}} \% \text{ if } WC_{SiHy} > 45\%.$$

* * * * *